US008422565B2

(12) United States Patent
Fukuhara et al.

(10) Patent No.: US 8,422,565 B2
(45) Date of Patent: Apr. 16, 2013

(54) INFORMATION PROCESSING DEVICE AND METHOD, AND INFORMATION PROCESSING SYSTEM

(75) Inventors: Takahiro Fukuhara, Kanagawa (JP); Kazuhisa Hosaka, Tokyo (JP); Katsuharu Shimura, Kanagawa (JP); Tsuguna Inagaki, Kanagawa (JP); Hiroo Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1161 days.

(21) Appl. No.: 12/112,417

(22) Filed: Apr. 30, 2008

(65) Prior Publication Data
US 2008/0304574 A1 Dec. 11, 2008

(30) Foreign Application Priority Data

May 17, 2007 (JP) ................. P2007-131284

(51) Int. Cl.
*H04N 7/12* (2006.01)
(52) U.S. Cl.
USPC .................................................... 375/240.29
(58) Field of Classification Search .......... 375/130–153, 375/240.01–240.29; 704/500–504; *H04N 7/12, H04N 11/04, 7/24, 7/26; H04B 1/66*
See application file for complete search history.

(56) References Cited

U.S. PATENT DOCUMENTS

| 5,703,646 A | 12/1997 | Oda |
| 5,870,145 A | 2/1999 | Yada et al. |
| 5,880,856 A | 3/1999 | Ferriere |
| 6,100,931 A | 8/2000 | Mihara |
| 6,198,769 B1 | 3/2001 | Mihara |
| 6,259,735 B1 | 7/2001 | Aono et al. |
| 6,707,948 B1 | 3/2004 | Cosman et al. |
| 6,813,314 B2 | 11/2004 | Aono et al. |

(Continued)

FOREIGN PATENT DOCUMENTS

| JP | 7-203456 | 8/1995 |
| JP | 10-136354 | 5/1998 |

(Continued)

OTHER PUBLICATIONS

Wim Sweldens, "The Lifting Scheme: A Custom-Design Construction of Biorthogonal Wavelets", Applied and Computational Harmonic Analysis, vol. 3, No. 2, pp. 186-200, 1996.

(Continued)

*Primary Examiner* — Gims Philippe
(74) *Attorney, Agent, or Firm* — Oblon, Spivak, McClelland, Maier & Neustadt, L.L.P.

(57) ABSTRACT

An information processing device includes: an accumulating unit for accumulating encoded data obtained by encoding image data; a reading unit for reading out the encoded data in data increments; a determining unit for determining whether or not a parameter indicating the accumulated state of the encoded data at the accumulating unit satisfies a predetermined accumulation condition; a forbidding unit for forbidding readout of encoded data to be read out following encoded data being read out by the reading unit in data increments, which serves as a reference, in the case of the determining unit determining that the parameter satisfies the accumulation condition; and a control unit for controlling the reading unit to omit readout of encoded data of which readout is forbidden by the forbidding unit in data increments, and performing readout of encoded data of which readout is not prohibited by the forbidding unit in data increments.

16 Claims, 36 Drawing Sheets

U.S. PATENT DOCUMENTS

| | | | |
|---|---|---|---|
| 6,847,468 B2 | 1/2005 | Ferriere | |
| 2002/0054635 A1* | 5/2002 | Nagai et al. | 375/240.01 |
| 2002/0084921 A1* | 7/2002 | Chen et al. | 341/50 |
| 2003/0123743 A1* | 7/2003 | Zandi et al. | 382/240 |

FOREIGN PATENT DOCUMENTS

| | | |
|---|---|---|
| JP | 2004-166254 | 6/2004 |
| JP | 2006-180036 | 7/2006 |
| JP | 2006-246399 | 9/2006 |

OTHER PUBLICATIONS

Chistos Chrysafis et al., "Line Based, Reduced Memory, Wavelet Image Compression", IEEE Transactions on Image Processing, vol. 9, No. 3, pp. 378-389, Mar. 2000.

\* cited by examiner

DIVISION LEVEL = 3
(H: HIGHBAND, L: LOWBAND)

DIVISION LEVEL = 3

IMAGE INPUT

WAVELET TRANSFORMATION RESULTS (ANALYSIS)

IMAGE OUTPUT

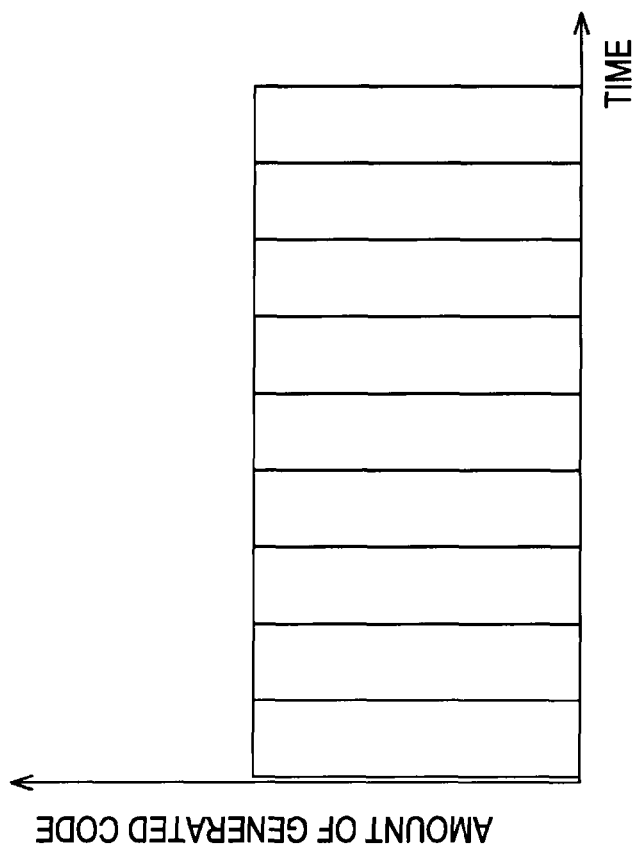
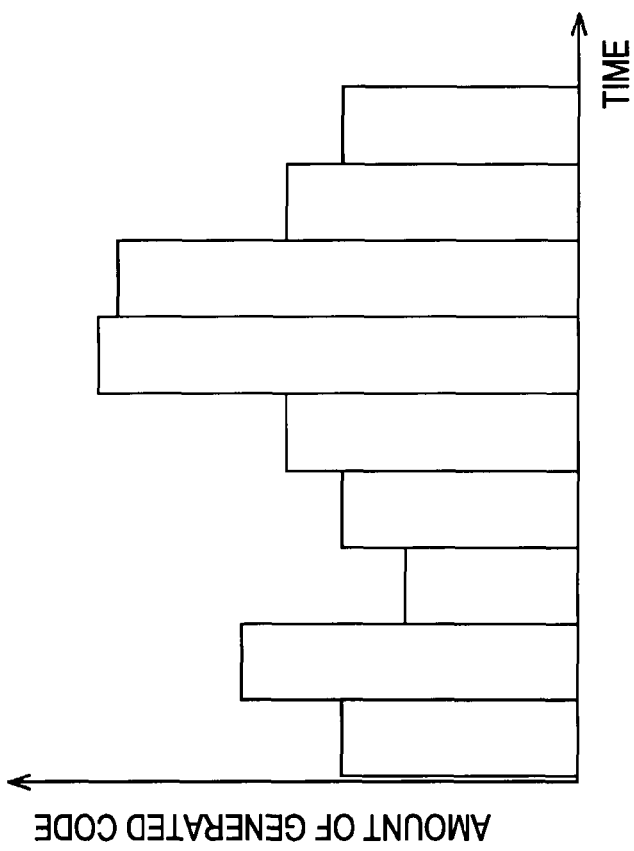

INFORMATION PROCESSING DEVICE AND METHOD, AND INFORMATION PROCESSING SYSTEM

CROSS REFERENCES TO RELATED APPLICATIONS

The present invention contains subject matter related to Japanese Patent Application JP 2007-131284 filed in the Japanese Patent Office on May 17, 2007, the entire contents of which are incorporated herein by reference.

BACKGROUND OF THE INVENTION

1. Field of the Invention

The present invention relates to an information processing device and method, and information processing system, and particularly, relates to an information processing device and method, and information processing system whereby with data transfer of contents, increase in unnecessary delay time can be suppressed, and unnecessary deterioration of quality as contents can be suppressed.

2. Description of the Related Art

Heretofore, as a video picture transmission/reception device, there has been a triax system employed for sports relay broadcasting or the like at a broadcasting station or stadium. Triax systems which have been employed so far have been primarily for analog pictures, but along with recent digitization of image processing, it can be conceived that digital triax systems for digital pictures will become widespread from now on.

With a common digital triax system, a video picture is captured at a camera head and sent to a transmission path (main line video picture), and the main line video picture is received at a camera control unit and output to a screen. A camera control unit user gives instructions to the camera head user, relating to shooting. The camera head user performs shooting based on the instructions thereof.

The camera control unit also sends a return video picture to the camera head side using another system separate from the main line video picture. This return video picture may be a result of the main line video picture supplied from the camera head being converted, or may be a video picture externally input at the camera control unit. The camera head outputs this return video picture to the screen, for example. The camera head user can confirm, for example, how the shot image shot by himself/herself is received at the camera control unit by referencing the return video picture.

In general, the band of a transmission path between the camera head and camera control unit is limited, and accordingly, a video picture needs to be compressed to send this through the transmission path. For example, in a case wherein a main line video picture to be sent from the camera head toward the camera control unit is HDTV (High Definition Television) signals (current signals are around 1.5 Gbps), it is practical to compress these to around $\frac{1}{10}$, around 150 Mbps. As for such a picture compression method, various compression methods, for example, MPEG (Moving Picture Experts Group) and so forth are available (see Japanese Unexamined Patent Application Publication No. 9-261633).

The above is the basic configuration and operation of the digital triax system. With such a digital triax system, the main line and return line which are transmission paths of a compressed stream are generally configured of a coaxial cable or the like, and the compressed stream is transmitted as a digital signal. Accordingly, it is desirable to transmit a compressed stream generally at a constant bit rate.

With a common encoding method, the bit rate of encoded data obtained by encoding, i.e., encoding rate is changed according to the image content of image data to be encoded (depending on difficulty of encoding). Accordingly, in order to transmit encoded data generally at a constant bit rate, there is the need to temporarily store encoded data obtained by encoding, and read out the encoded data stored in the buffer at a constant bit rate, thereby smoothing the bit rate.

At this time, in order to further stabilize (smooth) the bit rate at the time of transmission of the encoded data, it is desirable to accumulate encoded data in the buffer as much as possible. Also, encoded data is accumulated in the buffer as much as possible, thereby improving compression efficiency as well.

SUMMARY OF THE INVENTION

Note however, there has been a possibility that the more the amount of data to be accumulated in a buffer increases, the more delay time increase. In the case of a digital triax system such as described above, immediacy of data transfer of image data (encoded data) is important. For example, when the delay time of transfer of encoded data from a camera head to a camera control unit increases, there is a possibility that instructions as to a camera head user from a camera control unit user excessively delay, which are performed after confirming a main line video picture. Also, there is a possibility that time lag of a picture viewed by the camera control unit user and camera head user at the same point-in-time increases (i.e., there is a possibility that a different picture is viewed by each other), and the camera head user has difficulty to understand the instructions by the camera control unit user. Further, when great delay is caused at transfer of a return video picture, there is a possibility according to the same reason that the camera head user who attempts to confirm the return video picture thereof has further difficulty to understand the instructions by the camera control unit user.

According to such a reason, particularly in the case of shooting a dynamic subject such as sports relay broadcasting, timing for instructing the camera head user by the camera control unit user is important. That is to say, in the case of a digital triax system such as described above, it is not desirable that delay time unnecessarily increases at the time of data transfer.

Note however, when simply reducing the accumulation amount of encoded data at the buffer, as described above, there is a possibility that the bit rate at the time of transfer will become unstable, and accordingly, deterioration in image quality will increase.

It has been recognized that with data transfer of a content, there is a need to enable not only increase in unnecessary delay time but also unnecessary deterioration in quality as a content to be suppressed readily.

According to an embodiment of the present invention, an information processing device includes: an accumulating unit configured to accumulate encoded data obtained by encoding image data; a reading unit configured to read out the encoded data in data increments; a determining unit configured to determine whether or not a parameter indicating the accumulated state of the encoded data at the accumulating unit satisfies a predetermined accumulation condition; a forbidding unit configured to forbid readout of encoded data to be read out following encoded data being read out by the reading unit in data increments, which serves as a reference, in the case of the determining unit determining that the parameter satisfies the accumulation condition; and a control unit configured to control the reading unit to omit readout of encoded data of which readout is forbidden by the forbidding unit in data increments, and perform readout of encoded data of which readout is not prohibited by the forbidding unit in data increments.

The parameter may include the number of the data increments as to encoded data accumulated in the storing unit, and the determining unit determines whether or not the number of the data increments is equal to or greater than a threshold.

The parameter may include time necessary for the reading unit reading out all of the encoded data accumulated in the accumulating unit, and the determining unit determines whether or not all of the encoded data accumulated in the accumulating means can be read out within the time.

The forbidding unit may forbid readout of encoded data to be read out following encoded data serving as a reference more than the number of data increments necessary for the determining unit determining that the parameter does not satisfy the accumulation condition, which is continuous from the encoded data to be read out following the encoded data serving as reference.

The forbidding unit may delete encoded data following encoded data serving as a reference to forbid readout of the encoded data.

The data increments may be encoding processing increments at the time of encoding the image data.

The data increments may include a line block including the number of lines worth of image data necessary for generating at least one line worth of coefficient data of the lowest band component sub-band, in the case of generating coefficient data divided for each frequency band by subjecting the image data to filter processing hierarchically.

The encoded data may be rearranged for each line block in order executing synthesis processing for synthesizing coefficient data of a plurality of sub-bands divided into frequency bands to generate image data.

The encoded data may be rearranged for each line block in order from lowband components to highband components.

The information processing device may further include: an encoding unit configured to encode the image data to generate the encoded data; a writing unit configured to write encoded data generated by the encoding unit in the storing unit in the data increments; and a packetizing unit configured to packetize the encoded data read out by the reading unit.

The information processing device may further include: a control unit configured to control encoding processing by the encoding unit, writing processing by the writing unit, readout processing by the reading unit, and packetizing processing by the packetizing unit so as to be performed mutually in parallel.

Also, according to an embodiment of the present invention, an information processing method includes the steps of: accumulating encoded data obtained by encoding image data; reading out the encoded data in data increments; determining whether or not a parameter indicating the accumulated state of the encoded data in the accumulating step satisfies a predetermined accumulation condition; forbidding readout of encoded data to be read out following encoded data being read out in the reading step in data increments, which serves as a reference, in the case of determining in the determining step that the parameter satisfies the accumulation condition; and controlling the reading step to omit readout of encoded data of which readout is forbidden in the forbidding step in data increments, and perform readout of encoded data of which readout is not prohibited in the forbidding step in data increments.

With the above configuration, determination is made whether or not a parameter indicating the accumulated state of encoded data in an accumulating unit satisfies a predetermined accumulation condition, and in the case of determination being made that the parameter satisfies the predetermined accumulation condition, and readout of encoded data of which readout is forbidden is omitted in data increments, and readout of encoded data of which readout is not prohibited is performed in data increments.

According to an embodiment of the present invention, an information processing device includes: an accumulating unit configured to accumulate encoded data obtained by encoding image data; a confirming unit configured to confirm loss of encoded data accumulated in the accumulating unit in data increments; a reading unit configured to read out encoded data accumulated in the accumulating unit in data increments, in a case wherein loss of encoded data has not been confirmed by the confirming unit; and a supplementing unit configured to supplement, in a case wherein loss of encoded data has been confirmed by the confirming unit, the encoded data in data increments by outputting substitution data instead of reading the lost encoded data.

The information processing device may further include: a holding unit configured to hold the substitution data, with the supplementing unit reading out the substitution data from the holding unit to output this instead of reading out lost encoded data, in the case of the confirming unit confirming loss of the encoded data.

The information processing device may further include: a holding unit configured to hold the same data as the encoded data accumulated in the accumulating unit in data increments, with the supplementing unit reading out in data increments from the holding unit the same encoded data as the encoded data read out by the reading unit in the past to output this, in the case of the confirming unit confirming loss of the encoded data.

The information processing device may further include: a decoding unit configured to decode the encoded data read out by the reading unit, and the encoded data supplemented by the supplementing unit.

The data increments may include a line block including the number of lines worth of image data necessary for generating at least one line worth of coefficient data of the lowest band component sub-band, in the case of generating coefficient data divided for each frequency band by subjecting the image data to filter processing hierarchically.

The encoded data may be rearranged for each line block in order executing synthesis processing for synthesizing coefficient data of a plurality of sub-bands divided into frequency bands to generate image data.

The encoded data may be rearranged for each line block in order from lowband components to highband components.

Also, according to an embodiment of the present invention, an information processing method includes the steps of: accumulating encoded data obtained by encoding image data; confirming loss of encoded data accumulated in the accumulating step in data increments; reading out encoded data accumulated in the accumulating step in data increments, in a case wherein loss of encoded data has not been confirmed in the confirming step; and supplementing, in a case wherein loss of encoded data has been confirmed in the confirming step, the encoded data in data increments by outputting substitution data instead of reading the lost encoded data.

With the above configuration, loss of encoded data accumulated in an accumulating unit is confirmed in data increments, and in a case wherein loss of encoded data has not been confirmed, encoded data accumulated in the accumulating unit is read out in data increments, and in a case wherein loss of encoded data has been confirmed, the encoded data is supplemented in data increments by outputting substitution data instead of reading the lost encoded data.

According to embodiments of the present invention, data can be transmitted. Particularly, with data transfer of a content, not only increase in unnecessary delay time but also unnecessary deterioration in quality as a content can be suppressed readily.

BRIEF DESCRIPTION OF THE DRAWINGS

FIG. 9 is a diagram for describing change in the amount of code generated at each precinct;

DESCRIPTION OF THE PREFERRED EMBODIMENTS

Figure 1:
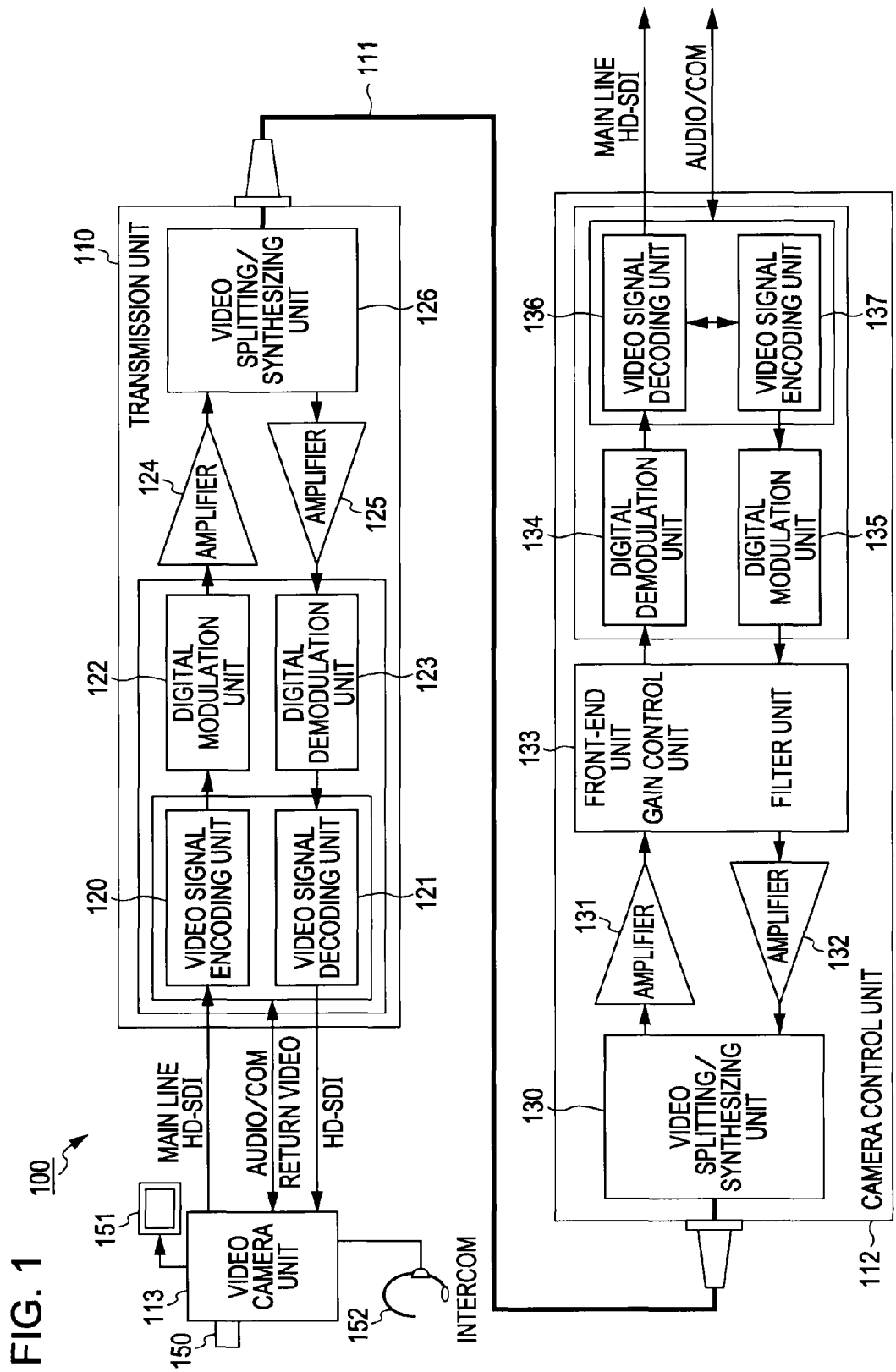
FIG. 1 is a block diagram illustrating a configuration example of a digital triax system to which an embodiment of the present invention has been applied.

FIG. 1 is a block diagram illustrating a configuration example of a digital triax system to which an embodiment of the present invention has been applied. In FIG. 1, a digital triax system 100 is a system employed at a television broadcasting station, production studio, and so forth, and is configured of a transmission unit 110, triax cable 111, camera control unit 112, and so forth.

With content production of a television program or the like such as studio recording, sports relay broadcasting, or the like, there is sometimes employed a system configured of a video camera wherein shooting is performed, and a central control system for recording image data obtained by shooting of the video camera thereof, switching input/output image data, or editing image data.

Multiple video cameras are employed for shooting in a common case. These multiple video cameras are connected to the central control system through the digital triax system 100. Each video camera is operated by a camera operator to capture an image by using an imaging device or the like, and generate image data thereof. The central control system is a system for controlling (managing) contents production, configured of a single or multiple devices, and has functions for contents recording, input/output switching, contents editing, and so forth. This central control system is, for example, operated by a director for giving a shooting instruction, such as a director or the like, or a person who receives an instruction of the director, or the like.

With contents production, the director performs instructions relating to shooting as to a camera operator operating each video camera. Image data shot in accordance with an instruction by the director is supplied to the central control system, and processed.

The digital triax system 100 shown in FIG. 1 is a system for performing exchange such as shooting instructions and contents (video and audio) which is performed between the video camera side and the central control system side. In other words, the above-mentioned video cameras and central control system perform exchange of a content or instruction through the digital triax system 100 shown in FIG. 1.

The digital triax system 100 transmits, for example, image data and audio data obtained by being shot by a video camera to the central control system as main line data (image data is referred to as "main line picture data", audio data is referred to as "main line audio data", and a main line video data image is referred to as "main line video picture".) which is actually broadcasted or employed as a material. Also, the digital triax system 100 transmits, for example, audio data, a control command, or the like, which includes an instruction of the director to a video camera. Further, the digital triax system 100 transmits, for example, main line picture data transmitted from a video camera to the central control system as return picture data (a return picture data image is referred to as a return video picture) which is image data for confirmation.

Next, description will be made regarding the configuration of the digital triax system 100. With this digital triax system 100, the transmission unit 110 and camera control unit 112 are connected through a triax cable 111 which is a coaxial cable.

The transmission unit 110 is a processing unit for performing processing relating to transmission of the video camera side. In FIG. 1, the transmission unit 110 is connected to the video camera unit 113 having a function relating to shooting. The transmission unit 110 may be built in a video camera, or may be connected to a video camera as an external device using a predetermined method. That is to say, an arrangement may be made wherein the video camera unit 113 and transmission unit 110 shown in FIG. 1 are configured as different devices, or the video camera unit 113 and transmission unit 110 are configured as a single device.

The camera control unit 112 is, for example, a processing unit generally called as a CCU (Camera Control Unit), and performs processing relating to transmission at the central control system side. The camera control unit 112 may be built in a predetermined device of the central control system, or may be connected to a predetermined device of the central control system using a predetermined method as an external device as to the central control system.

Note that, in FIG. 1, description will be made assuming that the digital triax system 100 includes not only the transmission unit 110, triax cable 111, and camera control unit 112 but also the video camera unit 113 and the peripheral devices thereof (described later).

Also, in actuality, the video camera unit 113 performs sound collection as well. That is to say, the video camera unit 113 generates not only image data but also audio data. This audio data is transmitted to the camera control unit 112 through the digital triax system 100 as a digital audio signal along with image data. Note however, this audio data has little relationship with the essence of the present invention, so description regarding the audio data will be omitted below as appropriate to avoid complication.

The video camera unit 113 receives light from a subject, which is entered through an optical system 150 including a lens, focus mechanism, zoom mechanism, aperture adjustment mechanism, and so forth, at an unshown imaging device made up of a CCD (Charge Coupled Device) and so forth. The imaging device converts the received light into an electric signal by photoelectric conversion, further subjects this to predetermined signal processing, and outputs the baseband digital video signal (image data). This digital video signal is subjected to mapping to the HD-SDI (High Definition-Serial Data Interface) format, and is output.

Also, the video camera unit 113 is connected with a display unit 151 employed as a monitor, and an intercom 152 for exchanging audio externally.

The transmission unit 110 has a video signal encoding unit 120 and video signal decoding unit 121, digital modulation unit 122 and digital demodulation unit 123, amplifiers 124 and 125, and a video splitting/synthesizing unit 126, and is connected to the video camera unit 113.

Baseband digital video signals (image data) mapped to the HD-SDI format for example, are supplied from the video camera unit 113 to the transmission unit 110. The digital video signals are main line picture data signals (main line digital video signals) which are broadcasted or employed as materials, and are compressed and encoded at the video signal encoding unit 120 to generate encoded data (code stream), which is packetized and supplied to the digital modulation unit 122. The digital modulation unit 122 modulates the supplied code stream into a format suitable for transmission over the triax cable 111, and outputs. The signals output from the digital modulation unit 112 are supplied to the video splitting/synthesizing unit 126 via an amplifier 124. The video splitting/synthesizing unit 126 sends the supplied signals to the triax cable 111. These signals are supplied to the camera control unit 112 via the triax cable 111.

The signals output from the camera control unit 112 are supplied to and received at the transmission unit 110 via the triax cable 111. The received signals are supplied to the video splitting/synthesizing unit 126, and the portion of digital video signals and the portion of other signals are separated. Of the received signals, the portion of the digital video signals is supplied via an amplifier 125 to the digital demodulation unit 123, the signals modulated into a format suitable of transmission over the triax cable 111 are demodulated at the camera control unit 112 side, and the code stream packets are restored.

The code stream packets are supplied to the video signal decoding unit 121. The video signal decoding unit 121 interprets the code stream packets to extract (depacketize) the code stream, decodes the extracted code stream compression coding, and restores the baseband digital video signals. The decoded digital video signals are mapped to the HD-SDI format and output, and supplied to the video camera unit 113 as return picture data signals (referred to as return digital video signals). The return digital video signals are supplied to the display unit 151 connected to the video camera unit 113, and used for monitoring by the camera operator.

Note that an arrangement may be made wherein a main line video picture before transferring to the central control system, which is shot by the video camera unit 113, is also displayed on the display unit 151. However, this main line video picture data is compressed and transferred as described above, so between the picture before transfer and the picture after transfer even which mutually have the same timing frame image differs greatly visually due to deterioration in image quality in some cases. Accordingly, in order that the camera operator can readily understand that the main line picture data has received at the central control system in what kind of state, it is desirable to display the return video picture supplied from the camera control unit 112 side on the display unit 151.

Following the main line picture being transferred to the central control system, with the central control system, the main line picture data is recorded, edited, of which the image is displayed on the monitor, or output to an external device. That is to say, the main line picture data is used at the central control system, so it is desirable for the camera operator to perform shooting while understanding the state of the image at the time of use. For example, it can be conceived that a subject which can be visually recognized at the main line video picture before transfer cannot be visually recognized at the main line video picture after transfer due to deterioration in image quality. The return video picture is displayed on the display unit 151, whereby the camera operator can readily understand that the subject cannot be visually recognized due to deterioration in image quality, and accordingly, a shooting method can be changed so as to visually recognize the subject thereof even after transfer.

Also, the director who operates the central control system performs an instruction relating to shooting as to the camera operator while confirming the main line video picture, but at this time, when the image confirmed by the camera operator and the image confirmed by the director differ mutually, there is a possibility that the camera operator cannot understand the meaning of the instruction from the director. Accordingly, the return video picture which is supplied from the camera control unit 112 side is displayed on the display unit 151, whereby the camera operator can readily understand the instruction which the director has issued based on what kind of image, and accordingly, can understand the meaning of the instruction from the director more correctly.

The cameral control unit 112 has a video splitting/synthesizing unit 130, amplifiers 131 and 132, a front-end unit 133, a digital demodulation unit 134 and digital modulation unit 135, and a video signal decoding unit 136 and video signal encoding unit 137.

Signals output from the transmission unit 110 are supplied to and received at the camera control unit 112 via the triax cable 111. The received signals are supplied to the video splitting/synthesizing unit 130. The video splitting/synthesizing unit 130 supplies the signals supplied thereto to the digital demodulation unit 134 via the amplifier 131 and front-end unit 133. Note that the front-end unit 133 has a gain control unit for adjusting gain of input signals, a filter unit for performing predetermined filter processing on input signals, and so forth.

The digital demodulation unit 134 demodulates the signals modulated into a format suitable of transmission over the triax cable 111 at the transmission unit 110 side, and restores the code stream packets. The code stream packets are supplied to the video signal decoding unit 136. The video signal decoding unit 136 interprets the code stream packets to extract (depacketize) the code stream in the same way as with the video signal decoding unit 121, decodes the compression encoding of the extracted code stream, and restores the baseband digital video signals. The decoded digital video signals are mapped to the HD-SDI format and output, and output to an external central control system as main line digital video signals, where the picture is displayed on a monitor, or edited, for example.

The digital audio signals are supplied externally to the camera control unit 112. The digital audio signals are supplied to the intercom 152 of the camera operator for example, to be used for propagating audio instructions from the director to the camera operator. The video signal decoding unit 136 also supplies the decoded digital video signal to the video signal encoding unit 137 as return digital video signals. The video signal encoding unit 137 compresses and encodes the baseband digital video signals supplied from the video signal decoding unit 136 in the same way as with the video signal encoding unit 120, packetizes the obtained encoded data (code stream), and supplies the packets thereof to the digital modulation unit 135.

The digital modulation unit 135 modulates the supplied code stream into signals of a format suitable for transmission over the triax cable 111, and outputs. The signals output from the digital modulation unit 135 are supplied to the video splitting/synthesizing unit 130 via the front-end unit 133 and amplifier 132. The video splitting/synthesizing unit 130 multiplexes these signals with other signals, and sends out to the triax cable 111. The signals are supplied to the transmission unit 110 via the triax cable 111 as return digital video signals.

Immediacy (real-time nature) at the time of data transmission is demanded of such a digital triax system 100. For example, the director performs instructions as to the camera operator while referring to the main video picture transferred from the video camera unit 113, so when delay time increases since main line picture data is generated at the video camera unit 113 until the main line picture data is transmitted by the digital triax system 100 and an image is displayed at the central control system, there is a possibility that instructions from the director to the camera operator delay excessively. Further, when delay time increases since the main line picture data transferred to the camera control unit 112 from the transmission unit 110 is transferred to the transmission unit 110 again until the image thereof (main line video picture) is displayed on the display unit 151, there is a possibility that the timing of the instructions performed based on the main line video picture is not identical to the timing of a return video picture, and the camera operator has difficulty to understand the meaning of the instructions thereof.

According to the reasons such as described above, particularly in the case of shooting a dynamic subject such as a sports relay broadcasting, the timing of the instructions as to the camera head user from the camera control unit user is important. That is to say, with the digital triax system 100, it is desirable to reduce the delay time of data transmission as much as possible.

Therefore, the video signal encoding unit 120 and video signal encoding unit 137 are configured so as to encode image data with less delay, as described later. Also, the video signal encoding unit 120 and video signal encoding unit 137 are configured so as to decode encoded data with less delay. However, there has been demand for further reduction of delay time other than encoding processing and decoding processing.

Incidentally, with the digital triax system 100, the band of the transmission path is limited, so it is desirable to transmit encoded data generally at a constant bit rate. For example, with the digital triax system 100, when assuming that the band width of each of the main line which is a line where the encoded data of main line picture data is transmitted, and the return line where the encoded data of return picture data is 150 Mbps, the video signal encoding unit 120 and video signal encoding unit 137 need to compress the main line picture data and return picture data to a 150-Mbps bit rate.

Note however, in general, compressive difficulty differs depending on a picture (field in the case of an image according to an interlace method, frame in the cased of an image according to a progressive method) making up image data, so the amount of generated code is likely to fluctuate for each picture.

Therefore, the video signal encoding unit 120 and video signal encoding unit 137 accumulate the encoded data generated by encoding in the buffer so as to stabilize the bit rate (transmission rate) at the time of transmitting the encoded data, read out the encoded data from the buffer thereof at a predetermined bit rate, and transmit this, thereby smoothing the transmission rate. The more the capacity of this buffer, i.e., the amount of data to be accumulated in the buffer increases, the more the video signal encoding unit 120 and video signal encoding unit 137 can transmit encoded data in a stable manner. That is to say, the more the amount of data to be accumulated in the buffer increases, the more the video signal encoding unit 120 and video signal encoding unit 137 can transmit encoded data generally at a constant transmission rate even if the amount of generated code fluctuates with greater width.

However, the more the amount of data to be accumulated in the buffer increases, the more delay time necessary for transmission increases. Accordingly, the video signal encoding unit 120, video signal decoding unit 121, video signal encoding unit 136, and video signal encoding unit 137, as described later, perform smoothing processing and reception processing so as to suppress increase in unnecessary delay time, and also so as to suppress unnecessary deterioration in quality as contents.

Note that, in FIG. 1, description has been made wherein the triax cable 111 is a coaxial cable, but any transmission medium may be employed as long as this medium is capable of transmitting encoded data, so may be a wired cable or wireless cable, or may include both of wired and wireless cables. Also, a single or multiple networks may be included therein.

Also, in FIG. 1, the transmission unit 110 and camera control unit 112 are illustrated so as to be connected one-on-one, but it goes without saying that the multiple transmission units 110 may be connected to the single camera control unit 112.

Figure 2:
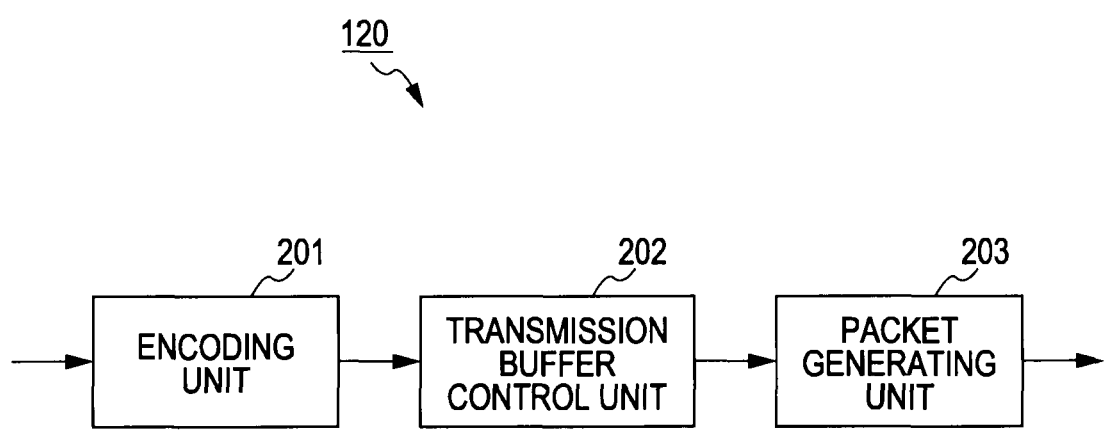
FIG. 2 is a block diagram illustrating a detailed configuration example of a video signal encoding unit shown in FIG. 1.

Next, description will be made regarding the details of each unit. FIG. 2 is a block diagram illustrating a configuration example of the video signal encoding unit 120 shown in FIG. 1. Note that the video signal encoding unit 137 shown in FIG. 1 has the same configuration as that of the video signal encoding unit 120, and performs the same processing, so description as to the video signal encoding unit 120 can be applied. Accordingly, in order to simplify description, the description of the video signal encoding unit 137 will be omitted except for necessary cases.

In FIG. 2, the video signal encoding unit 120 includes an encoding unit 201, transmission buffer control unit 202, and packet generating unit 203.

The encoding unit 201 encodes the main line picture data supplied from the video camera unit 113 using a predetermined encoding method, and supplies the obtained encoded data to the transmission buffer control unit 202. The transmission buffer control unit 202 accumulates the supplied encoded data in a built-in buffer thereof, reads out the encoded data thereof at a predetermined bit rate, and supplies this to the packet generating unit 203, thereby smoothing the transmission rate of the encoded data. The packet generating unit 203 packetizes the encoded data supplied from the transmission buffer control unit 202 by adding header information thereto for each of predetermined data increment. The packet generating unit 203 supplies the encoded data packets thus generated to the digital modulation unit 122 as main line picture data.

At this time, the transmission buffer control unit 202 subjects the transmission rate of the encoded data to smoothing using a method capable of readily suppressing increase in unnecessary delay time, and suppressing unnecessary deterioration in quality as contents, regarding which details will be described later.

Note that in the case of the video signal encoding unit 137, the encoding unit 201 encodes the return picture data supplied from the video signal decoding unit 136, the packet generating unit 203 packetizes the encoded data supplied from the transmission buffer control unit 202, and supplies the packets thereof to the digital modulation unit 135 as return picture data.

Figure 3:
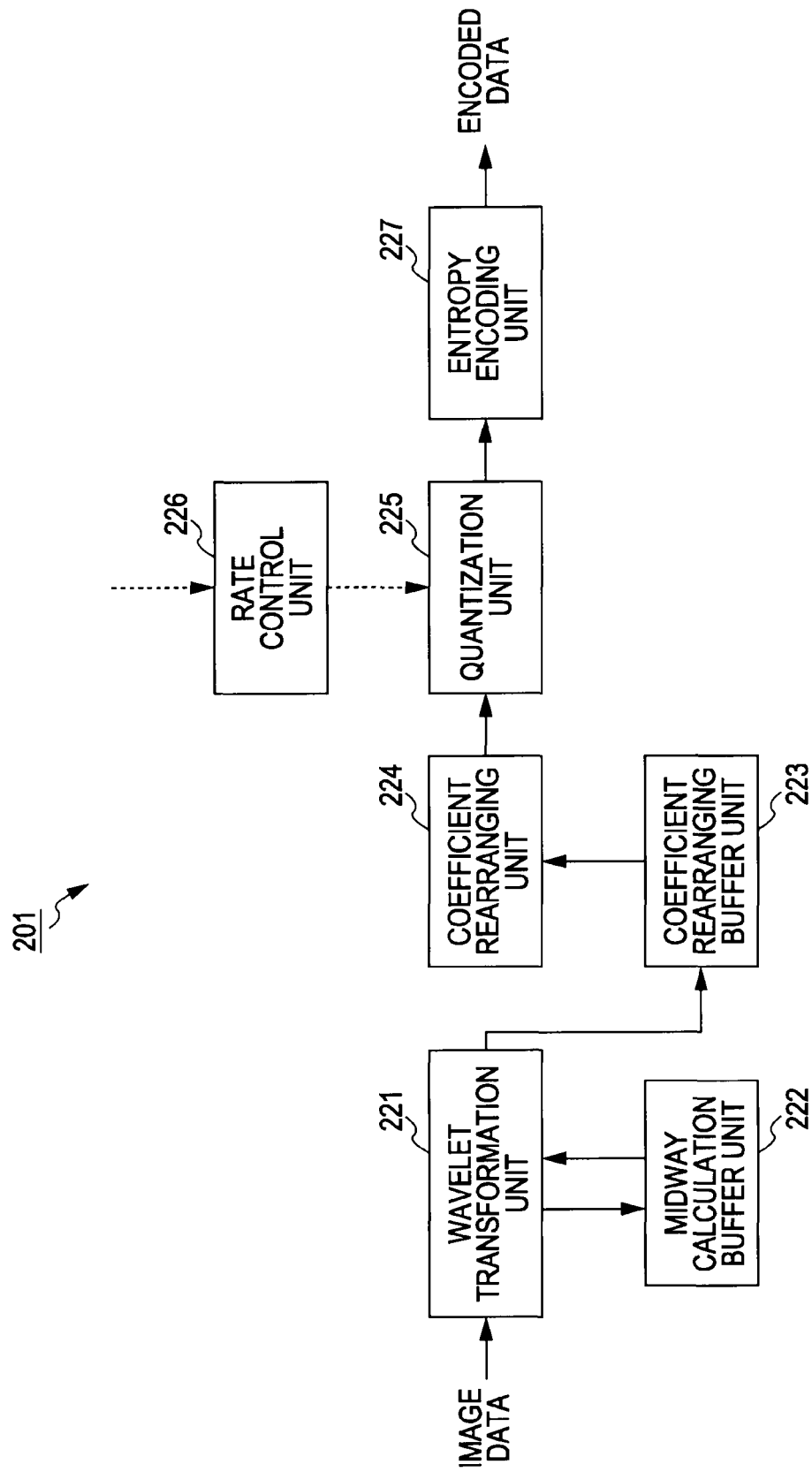
FIG. 3 is a block diagram illustrating a detailed configuration example of the encoding unit shown in FIG. 2.

FIG. 3 is a block diagram illustrating a detailed configuration example of the encoding unit 201 shown in FIG. 2. In FIG. 3, the encoding unit 201 includes a wavelet transformation unit 221, midway calculation buffer unit 222, coefficient rearranging buffer unit 223, coefficient rearranging unit 224, quantization unit 225, rate control unit 226, and entropy encoding unit 227.

The image data input to the encoding unit 201 is temporarily stored in the midway calculation buffer unit 222 via the wavelet transformation unit 221. The wavelet transformation unit 221 subjects the image data stored in the midway calculation buffer unit 222 to wavelet transformation. That is to say, the wavelet transformation unit 221 reads out the image data from the midway calculation buffer unit 222, subjects this to filter processing using an analysis filter to generate the coefficient data of lowband components and highband components, and stores the generated coefficient data in the midway calculation buffer unit 222. The wavelet transformation unit 221 includes a horizontal analysis filter and vertical analysis filter, and subjects an image data group to analysis filter processing regarding both of the screen horizontal direction and screen vertical direction. The wavelet transformation unit 221 reads out the coefficient data of the lowband components stored in the midway calculation buffer unit 222 again, subjects the read coefficient data to filter processing using the analysis filter to further generate the coefficient data of highband components and lowband components. The generated coefficient data is stored in the midway calculation buffer unit 222.

The wavelet transformation unit 221 repeats this processing, and when the division level reaches a predetermined level, reads out the coefficient data from the midway calculation buffer unit 222, and writes the read coefficient data in the coefficient rearranging buffer unit 223.

The coefficient rearranging unit 224 reads out the coefficient data written in the coefficient rearranging buffer unit 223 in a predetermined order, and supplies this to the quantization unit 225.

The rate control unit 226 calculates a quantization step size employed for quantization processing performed at the quantization unit 225 so as to externally specify the code amount (the data amount of encoded data to be generated) generated at the entropy encoding unit 227, or so as to be suitable (identical or approximate) to a predetermined target code amount, and supplies instruction information for specifying the quantization step size thereof to the quantization unit 225.

The quantization unit 225 quantizes the coefficient data supplied from the coefficient rearranging unit 224 with the quantization step size specified by the specification information supplied from the rate control unit 226 in the supplied order thereof, and supplies this to the entropy encoding unit 227. The entropy encoding unit 227 encodes the supplied coefficient data using a predetermined entropy encoding method such as Huffman encoding, arithmetic coding, or the like, for example to generate encoded data. The entropy encoding unit 227 supplies the generated encoded data to the transmission buffer control unit 202 shown in FIG. 2.

Figure 4:
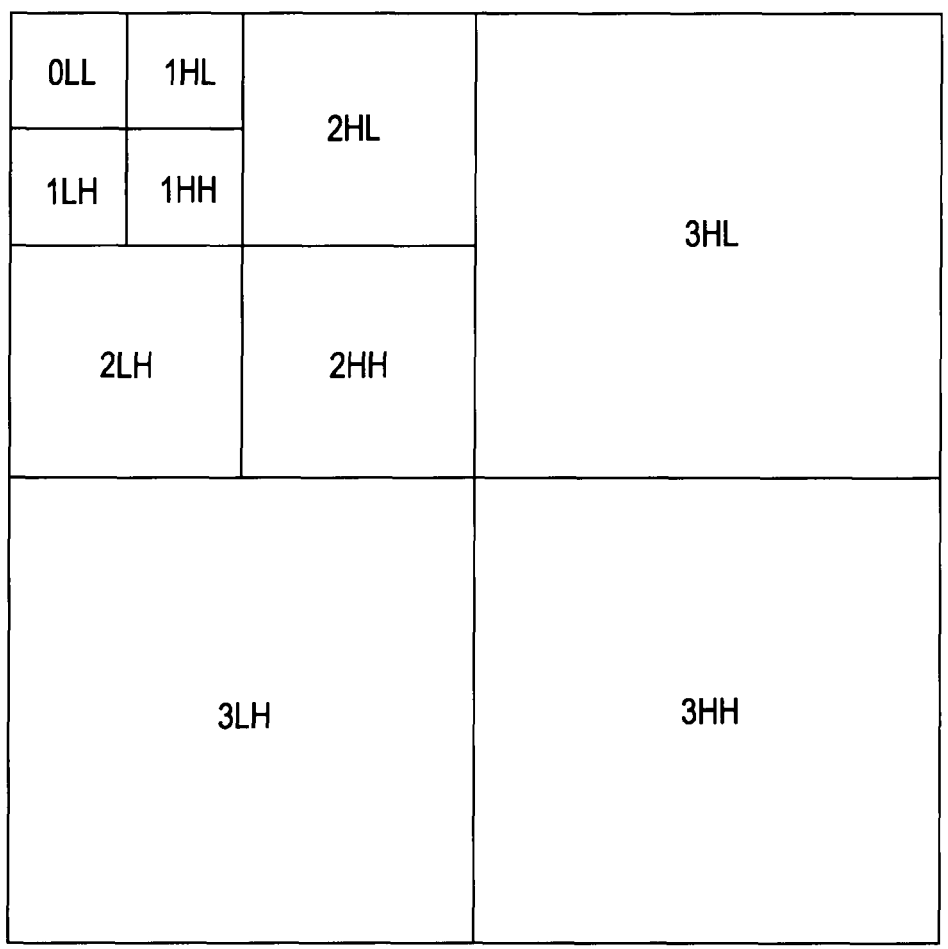
FIG. 4 is a schematic drawing for schematically describing wavelet transformation.

Next, description will be made in more detail regarding the processing performed by the wavelet transformation unit 221 shown in FIG. 3. First, wavelet transformation will be described schematically. With wavelet transformation as to image data, as schematically illustrated in FIG. 4, processing for dividing image data into a high spatial frequency band and a low spatial frequency band is repeated recursively as to a low spatial frequency band obtained as a result of division. Thus, low spatial frequency band data is driven into a smaller region, thereby enabling effective compression encoding.

Now, FIG. 4 is an example of a case wherein dividing processing of the lowest band component region of image data into lowband component regions L and highband component regions H is repeated three times, thereby obtaining division level=3. In FIG. 4, "L" and "H" represent a lowband component and highband component respectively, and with regard to the order of "L" and "H", the front side indicates a band which is a division result in the horizontal direction, and the rear side indicates a band which is a division result in the vertical direction. Also, a numeral before "L" and "H" indicates the division level of the region thereof.

Also, as can be understood from the example shown in FIG. 4, the processing is performed in a stepwise manner from the right lower region to the left upper region of the screen, thereby driving lowband components into a small region. That is to say, with the example shown in FIG. 4, the right lower region of the screen is set to a region 3HH including the least lowband components (including the most highband components), and the left upper region obtained by the screen being divided into four regions is further divided into four regions, and of the four divided regions, the left upper region is further divided into four regions. The leftmost upper corner region is set to a region 0LL including the most lowband components.

Figure 5A:
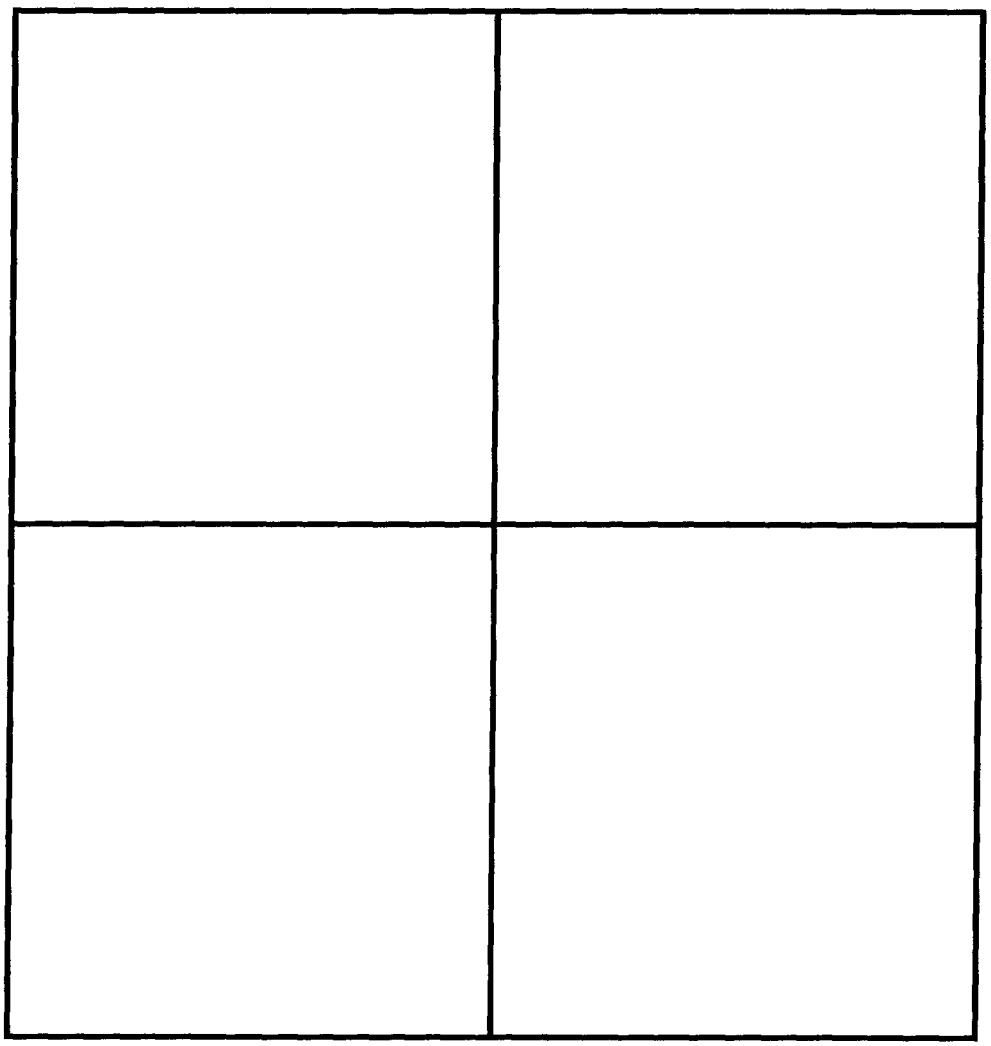
FIG. 5 is a schematic drawing for schematically describing wavelet transformation.
Figure 5B:
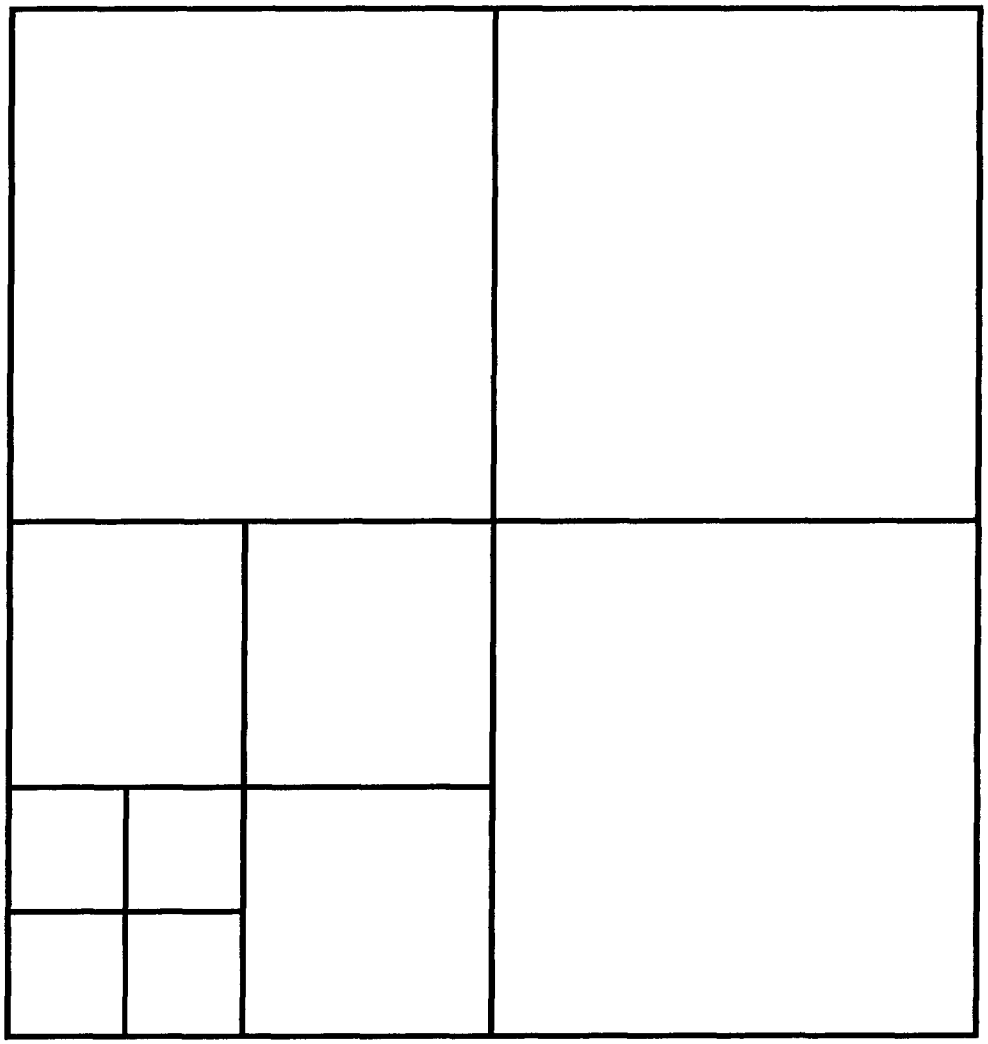

The reason why conversion and division are repeatedly performed as to lowband components is because the energy of the screen concentrates on lowband components. This can also be understood from a situation wherein as the division level is advanced from a state of division level=1 of which an example is shown in FIG. 5A to a state of division level=3 of which an example is shown in FIG. 5B, sub-bands are formed such as shown in FIG. 5B. For example, the division level of wavelet transformation shown in FIG. 4 is 3, and as a result thereof, ten sub-bands are formed.

The wavelet transformation unit 221 usually performs the processing such as described above using a filter bank made up of a lowband filter and highband filter. Note that a digital filter usually has impulse response of multiple tap lengths, i.e., a filter coefficient, so there is usually the need to subject input image data or coefficient data to buffering as much as filter processing can be performed beforehand. Also, similarly, even in a case wherein wavelet transformation is performed with multiple stages, there is the need to subject the wavelet transformation coefficient generated at the previous stage to buffering as much as filter processing can be performed.

A method employing a 5×3 filter will be described as a specific example of wavelet transformation. This method employing a 5×3 filter is also employed with JPEG (Joint Photographic Experts Group) 2000 standard already described in the Related Art, and is an excellent method in that wavelet transformation can be performed with few filter taps.

Impulse response of a 5×3 filter (Z transform expression) is, as shown in the following Expressions (1) and (2), configured of a lowband filter $H_0(z)$ and a highband filter $H_1(z)$. According to Expressions (1) and (2), it can be found that the lowband filter $H_0(z)$ is five taps, and the highband filter $H_1(z)$ is three taps.

$$H_0(z) = (-1 + 2z^{-1} + 6z^{-2} + 2z^{-3} - z^{-4})/8 \quad (1)$$

$$H_1(z) = (-1 + 2z^{-1} - z^{-2})/2 \quad (2)$$

According to these Expressions (1) and (2), the coefficients of lowband components and highband components can be calculated directly. Here, employing a lifting technique enables computation of filter processing to be reduced.

Figure 6:
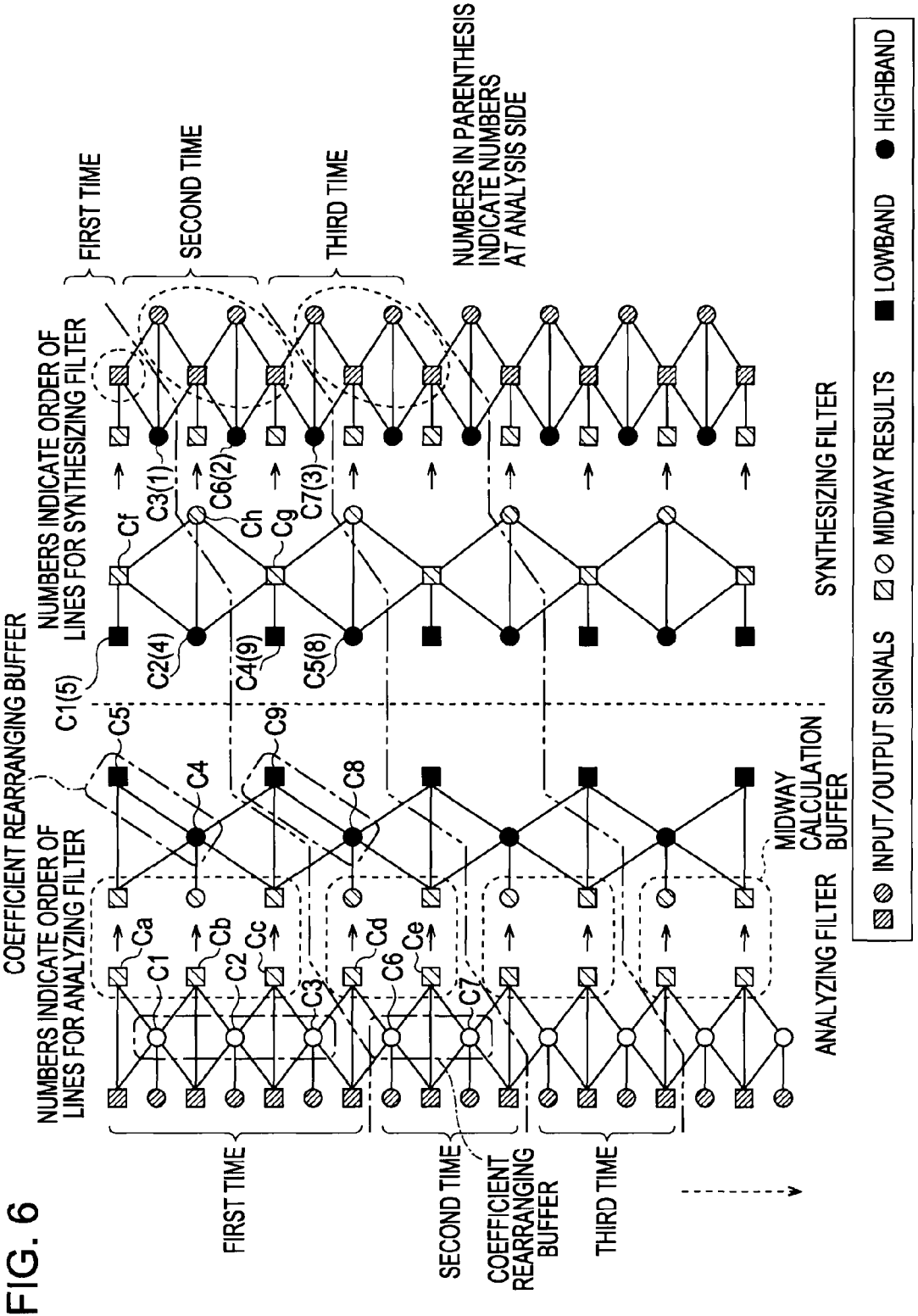
FIG. 6 is a schematic drawing illustrating an example of performing filtering by lifting with a 5×3 filter, to division level=2.

Next, this wavelet transformation method will be described more specifically. FIG. 6 is illustrates an example wherein filter processing according to lifting of a 5×3 filter is executed up to division level=2. Note that, in FIG. 6, the portion shown as analysis filters at the left side of the drawing is the filters of the wavelet transformation unit 221 in the encoding unit 201. Also, the portion shown as synthesis filters at the right side of the drawing is the filters of a later-described wavelet inverse transformation unit 484 (FIG. 22) in a later-described decoding unit 403.

Note that with the following description, for example, let us say that with the pixel of the left upper corner of the screen as the head at a display device or the like, pixels are scanned from the left edge to the right edge of the screen, thereby making up one line, and scanning for each line is performed from the upper edge to the lower edge of the screen, thereby making up one screen.

In FIG. 6, the left edge column illustrates that pixel data disposed at corresponding positions on the line of original image data is arrayed in the vertical direction. That is to say, the filter processing at the wavelet transformation unit 221 is performed by pixels on the screen being scanned vertically using a vertical filter. The first through third columns from the left edge illustrate division level=1 filter processing, and the fourth through sixth columns illustrate division level=2 filter processing. The second column from the left edge illustrates highband component output based on the pixels of the original image data of the left edge, and the third column from the left edge illustrates lowband component output based on the original image data and highband component output. The division level=2 filter processing is performed as to the output of the division level=1 filter processing, such as shown in the fourth through sixth columns from the left edge.

With the division level=1 filter processing, highband component coefficient data is calculated based on the pixels of the original image data as a first stage of the filter processing, lowband component coefficient data is calculated based on the highband component coefficient data calculated at the first stage of the filter processing, and the pixels of the original image data. An example of the division level=1 filter processing is illustrated at the first through third columns at the left side (analysis filter side) in FIG. 6. The calculated highband component coefficient data is stored in the coefficient rearranging buffer unit 223 described with reference to FIG. 3. Also, the calculated lowband component coefficient data is stored in the midway calculation buffer unit 222.

In FIG. 6, the data surrounded with single dot broken lines is temporarily saved in the coefficient rearranging buffer unit 223, and the data surrounded with dotted lines is temporarily saved in the midway calculation buffer unit 222.

The division level=2 filter processing is performed based on the results of the division level=1 filter processing held at the midway calculation buffer unit 222. With the division level=2 filter processing, the coefficient data calculated as lowband coefficients at the division level=1 filter processing is regarded as coefficient data including lowband components and highband components, the same filter processing as that of the division level=1 filter processing is performed. The highband component coefficient data and lowband component coefficient data calculated by the division level=2 filter processing is stored in the coefficient rearranging buffer unit 223 described with reference to FIG. 3.

With the wavelet transformation unit 221, the filter processing such as described above is performed each in the horizontal direction and vertical direction of the screen. For example, first, the division level=1 filter processing is performed in the horizontal direction, and the generated coefficient data of highband components and lowband components is stored in the midway calculation buffer unit 222. Next, the coefficient data stored in the midway calculation buffer unit 222 is subjected to the division level=1 filter processing in the vertical direction. According to the processing in the horizontal and vertical directions at the division level=1, there are formed four regions of a region HH and region HL obtained by further dividing highband components into highband components and lowband components, and a region LH and region LL obtained by further dividing lowband components into highband components and lowband components.

Subsequently, at the division level=2, the lowband component coefficient data generated at the division level=1 is subjected to filter processing regarding each of the horizontal direction and vertical direction. That is to say, at the division level=2, the region LL formed by being divided at the division level=1 is further divided into four regions, a region HH, region HL, region LH, and region LL are formed within the region LL.

The wavelet transformation unit 221 is configured so as to perform filter processing according to wavelet transformation in a stepwise manner by dividing the filter processing into processing in increments of several lines regarding the vertical direction of the screen, i.e., dividing into multiple times. With the example shown in FIG. 6, at first processing equivalent to processing from the first line on the screen, seven lines are subjected to filter processing, and at second processing and on equivalent to processing from the eighth line, filter processing is performed every four lines. The number of lines is based on the number of lines necessary for generating one line worth of the lowest band components after the region is divided into two of highband components and lowband components.

Note that, hereafter, a line group including other sub-bands, which is necessary for generating one line worth of the lowest band components (one line worth of coefficient data of the lowest band component sub-band), will be referred to as a precinct (or line block). Here, a line indicates one row worth of pixel data or coefficient data formed within a picture, field, or each sub-band corresponding to the image data before wavelet transformation. That is to say, a precinct (line block) indicates, with the original image data before wavelet transformation, a pixel data group equivalent to the number of lines necessary for generating one line worth of the lowest band component sub-band coefficient data after wavelet transformation, or a coefficient data group of each sub-band obtained by subjecting the pixel data group thereof to wavelet transformation.

According to FIG. 6, a coefficient C5 obtained as a filter processing result at the division level=2 is calculated based on a coefficient C4 and a coefficient $C_a$ stored in the midway calculation buffer unit 222, and a coefficient C4 is calculated based on the coefficient $C_a$, coefficient $C_b$, and coefficient $C_c$ stored in the midway calculation buffer unit 222. Further, the coefficient $C_c$ is calculated based on the coefficient C2 and coefficient C3 stored in the coefficient rearranging buffer unit 223, and the pixel data of the fifth line. Also, the coefficient C3 is calculated based on the pixel data of the fifth through seventh lines. Thus, in order to obtain the coefficient C5 which is a lowband component at the division level=2, the pixel data of the first through seventh lines is needed.

On the other hand, with the second filter processing and on, the coefficient data already calculated at the filter processing so far and stored in the coefficient rearranging buffer unit 223 can be employed, so necessary number of lines can be suppressed to small.

That is to say, according to FIG. 6, of the lowband component coefficients obtained as filter processing results at the division level=2, a coefficient C9, which is the next coefficient of the coefficient C5, is calculated based on the coefficient C4 and coefficient C8, and the coefficient $C_c$ stored in the midway calculation buffer unit 222. The coefficient C4 has been already calculated at the above-mentioned first filter processing, and stored in the coefficient rearranging buffer unit 223. Similarly, the coefficient $C_c$ has been already calculated at the above-mentioned first filter processing, and stored in the midway calculation buffer unit 222. Accordingly, with the second filter processing, only the filter processing to calculate the coefficient C8 is newly performed. This new filter processing is performed further using the eighth line through eleventh line.

Thus, with the second filter processing and on, the data calculated at the filter processing so far and stored in the midway calculation buffer unit 222 and coefficient rearranging buffer unit 223 can be employed, whereby each processing can be suppressed to processing every four lines.

Note that in a case wherein the number of lines on the screen is not identical to the number of lines for encoding, the lines of the original image data are copied using a predetermined method so as to match the number of lines for encoding, thereby performing filter processing.

Thus, the filter processing whereby one line worth of the lowest band component coefficient data can be obtained is performed in a stepwise manner by being divided into multiple times (in increments of precinct) as to the lines of the entire screen, whereby a decoded image can be obtained with low delay at the time of sending encoded data.

In order to perform wavelet transformation, a first buffer employed for executing wavelet transformation itself, and a second buffer for storing coefficients generated until a predetermined division level is obtained are needed. The first buffer corresponds to the midway calculation buffer unit 222, and the data surrounded with the dotted lines in FIG. 6 is temporarily stored therein. Also, the second buffer corresponds to the coefficient rearranging buffer unit 223, and the data surrounded with the single dot broken lines in FIG. 6 is temporarily stored therein. The coefficients stored in the second buffer are employed at the time of decoding, so these are to be subjected to entropy encoding processing of the subsequent stage.

The processing of the coefficient rearranging unit 224 will be described. As described above, the coefficient data calculated at the wavelet transformation unit 221 is stored in the coefficient rearranging buffer unit 223, the order thereof is rearranged by the coefficient rearranging unit 224, and the rearranged coefficient data is read out and sent to the quantization unit 225.

As already described above, with wavelet transformation, coefficients are generated from the highband component side to the lowband component side. In the example in FIG. 6, at the first time, the highband component coefficient C1, coefficient C2, and coefficient C3 are sequentially generated at the division level=1 filter processing, from the pixel data of the original image. The division level=2 filter processing is then performed as to the lowband component coefficient data obtained at the division level=1 filter processing, whereby lowband component coefficient C4 and coefficient C5 are sequentially generated. That is to say, the first time, coefficient data is generated in the order of coefficient C1, coefficient C2, coefficient C3, coefficient C4, and coefficient C5.

The generating order of the coefficient data is always in this order (the order from highband to lowband) based on the principle of wavelet transformation.

Conversely, on the decoding side, in order to immediately decode with low delay, generating and outputting an image from lowband components is necessary. Therefore, rearranging the coefficient data generated on the encoding side from the lowest band component side to the highband component side and supplying this to the decoding side is desirable.

Further detailed description will be given with reference to FIG. 6. The right side of FIG. 6 shows a synthesizing filter side performing wavelet inverse transformation. The first-time synthesizing processing (wavelet inverse transformation processing) including the first line of output image data on the decoding side is performed employing the lowest band component coefficient C4 and coefficient C5, and coefficient C1, generated at the first-time filter processing on the encoding side.

That is to say, with the first-time synthesizing processing, coefficient data is supplied from the encoding side to the decoding side in the order of coefficient C5, coefficient C4, and coefficient C1, whereby on the decoding side, synthesizing processing as to the coefficient C5 and coefficient C4 are performed to generate the coefficient $C_f$, by synthesizing level=2 processing which is synthesizing processing corresponding to the division level=2, and stores the coefficient $C_f$ in the buffer. Synthesizing processing as to the coefficient $C_f$ and the coefficient C1 is then performed with the synthesizing level=1 processing which is synthesizing processing corresponding to the division level=1, whereby the first line is output.

Thus, with the first-time synthesizing processing, the coefficient data generated on the encoding side in the order of coefficient C1, coefficient C2, coefficient C3, coefficient C4, and coefficient C5 and stored in the coefficient rearranging buffer unit 223 is rearranged to the order of coefficient C5, coefficient C4, coefficient C1, and so forth, and supplied to the decoding side.

Note that with the synthesizing filter side shown on the right side of FIG. 6, the coefficients supplied from the encoding side are referenced with a number of the coefficient on the encoding side in parentheses, and shows the line number of the synthesizing filter outside the parentheses. For example, coefficient C1 (5) shows that on the analysis filter side on the left side of FIG. 6 this is coefficient C5, and on the synthesizing filter side is on the first line.

The synthesizing processing at the decoding side by the coefficient data generated with the second-time filter processing and thereafter on the encoding side can be performed employing coefficient data supplied from the synthesizing in the event of synthesizing processing from the previous time or from the encoding side. In the example in FIG. 6, the second-time synthesizing processing on the decoding side which is performed employing the lowband component coefficient C8 and coefficient C9 generated with the second-time filter processing on the encoding side further requires coefficient C2 and coefficient C3 generated at the first-time filter processing on the encoding side, and the second line through the fifth line are decoded.

That is to say, with the second-time synthesizing processing, coefficient data is supplied from the encoding side to the decoding side in the order of coefficient C9, coefficient C8, coefficient C2, coefficient C3. On the decoding side, with the synthesizing level=2 processing, a coefficient $C_g$ is generated employing coefficient C8 and coefficient C9, and coefficient C4 supplied from the encoding side at the first-time synthesizing processing, and the coefficient $C_g$ is stored in the buffer.

A coefficient $C_h$ is generated employing the coefficient $C_g$ and the above-described coefficient C4, and coefficient $C_f$ generated by the first-time synthesizing process and stored in the buffer, and the coefficient $C_h$ is stored in the buffer.

With the synthesizing level=1 processing, synthesizing processing is performed employing the coefficient $C_g$ and coefficient $C_h$ generated at the synthesizing level=2 processing and stored in the buffer, the coefficient C2 supplied from the encoding side (shows as coefficient C6 (2) with the synthesizing filter), and coefficient C3 (shows as coefficient C7 (3) with the synthesizing filter), and the second line through fifth line are decoded.

Thus, with the second-time synthesizing processing, the coefficient data generated on the encoding side in the order of coefficient C2, coefficient C3, (coefficient C4, coefficient C5), coefficient C6, coefficient C7, coefficient C8, coefficient C9 is rearranged and supplied to the decoding side in the order of coefficient C9, coefficient C8, coefficient C2, coefficient C3, and so forth.

Thus, with the third synthesizing processing and thereafter as well, similarly, the coefficient data stored in the coefficient rearranging buffer unit 223 is rearranged in a predetermined order and supplied to the decoding unit, wherein the lines are decoded in four-line increments.

Note that with the synthesizing processing on the decoding side corresponding to the filter processing including the lines at the bottom end of the screen on the encoding side, the coefficient data generated up to then and stored in the buffer are all to be output, so the number of output lines increases. With the example in FIG. 6, eight lines are output during the last time.

Note that the rearranging processing of coefficient data by the coefficient rearranging unit 224 sets the readout addresses in the event of reading the coefficient data stored in the coefficient rearranging buffer unit 223, for example, into a predetermined order.

Figure 7A:
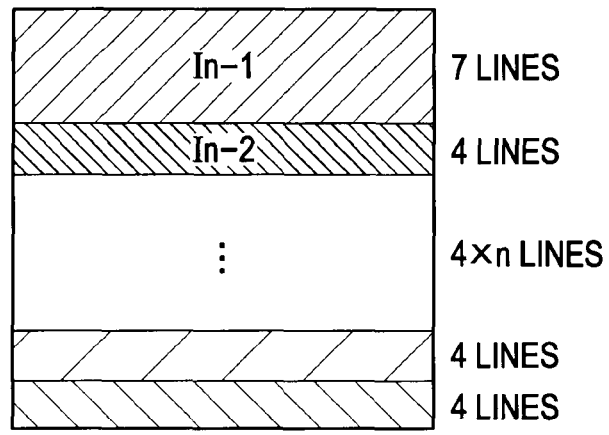
FIG. 7 is a schematic drawing schematically illustrating the flow of wavelet transformation and wavelet inverse transformation according to the present invention.

The above processing will be described in further details with reference to FIG. 7. FIG. 7 is an example of performing filter processing by wavelet transformation up to the division level=2, employing a 5×3 filter. With the wavelet transforming unit 221, as one example is shown in FIG. 7A, the first-time filter processing is performed on the first line through the seventh line of the input image data in each of the horizontal and vertical directions (In-1 in FIG. 7A).

Figure 7B:
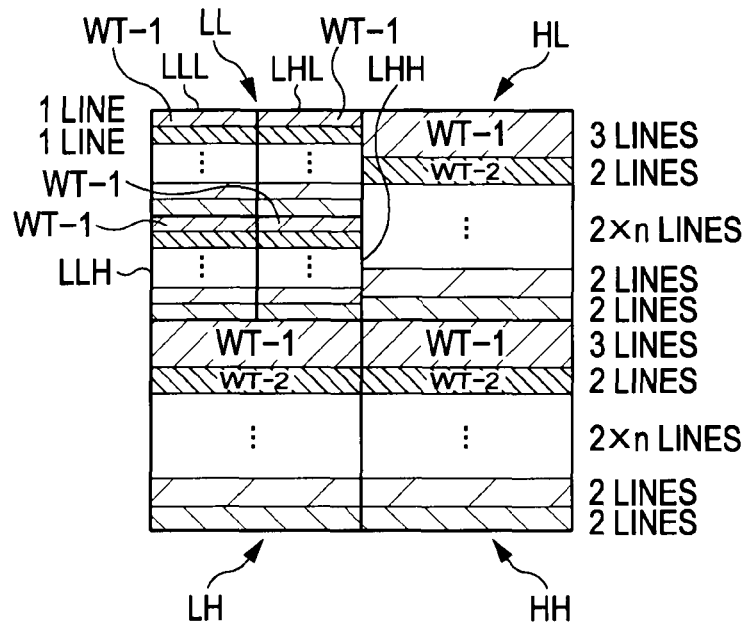

With the division level=1 processing of the first-time filter processing, the coefficient data for three lines worth of the coefficient C1, coefficient C2, and coefficient C3 is generated, and as one example shows in FIG. 7B, are each disposed in the region HH, region HL, and region LH formed with the division level=1 (WT-1 in FIG. 7B).

Also, the region LL formed with the division level=1 is further divided into four (regions LLL, LLH, LHL, and LHH) with the filter processing in the horizontal and vertical directions by the division level=2. With the coefficient C5 and coefficient C4 generated with the division level=2, one line is disposed in the region LLL by the coefficient C5 within the region LL by the division level=1, and one line is disposed in each of the region LHH, region LHL, and region LLH, by coefficient C4.

With the second-time filter processing and thereafter by the wavelet transformation unit 221, filter processing is performed in increments of four lines (In-2 . . . in FIG. 7A), coefficient data is generated in increments of two lines at the division level=1 (WT-2 in FIG. 7B) and coefficient data is generated in increments of one line at the division level=2.

With the example of the second time in FIG. 6, coefficient data worth two lines of the coefficient C6 and coefficient C7 is generated at the division level=1 filter processing, and as one example is shown in FIG. 7B, and is disposed following the coefficient data which is generated at the first-time filter processing of the region HH, region HL, and region LH formed with the division level=1. Within the region LL by the division level=1, the coefficient C9 worth one line generated with the division level=2 filter processing is disposed in the region LLL, and the coefficient C8 worth one line is disposed in each of region LHH, region LHL, and region LLH.

Figure 7C:
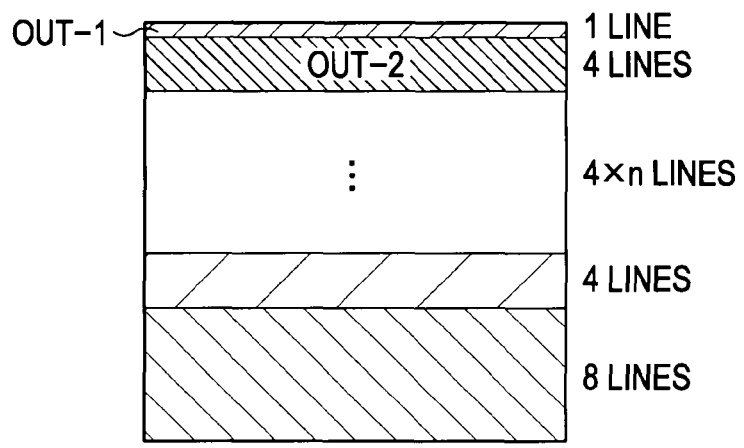

In the event of decoding the data subjected to wavelet transformation as in FIG. 7B, as one example is shown in FIG. 7C, the first line by the first-time synthesizing processing on the decoding side is output (Out-1 in FIG. 7C) corresponding to the first-time filter processing by the first line through the seventh line on the encoding side. Thereafter, four lines at a time are output on the decoding side (Out-2 . . . in FIG. 7C) corresponding to the filter processing from the second time until before the last time on the encoding side. Eight lines are output on the decoding side corresponding to the filter processing for the last time on the encoding side.

The coefficient data generated by the wavelet transformation unit 221 from the highband component side to the lowband component side is sequentially stored in the coefficient rearranging buffer unit 223. With the coefficient rearranging unit 224, when coefficient data is accumulated in the coefficient rearranging buffer unit 223 until the above-described coefficient rearranging can be performed, the coefficient data is rearranged in the necessary order and read from the coefficient rearranging buffer unit 223. The read out coefficient data is sequentially supplied to the quantization unit 225.

The quantization unit 225 subjects the coefficient data supplied from the coefficient rearranging unit 224 to quantization. Any kind of method may be employed as this quantizing method, for example, a common method, i.e., such as shown in the following Expression (3), a method for dividing coefficient data W by a quantization step size Δ may be employed.

$$\text{Quantization coefficient} = W/\Delta \qquad (3)$$

Note that this quantization step size Δ is specified by the rate control unit 226, as described above.

The entropy encoding unit 227 subjects the coefficient data thus quantized and supplied to entropy encoding. The encoded data subjected to entropy encoding is supplied to the decoding side. As for an encoding method, Huffman encoding or arithmetic encoding or the like which are known techniques can be conceived. It goes without saying that the encoding method is not restricted to these, as long as reversible encoding processing can be performed, other encoding methods may be employed.

As described with reference to FIG. 6 through FIG. 7C, the wavelet transformation unit 221 performs wavelet transformation processing in increments of multiple lines (in increments of precinct) of image data. The encoded data encoded with the entropy encoding unit 227 is output in increments of precinct. That is to say, in the case of performing processing up to the division level=2 employing a 5×3 filter, for the output of one screen of data, output is obtained as one line for the first time, four lines each for the second time through the next to last time, and eight lines are output on the last time.

Note that in the case of subjecting the coefficient data after rearranging with the coefficient rearranging unit 224 to entropy encoding, for example in the event of performing entropy encoding on the line of the first coefficient C5 with the first-time filter processing shown in FIG. 6 for example, there is no historical line, i.e. there is no line where coefficient data has already been generated. Accordingly in this case, only the one line is subjected to entropy encoding. Conversely, in the event of encoding the line of the coefficient C1, the lines of the coefficient C5 and coefficient C4 become historical lines. These multiple lines nearing one another can be considered to be configured with similar data, thus subjecting the multiple lines to entropy encoding together is effective.

Also, as described above, with the wavelet transformation unit 221, an example for performing filter processing with wavelet transformation employing a 5×3 filter has been described, but should not be limited to this example. For example with the wavelet transformation unit 221, a filter with a longer tap number such as a 9×7 filter may be used. In this case, if the tap number is longer the number of lines accumulated in the filter also increases, so the delay time from input of the image data until output of the encoded data becomes longer.

Also, with the above description, the division level of the wavelet transformation has been described as division level=2 for the sake of description, but should not be limited to this, and division levels can be further increased. The more the division level is increased, the better a high compression rate can be realized. For example, in general, with wavelet transformation, filter processing of up to division level=4 is repeated. Note that as the division level increases, the delay time also increases greatly.

Accordingly, in the event of applying an embodiment of the present invention to an actual system, determining the filter tap number or the division level is desirable, according to the delay time or picture quality of the decoded image required by the system. The filter tap number or division level does not need to be a fixed value, but can be selectable appropriately as well.

As described above, the coefficient data subjected to wavelet transformation and rearranged is quantized at the quantization unit 225, and encoded by the entropy encoding unit 227. Subsequently, the obtained encoded data is supplied to the transmission buffer control unit 202.

The encoded data generated at the entropy encoding unit 227 is output in the generated order thereof, i.e., in increments of precinct from the encoding unit 201, and is supplied to the transmission buffer control unit 202.

Figures 8A, 8B:
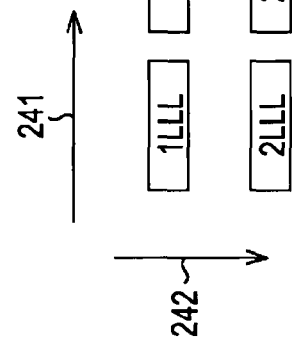
FIG. 8 is a diagram for describing the output order of encoded data from the encoding unit shown in FIG. 2.

That is to say, for example, as shown in FIG. 8A, the wavelet transformation of the division level=2 is performed at the wavelet transformation unit 221 of the encoding unit 201, and the coefficient data of seven regions of LLL, LHL, LLH, LHH, HL, LH, and HH are generated from the image data of one precinct. In FIG. 8A, 1LLL, 1LHL, 1LLH, 1LHH, 1HL, 1LH, and 1HH indicate the coefficient data of each region generated from the first precinct from the top of a picture, and 2LLL, 2LHL, 2LLH, 2LHH, 2HL, 2LH, and 2HH indicate the coefficient data of each region generated from the second precinct from the top of the picture.

Such coefficient data is encoded in order from the lowband components toward highband components thereof in increments of precinct, and supplied to the transmission buffer control unit 202.

That is to say, as shown in FIG. 8B, the coefficient data of 1LLL, 1LHL, 1LLH, 1LHH, 1HL, 1LH, and 1HH of the first precinct from the top of the picture is encoded in this order, and supplied to the transmission buffer control unit 202. Next, the coefficient data of 2LLL, 2LHL, 2LLH, 2LHH, 2HL, 2LH, and 2HH of the second precinct from the top of the picture is encoded in this order, and supplied to the transmission buffer control unit 202. Next, such as the coefficient data of the third precinct, the coefficient data of the fourth precinct, and so on, the coefficient data is encoded in increments of precinct, and supplied to the transmission buffer control unit 202.

That is to say, the coefficient data within each precinct is, as shown in an arrow 241, encoded in order from the lowband components toward highband components, and supplied to the transmission buffer control unit 202. With precinct increments, as shown in an arrow 242, the precincts are encoded one at a time in order downward from the first precinct from the top of the picture, and supplied to the transmission buffer control unit 202.

The amount of generated code at the encoding unit 201 differs for each picture in a usual case, and is shown in the graph in FIG. 9A. FIG. 9A is a graph illustrating an example of the amount of generated code for each picture. With the graph in FIG. 9A, the vertical axis indicates the amount of generated code, and the horizontal axis indicates time. That is to say, each bar graph indicates the amount of generated code of each picture. As shown in FIG. 9A, in a usual case, the amount of generated code differs between the respective pictures, which cause bias.

It goes without saying that the amount of generated code changes not only in increments of picture but also in increments of precinct. That is to say, in FIG. 9A, it can be considered that each bar graph indicates the amount of generated code in increments of precinct.

The transmission buffer control unit 202 temporarily accumulates encoded data, and reads out this at a constant bit rate, thereby subjecting such amount of code for each picture (for each precinct) to smoothing so as to be generally constant such as shown in the graph in FIG. 9B. The graph shown in FIG. 9B illustrates an example of the amount of code for each picture (or for each precinct), similar to FIG. 9A.

Figure 10:
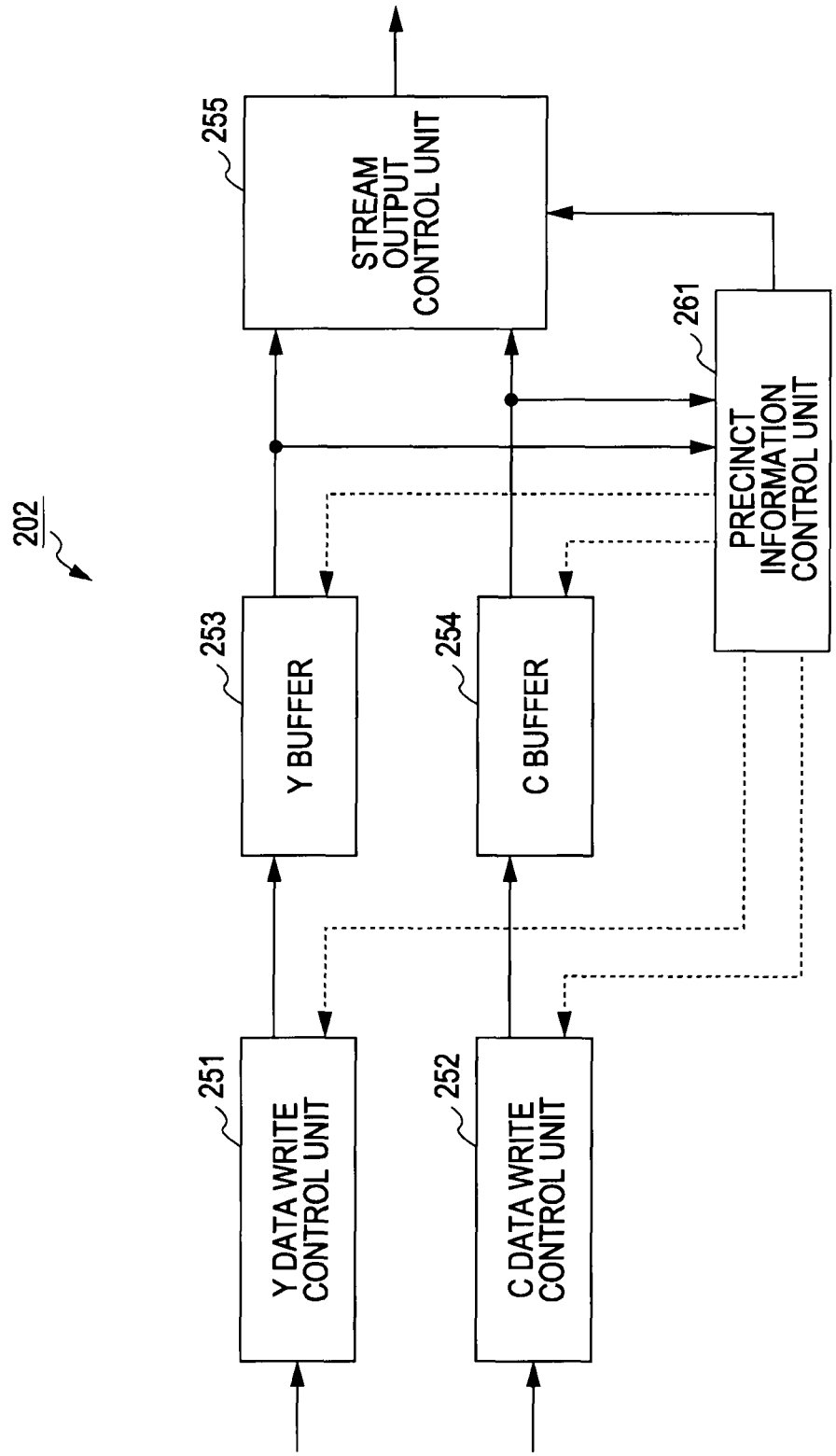
FIG. 10 is a block diagram illustrating a detailed configuration example of a transmission buffer control unit shown in FIG. 2.

FIG. 10 is a block diagram illustrating a detailed configuration example of the transmission buffer control unit 202 shown in FIG. 2. In FIG. 10, the transmission buffer control unit 202 includes a Y data write control unit 251, C data write control unit 252, Y buffer 253, C buffer 254, stream output control unit 255, and precinct information control unit 261.

The Y data write control unit 251 is controlled by the precinct information control unit 261 to obtain Y data which is the encoded data of a luminance component Y supplied from the encoding unit 201, and write this in the Y buffer 253. The C data write control unit 252 is controlled by the precinct information control unit 261 to obtain C data which is the encoded data of a color difference component C supplied from the encoding unit 201, and write this in the C buffer 254.

The image data obtained at the video camera unit 113 is configured of the luminance component Y and color difference component C. The encoding unit 201 subjects each of the luminance component Y and color difference component C to the above-mentioned processing. That is to say, the encoding unit 201 supplies Y data and C data to the transmission buffer control unit 202.

Note that, in actuality, there are color difference components Cb and Cr, but in order to simplify description, the Cb and Cr are collectively referred to as C. Also, description will be made below regarding YC (YCbCr) components made up of the luminance component Y and color difference component C, but this description is true for the case of RGB components made up of the R component, G component, and B component.

The Y buffer 253 has a built-in storage medium, and accumulates the Y data supplied from the Y data write control unit 251. Also, the Y buffer 253 is controlled by the precinct information control unit 261 to read out the accumulated Y data in the written order, and supply this to the stream output control unit 255.

The C buffer 254 has a built-in storage medium, and accumulates the C data supplied from the C data write control unit 252. Also, the C buffer 254 is controlled by the precinct information control unit 261 to read out the accumulated C data in the written order, and supply this to the stream output control unit 255.

The stream output control unit 255 is controlled by the precinct information control unit 261 to multiplex and output the precinct header or picture header supplied from the precinct information control unit 261, the Y data supplied from the Y buffer 253, and the C data supplied from the C buffer 254, and supply this to the packet generating unit 203 (FIG. 2).

The precinct header is configured of, for example, various types of information relating to the precinct of encoded data (original image data), such as identification information such as a precinct or the like, flag information, quantization coefficient, and so forth. This precinct header is added to encoded data for each precinct.

The picture header is configured of, for example, various types of information relating to the picture of encoded data (original image data), such as various types of flag information, data structure, frame rate, aspect ratio, information indicating a vertical direction valid pixel start position or horizontal direction valid pixel start position, and so forth. This picture header is added to encoded data for each picture.

The precinct information control unit 261 controls the operation of each unit of the Y data write control unit 251 through stream output control unit 255 of such a configuration, or generates a precinct header or picture header and so forth to supply these to the stream output control unit 255.

That is to say, the Y data which is the encoded data of the luminance component Y supplied from the encoding unit 201 is written in the Y buffer 253 at a predetermined timing by the Y data write control unit 251, and read out by the Y buffer 253 generally at a constant bit rate to supply this to the stream output control unit 255. Similarly, the C data which is the encoded data of the color difference component C supplied from the encoding unit 201 is written in the C buffer 254 at a predetermined timing by the C data write control unit 252, and read out by the C buffer 254 generally at a constant bit rate to supply this to the stream output control unit 255. The Y data and C data supplied to the stream output control unit 255 are multiplexed with the precinct header and picture header and so forth generated by the precinct information control unit 261, and output to the packet generating unit 203.

The precinct information control unit 261 controls various types of processing relating to smoothing of the bit rate of such Y data and C data.

In the event of increasing the storage capacity of the Y buffer 253 and C buffer 254 in which encoded data is accumulated, i.e., in the event of an arrangement being made wherein much more coefficient data is accumulated in the Y buffer 253 and C buffer 254, the tolerance of the transmission buffer control unit 202 becomes strong as to the irregularities of the amount of code for each precinct of encoded data. That is to say, the range of irregularities capable of smoothing the bit rate increases. Thus, the more the storage capacity of the Y buffer 253 and C buffer 254 in which encoded data is accumulated increases, the transmission buffer control unit 202 can send encoded data in a more stable manner (by smoothing the bit rate), but simultaneously, delay time after the encoded data is input to the transmission buffer control unit 202 until the encoded data is output therefrom increases. Also, in order to suppress increase in cost and circuit scale as well, unnecessary increase in the storage capacity of the Y buffer 253 and C buffer 254 is not desirable.

The precinct information control unit 261 controls input/output of the Y buffer 253 and C buffer 254 in the event of smoothing the bit rate of the Y data and C data to perform transfer so as to suppress increase in unnecessary delay time, and also so as to suppress unnecessary deterioration in quality as contents. The details will be described later.

Figure 11:
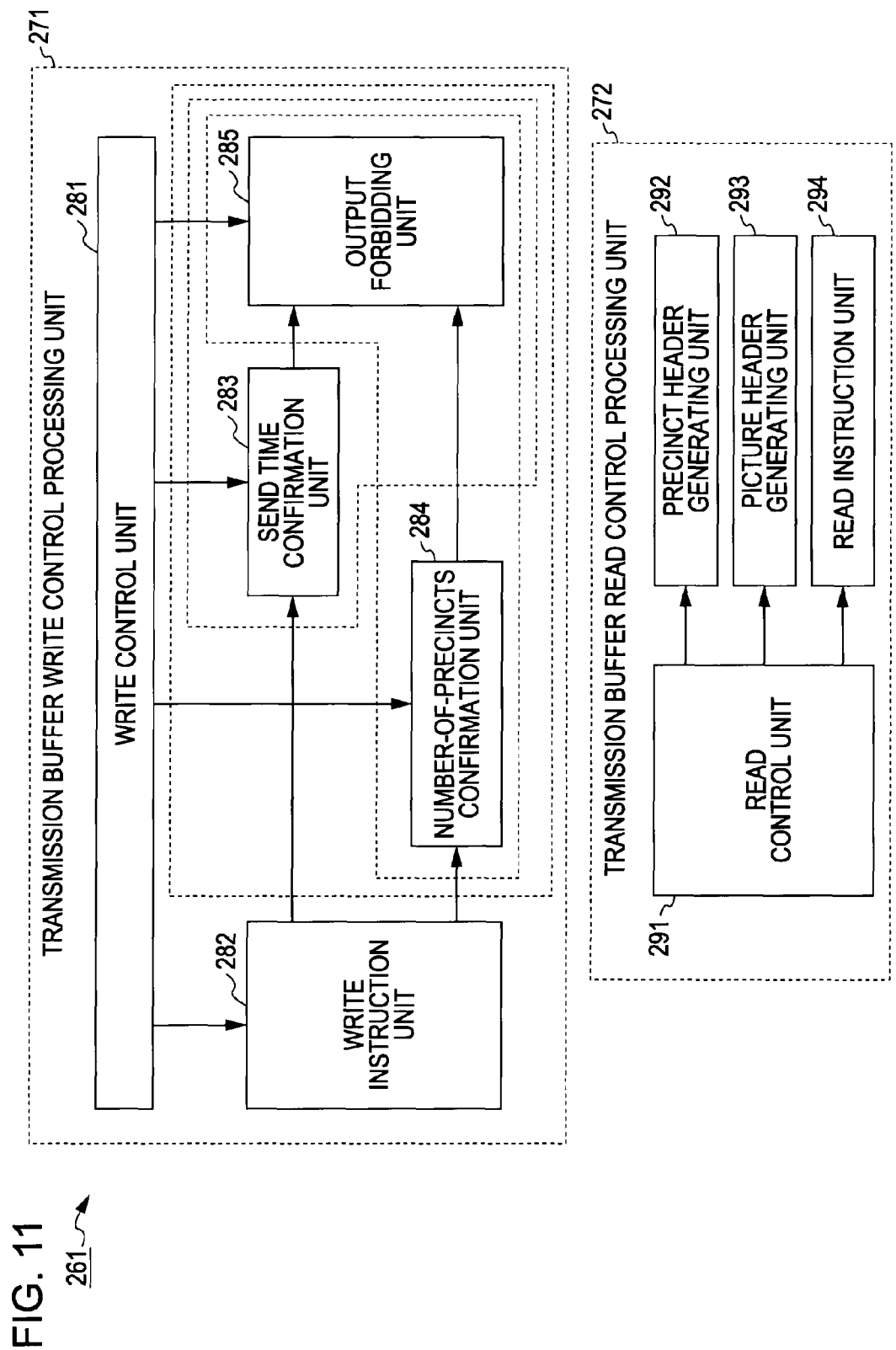
FIG. 11 is a block diagram illustrating a detailed configuration example of a precinct information control unit shown in FIG. 10.

FIG. 11 is a block diagram illustrating a detailed configuration example of the precinct information control unit 261 shown in FIG. 10. As shown in FIG. 11, the precinct information control unit 261 includes a transmission buffer write control processing unit 271, and transmission buffer read control processing unit 272.

The transmission buffer write control processing unit 271 is a processing unit for controlling processing relating to writing of encoded data to the Y buffer 253 and C buffer (FIG. 10) which are transmission buffers. The transmission buffer read control processing unit 272 is a processing unit for controlling processing relating to readout of encoded data from the Y buffer 253 and C buffer which are transmission buffers.

The transmission buffer write control processing unit includes a write control unit 281, write instruction unit 282, send time confirmation unit 283, number-of-precincts confirmation unit 284, and output forbidding unit 285.

The write control unit 281 controls processing executed by each unit of the write instruction unit 282 through output forbidding unit 285. The write instruction unit 282 is controlled by the write control unit 281 to supply write instructions to the Y data write control unit 251 to write (accumulate) the Y data in the Y buffer 253 at a predetermined timing. The Y data write control unit 251 supplies the Y data supplied from the encoding unit 201 to the Y buffer 253 to accumulate this based on the write instructions supplied from the write instruction 282.

Similarly, the write instruction unit 282 is controlled by the write control unit 281 to supply write instructions to the C data write control unit 252 to write (accumulate) the C data in the C buffer 254 at a predetermined timing. The C data write control unit 252 supplies the C data supplied from the encoding unit 201 to the C buffer 254 to accumulate this based on the write instructions supplied from the write instruction 282.

After accumulating the Y data and C data, the write instruction unit 282 informs the send time confirmation unit 283 and number-of-precincts confirmation unit 284 that writing has been completed.

Upon end of writing being informed by the write instruction unit 282, the send time confirmation unit 283 is controlled by the write control unit 281 to calculate time (send time) necessary for reading out all of the Y data accumulated in the Y buffer 253 based on the data amount of the Y data accumulated in the Y buffer 253, and the readout speed (bit rate) of the Y data from the Y buffer 253, compares the send time thereof with the maximum value of predetermined send time (maximum send time) to confirm that the send time is shorter than the maximum send time. If the send time is equal to or longer than the maximum send time, the send time confirmation unit 283 informs the output forbidding unit 285 to that effect.

Similarly, upon end of writing being informed by the write instruction unit 282, the send time confirmation unit 283 is controlled by the write control unit 281 to calculate time (send time) necessary for reading out all of the C data accumulated in the C buffer 254 based on the data amount of the C data accumulated in the C buffer 254, and the readout speed (bit rate) of the C data from the C buffer 254, compares the send time thereof with the maximum value of predetermined send time (maximum send time) to confirm that the send time is shorter than the maximum send time. If the send time happens to be equal to or longer than the maximum send time, the send time confirmation unit 283 informs the output forbidding unit 285 to that effect.

Upon end of writing being informed by the write instruction unit 282, the number-of-precincts confirmation unit 284 is controlled by the write control unit 281 to count the number of precincts of the Y data accumulated in the Y buffer 253, and determine whether or not the number of precincts accumulated in the Y buffer 253 exceeds a predetermined threshold. If the number of precincts of the Y data accumulated in the Y buffer 253 exceeds the predetermined threshold, the number-of-precincts confirmation unit 284 informs the output forbidding unit 285 to that effect.

Similarly, upon end of writing being informed by the write instruction unit 282, the number-of-precincts confirmation unit 284 is controlled by the write control unit 281 to count the number of precincts of the C data accumulated in the C buffer 254, and determine whether or not the number of precincts accumulated in the C buffer 254 exceeds a predetermined threshold. If the number of precincts of the C data accumulated in the C buffer 254 exceeds the predetermined threshold, the number-of-precincts confirmation unit 284 informs the output forbidding unit 285 to that effect.

In the case of the send time confirmation unit 283 informing that the send time of the encoded data of the Y buffer 253 or C buffer 254 is equal to or longer than the reference time, or in the case of the number-of-precincts confirmation unit 284 informing that the number of precincts of the encoded data accumulated in the Y buffer 253 or C buffer 254 exceeds a predetermined number, the output forbidding unit 285 is controlled by the write control unit 281 supplies instructions to a later-described transmission buffer read control processing unit 272 to forbid readout of encoded data of the precinct and on following the precinct now being read out by necessary worth in increments of precinct (performs bank over control).

The transmission buffer read control processing unit 272 includes a read control unit 291, precinct header generating unit 292, picture header generating unit 293, and read instruction unit 294.

The read control unit 291 controls processing executed by each unit of the precinct header generating unit 292 through read instruction unit 294.

The precinct header generating unit 292 creates a precinct header to be added to encoded data for each precinct based on the information and so forth supplied from the encoding unit 201, and supplies this to the stream output control unit 255. The picture header generating unit 293 creates a picture header to be added to encoded data for each picture based on the information and so forth supplied from the encoding unit 201, and supplies this to the stream output control unit 255.

The read instruction unit 294 supplies instructions to the Y buffer 253 and C buffer 254 to read out the encoded data (Y data or C data) accumulated in the Y buffer 253 and C buffer 254 in increments of precinct in the accumulated order at a predetermined bit rate, and supply this to the stream output control unit 255. The Y buffer 253 and C buffer 254 read out the encoded data accumulated therein in increments precinct in the accumulated order at a predetermined bit rate based on the read instructions supplied from the read instruction unit 294, and supply this to the stream output control unit 255.

Note that in the case of the output forbidding unit 285 instructing to forbid readout, the read control unit 291 controls the read instruction unit 294 to forbid readout of the encoded data of the precinct specified by the instructions thereof. The read instruction unit 294 reads out the coefficient data from the buffer in increments of precinct in the accumulated order generally at a constant bit rate as described above, but in the case of readout being forbidden, supplies read instructions to the Y buffer 253 and C buffer 254 to omit readout of the encoded data of the precinct thereof, and perform readout of the encoded data of a precinct of which readout is not forbidden, which is equivalent to the next precinct in the accumulated order as to the Y buffer 253 and C buffer 254. That is to say, the read instruction unit 294 supplies read instructions to the Y buffer 253 and C buffer 254 to read out only the encoded data of a precinct of which readout is not forbidden in increments of precinct in the accumulated order generally at a constant bit rate.

That is to say, in the case of being instructed to forbid readout from the output forbidding unit 285 based on such read instructions supplied from the read instruction unit 294, the Y buffer 253 and C buffer 254 omits readout of the encoded data of the precinct thereof, and performs readout of the encoded data of a precinct of which readout is not forbidden, which is equivalent to the next precinct in the accumulated order as to the Y buffer 253 and C buffer 254.

Figure 12:
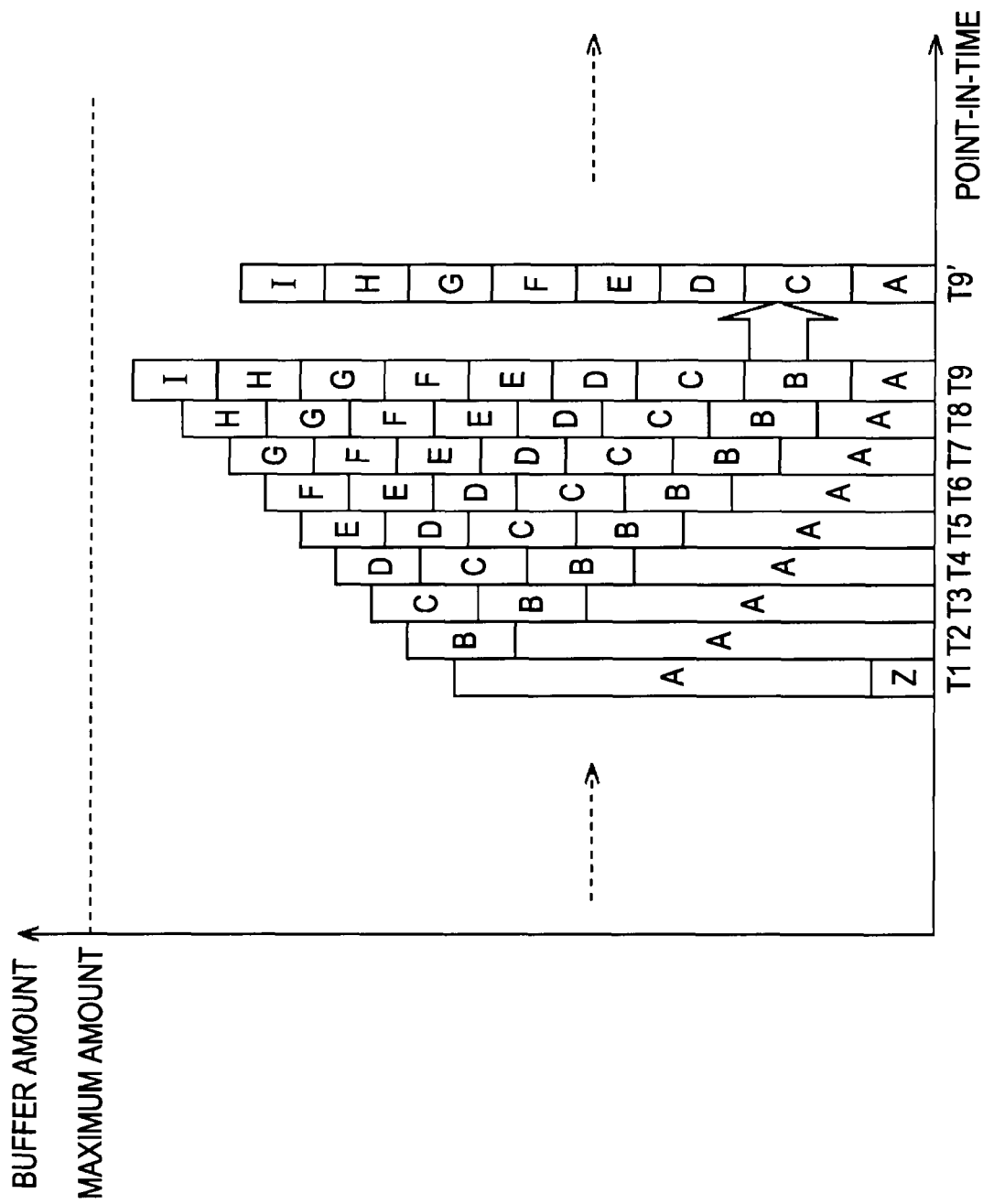
FIG. 12 is a schematic diagram illustrating an example of temporal change in the amount of encoded data which is readably stored in the buffer.
Figure 13:
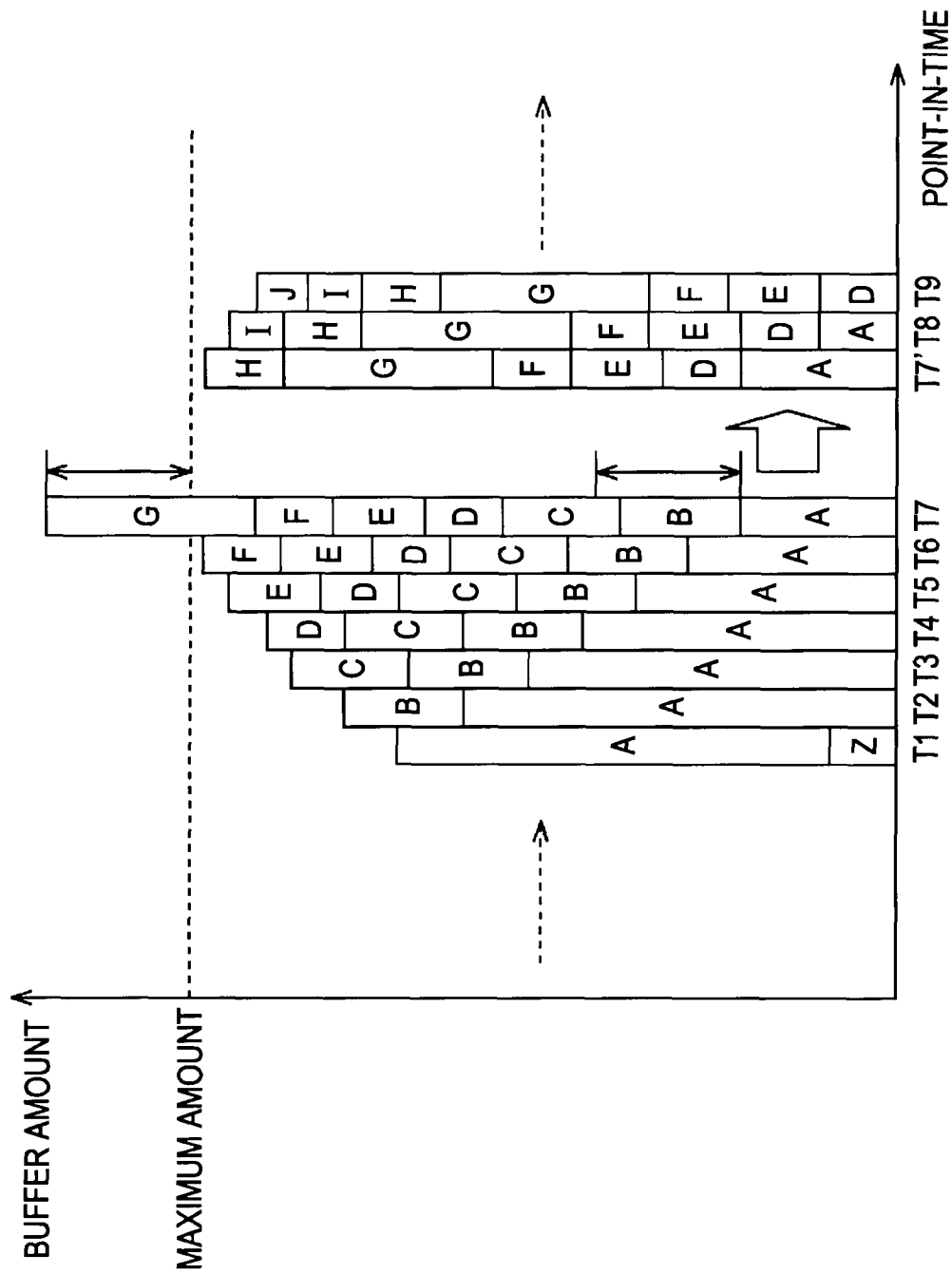
FIG. 13 is a schematic diagram illustrating another example of temporal change in the amount of encoded data which is readably stored in the buffer.

Description will be made regarding a control situation of readout performed at the transmission buffer control unit 202 with reference to FIGS. 12 and 13. FIGS. 12 and 13 schematically illustrate temporal change in the data amount of the encoded data (Y data or C data) accumulated in the buffer (Y buffer 253 or C buffer 254) so as to be read out. Note that the description with reference to FIGS. 12 and 13 that will be made below can be applied to both of the Y data and C data, so each of the Y buffer 253 and C buffer 254, and each of the Y data and C data are not distinguished here, and accordingly, these will be referred to the buffer and encoded data in the following description.

In FIGS. 12 and 13, the horizontal axis indicates point-in-time, and the vertical axis indicates the data amount (buffer amount) of the encoded data accumulated in the buffer so as to be read out. Each bar graph indicates the encoded data accumulated in the buffer at each point-in-time so as to be read out. Also, each square of bar graphs indicates encoded data for each precinct, and each precinct is distinguished with an alphabet within each square. That is to say, squares including the same alphabet between points-in-time indicate the encoded data included in the same precinct.

Note that in FIGS. 12 and 13, the accumulated order of the encoded data are indicated from bottom up. For example, in the case of point-in-time T9 shown in FIG. 12, of precinct I through precinct A, the encoded data of the precinct A is the oldest data accumulated earliest in the buffer, and the encoded data of the precinct I is the newest data accumulated latest in the buffer. That is to say, the encoded data of each precinct is accumulated in the buffer in order of precinct Z, precinct A, precinct B, precinct C, and so on through precinct I.

Also, the length in the vertical axis direction of a bar graph indicates the data amount of the encoded data thereof. In other words, the length in the vertical axis direction of each square indicates the data amount of encoded data for each precinct. Also, as described above, the encoded data accumulated in the buffer so as to be read out is read out generally at a constant bit rate. That is to say, the length in the vertical axis direction of a bar graph also indicates time (send time) necessary for reading out all of the encoded data accumulated in the buffer so as to be read out. In other words, the length in the vertical axis direction of each square indicates the send time of encoded data for each precinct.

Note that the maximum send time, which is the maximum value of send time tolerated by the send time confirmation unit 283, is indicated with a dotted line as "maximum amount". Also, let us say that a threshold determined by the number-of-precincts confirmation unit 284 as the maximum value of the number of precincts which can be accumulated in the buffer is "8".

Now, let us say that the available storage capacity of the buffer, i.e., the restriction according to hardware is sufficiently great as to the restriction of the maximum value of the maximum send time and the number of precincts. The details will be described later, but an arrangement is made wherein buffer overflow is not caused with the restriction of send time by the send time confirmation unit 283, or the restriction of the number of precincts by the number-of-precincts confirmation unit 284.

FIG. 12 schematically illustrates temporal change in the data amount of the encoded data accumulated in the buffer so as to be read out by the control of the number-of-precincts confirmation unit 284 and output forbidding unit 285.

In the case of the example shown in FIG. 12, at point-in-time T1, the encoded data of the precinct Z, and the encoded data of the subsequent precinct A are accumulated in the buffer so as to be read out, and the precinct Z previously accumulated is read out generally at a constant bit rate. At this time, the number of precincts accumulated in the buffer is 2, so the output forbidding unit 285 does not forbid output of the encoded data.

At point-in-time T2 wherein predetermined time has elapsed since point-in-time T1, readout of the encoded data of the precinct Z has been completed, the encoded data of the precinct A, and the encoded data of the subsequent precinct B are accumulated in the buffer so as to be read out, and the precinct A previously accumulated is read out generally at a constant bit rate. At this time, the number of precincts accumulated in the buffer is 2, so the output forbidding unit 285 does not forbid output of the encoded data.

At point-in-time T3 wherein predetermined time has elapsed since point-in-time T2, readout of the encoded data of the precinct A has been continued, the remaining encoded data of the precinct A, the encoded data of the subsequent precinct B, and further the encoded data of the subsequent precinct C are accumulated in the buffer so as to be read out. At this time, the number of precincts accumulated in the buffer is 3, so the output forbidding unit 285 does not forbid output of the encoded data.

At point-in-time T4 wherein predetermined time has elapsed since point-in-time T3, readout of the encoded data of the precinct A has been further continued, the remaining encoded data of the precinct A, and the encoded data of the consecutive precinct B through precinct D are accumulated in the buffer so as to be read out. At this time, the number of precincts accumulated in the buffer is 4, so the output forbidding unit 285 does not forbid output of the encoded data.

At point-in-time T5 wherein predetermined time has elapsed since point-in-time T4, readout of the encoded data of the precinct A has been further continued, the remaining encoded data of the precinct A, and the encoded data of the consecutive precinct B through precinct E are accumulated in the buffer so as to be read out. At this time, the number of precincts accumulated in the buffer is 5, so the output forbidding unit 285 does not forbid output of the encoded data.

At point-in-time T6 wherein predetermined time has elapsed since point-in-time T5, readout of the encoded data of the precinct A has been further continued, the remaining encoded data of the precinct A, and the encoded data of the consecutive precinct B through precinct F are accumulated in the buffer so as to be read out. At this time, the number of precincts accumulated in the buffer is 6, so the output forbidding unit 285 does not forbid output of the encoded data.

At point-in-time T7 wherein predetermined time has elapsed since point-in-time T6, readout of the encoded data of the precinct A has been further continued, the remaining encoded data of the precinct A, and the encoded data of the consecutive precinct B through precinct G are accumulated in the buffer so as to be read out. At this time, the number of precincts accumulated in the buffer is 7, so the output forbidding unit 285 does not forbid output of the encoded data.

At point-in-time T8 wherein predetermined time has elapsed since point-in-time T7, readout of the encoded data of the precinct A has been further continued, the remaining encoded data of the precinct A, and the encoded data of the consecutive precinct B through precinct H are accumulated in the buffer so as to be read out. At this time, the number of precincts accumulated in the buffer is 8, so the output forbidding unit 285 does not forbid output of the encoded data.

At point-in-time T9 wherein predetermined time has elapsed since point-in-time T8, readout of the encoded data of the precinct A has been further continued, the remaining encoded data of the precinct A, and the encoded data of the consecutive precinct B through precinct I are accumulated in the buffer so as to be read out.

The number of precincts accumulated in the buffer at this time is 9, and exceeds the threshold 8. Accordingly, the output forbidding unit 285 performs bank over control to forbid output of the encoded data of the precinct B which is the subsequent precinct following the precinct A currently being output based on the notification from the number-of-precincts confirmation unit 284.

This is processing for eliminating underflow on the reception side caused due to too much data amount of the encoded data of the precinct A in a short time. The details will be described later, but when the transfer time of the precinct A is increased due to too much data amount of the precinct A, time necessary for receiving all of the encoded data of the precinct A is also increased on the reception side. Thus, the decoding processing of the precinct before the precinct A is terminated unintentionally, and so-called underflow is caused wherein the buffer becomes empty. Once such underflow occurs, it can be conceived that this underflow will not be eliminated but linked to the subsequent precinct and thereafter, and there is a possibility that deterioration in image quality will be expanded unnecessarily.

Therefore, the output forbidding unit 285 and the like perform control such as described above to ensure time for accumulating the encoded data of the subsequent precinct at the reception side by omitting (skipping) one of the precincts of encoded data to be read out, thereby stopping linkage of this underflow. The details thereof will be described later.

Encoded data is accumulated in the buffer periodically for each precinct, so if it takes a long time to read out a precinct, the number of precincts to be accumulated in the buffer increases by the worth thereof. The number-of-precincts confirmation unit 284 utilizes this to detect a precinct which takes a long time equal to or greater than predetermined reference to read out the encode data from the buffer by counting the number of precincts of encoded data simultaneously accumulated in the buffer, thereby predicting occurrence of underflow on the reception side.

Thus, the number-of-precincts confirmation unit 284 can readily predict occurrence of underflow on the reception side only by counting the number of precincts of the encoded data accumulated in the buffer without calculating the send time of each precinct.

Also, according to the bank over control processing performed based on such number of precincts, even in the event that the send time of only one precinct (precinct A) is long such as shown in FIG. 12, the number-of-precincts confirmation unit 284 can detect the precinct thereof. That is to say, the number-of-precincts confirmation unit 284 can also detect the high-frequency components in fluctuation of the data amount (send time) of encoded data.

Also, the number-of-precincts confirmation unit 284 can detect precincts having long send time even from one precinct, so the output forbidding unit 285 forbids output one precinct at a time, whereby linkage of underflow can be suppressed. That is to say, forbidding a precinct to be output can be suppressed up to the necessity minimum. Thus, the output forbidding unit 285 can suppress unnecessary increase in image quality deterioration caused by forbidding a precinct to be output.

Further, for example, in FIG. 12, when the bank over processing is performed such as point-in-time T9', output of the precinct B is forbidden, and the encoded data of the precinct C is read out, but in this case, it takes time to receive the precinct A, which causes the accumulation amount of the buffer to be reduced on the reception side, and accordingly, underflow readily occurs again. In the case of performing the bank over control processing by calculating the send time of each precinct, such a situation on the reception side cannot be recognized simply, but the number-of-precincts confirmation unit 284 predicts occurrence of underflow on the reception side based on the number of precincts of the encoded data accumulated in the buffer, so the accumulation amount of the encoded data of the buffer on the reception side can be extrapolated based on the number of precincts of the encoded data accumulated in the buffer.

That is to say, the ease of occurrence of underflow with the buffer on the reception side is represented with the number of precincts of the encoded data accumulated in the buffer on the transmission side, the more the number of precincts of the encoded data accumulated in the buffer on the transmission side increases (the closer to the threshold), the less the number of precincts of the encoded data accumulated in the buffer on the reception side, and accordingly, a state wherein underflow readily occurs is caused, but in other words, a state wherein the output forbidding unit 285 readily forbids output of encoded data is caused.

Specifically, in the case of point-in-time T1, the number of precincts of the encoded data accumulated in the buffer is 2, so unless the send time of the encoded data of the precinct A is equal to or greater than point-in-time T2 through T9 (8 sections), the output forbidding unit 285 does not forbid output, but in the case of point-in-time T9', for example, if the send time of the encoded data of the precinct C is equal to or greater than two sections, in the case of point-in-time T1, the number of precincts of the encoded data accumulated in the buffer is 9, and accordingly, the output forbidding unit 285 forbids output of the subsequent precinct D.

Thus, the number-of-precincts confirmation unit 284 and output forbidding unit 285 can readily cause the execution conditions of the bank over control processing to fluctuate substantially according to the ease of occurrence of underflow on the reception side by performing the bank over control processing based on the number of precincts.

Note that description has been made so far wherein the number-of-precincts confirmation unit 284 causes the output forbidding unit 285 to execute the bank over control processing in the case of the number of precincts being equal to or greater than 9 with the number of precincts "8" as a threshold, but the value of this threshold is arbitrary. The smaller the threshold is, the less the data amount of the encoded data to be accumulated in the buffer, thereby suppressing increase in delay time. Conversely, the greater the threshold is, the less the frequency of the bank over control processing can be decreased, thereby decreasing deterioration in image quality. Note however, it is desirable to set the threshold so as not to cause buffer overflow due to accumulation of encoded data.

FIG. 13 schematically illustrates temporal change in the data amount of encoded data to be accumulated in the buffer so as to be read out by the control of the send time confirmation unit 283 and output forbidding unit 285.

In the case of this FIG. 13, point-in-time T1 through T6 are the same as those in the example shown in FIG. 12, but at point-in-time T7 the sum of the data amount of the encoded data accumulated in the buffer exceeds the maximum amount by the worth shown in both arrows. Accordingly, the output forbidding unit 285 performs the bank over control based on the notification from the send time confirmation unit 283 to forbid the output of the encoded data from the subsequent precinct following the precinct A currently being output by the necessary worth in increments of precinct so as to decrease the excessive worth from the tolerant range of the data amount shown in both arrows in FIG. 13. In the example shown in FIG. 13, as shown in both arrows, the excessive worth cannot be eliminated only by forbidding output of the encoded data of the precinct B, so the output forbidding unit 285 also forbids output of the encoded data of the precinct C following the precinct B, as shown in point-in-time T7'.

In this case, following the data of the precinct A being output, time further elapses, and in the event that readout of the precinct A is completed, readout of the encoded data of the precinct B and precinct C is omitted, and the encoded data of the precinct D is read out.

That is to say, the send time confirmation unit 283 and output forbidding unit 285 perform the bank over control based on the send time (i.e., data amount) of the encoded data accumulated in the buffer. Thus, the bank over control is performed, whereby the send time confirmation unit 283 and output forbidding unit 285 can suppress occurrence of buffer overflow by the restriction of the total data amount (total send time) of the encoded data to be accumulated in the buffer. Thus, the available storage capacity of the buffer can be used more effectively.

For example, as shown in the example in FIG. 12, in the case of the bank over control based on the number of precincts, the number of precincts can be restricted, but the data amount (send time) cannot be restricted. Accordingly, when the data amount (send time) is very great even if the number of precincts is small, there is a possibility that buffer overflow will be caused. Therefore, there is the need to set the threshold so as not to cause buffer overflow based on the predictable and realistic amount of generated code (send time) and the hardware restriction of the buffer. Accordingly, there is the need to provide a greater margin such that the greater the data amount (send time) of the encoded data of each precinct fluctuates, the smaller the threshold is set as to the hardware restriction of the buffer, and in this case, efficiency in the use of the buffer decreases.

Conversely, as shown in the example in FIG. 13, in the case of the bank over control based on the data amount (send time), the maximum amount can be defined, whereby decrease in efficiency in the use of the buffer can be suppressed regardless of the rate of variability of the data amount (send time) of the encoded data of each precinct.

Note that it is desirable to set the maximum amount based on the realistic amount of generated code (send time) such that the excessive worth from the maximum amount of the encoded data does not exceed the hardware restriction of the buffer.

In the case of the bank over control processing based on the data amount (send time), the fluctuation of the data amount (send time) of the encoded data for each precinct cannot be detected. Accordingly, the send time confirmation unit 283 can detect only the low-frequency components of the fluctuation of the data amount (send time) of the encoded data as compared to the case of the bank over control processing performed based on the number of precincts.

Also, in the case of the bank over control processing based on the data amount (send time), as shown in FIG. 13, output of multiple precincts is forbidden collectively in some cases, and as compared to the case of the bank over control processing based on the number of precincts, with the output image on the reception side, the positions of portions (precincts) where image quality deteriorates are concentrated, and deterioration in image quality is visually conspicuous in some cases.

Note that the send time confirmation unit 283 and output forbidding unit 285 perform the bank over control processing based on the data amount (send time), whereby the send time confirmation unit 283 and output forbidding unit 285 can readily cause the execution conditions of the bank over control processing to fluctuate substantially according to the ease of occurrence of underflow on the reception side, in the same way as the case of the bank over control processing performed based on the number of precincts.

The transmission buffer write control processing unit 271 can readily detect the high-frequency components of the fluctuation of the data amount (send time) of the encoded data, and also can suppress decrease in efficiency in the use of the buffer by using the bank over control processing based on the number of precincts, and the bank over control processing based on the data amount (send time), which have been described above, together. That is to say, disadvantages of both are suppressed, and advantages of both can be obtained.

Under the control of the transmission buffer read control processing unit 272 shown in FIG. 11, the encoded data output from the stream output control unit 255 shown in FIG. 10 is supplied to the packet generating unit 203 shown in FIG. 2. The packet generating unit 203 generates header information based on the information such as a picture header or precinct header and so forth, and adds the header information thereof for each piece of the encoded data in increments of predetermined data, thereby generating the packets of the encoded data.

Figure 14:
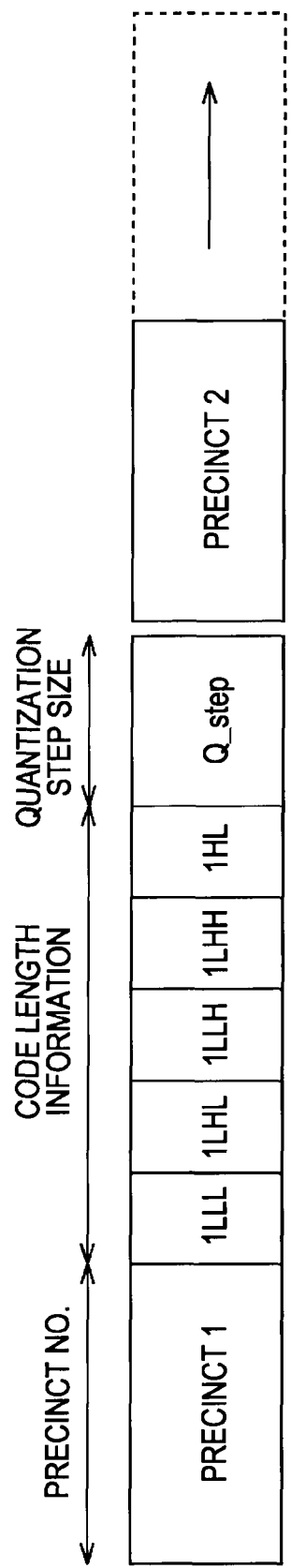
FIG. 14 is a schematic diagram illustrating a configuration example of header information.

FIG. 14 is a schematic view illustrating a configuration example of the header information to be added to encoded data by the packet generating unit 203. As shown in FIG. 14, the header information includes the precinct number of a precinct included in the packet thereof, the code amount information (byte display) of each sub-band of the precinct thereof, and the information of the quantization step size (Q_step) employed. In the case of the payload of the packet thereof including the encoded data of multiple precincts, the above-mentioned information regarding each precinct is consecutively arrayed and multiplexed.

Following being packetized as described above, the encoded data is output to the triax cable 111 via the digital modulation unit 122, amplifier 124, and video splitting/synthesizing unit 126 shown in FIG. 1. The packets (encoded data) thus sent from the transmission unit 110 are sent to the camera control unit 112 via the triax cable 111.

Figure 15:
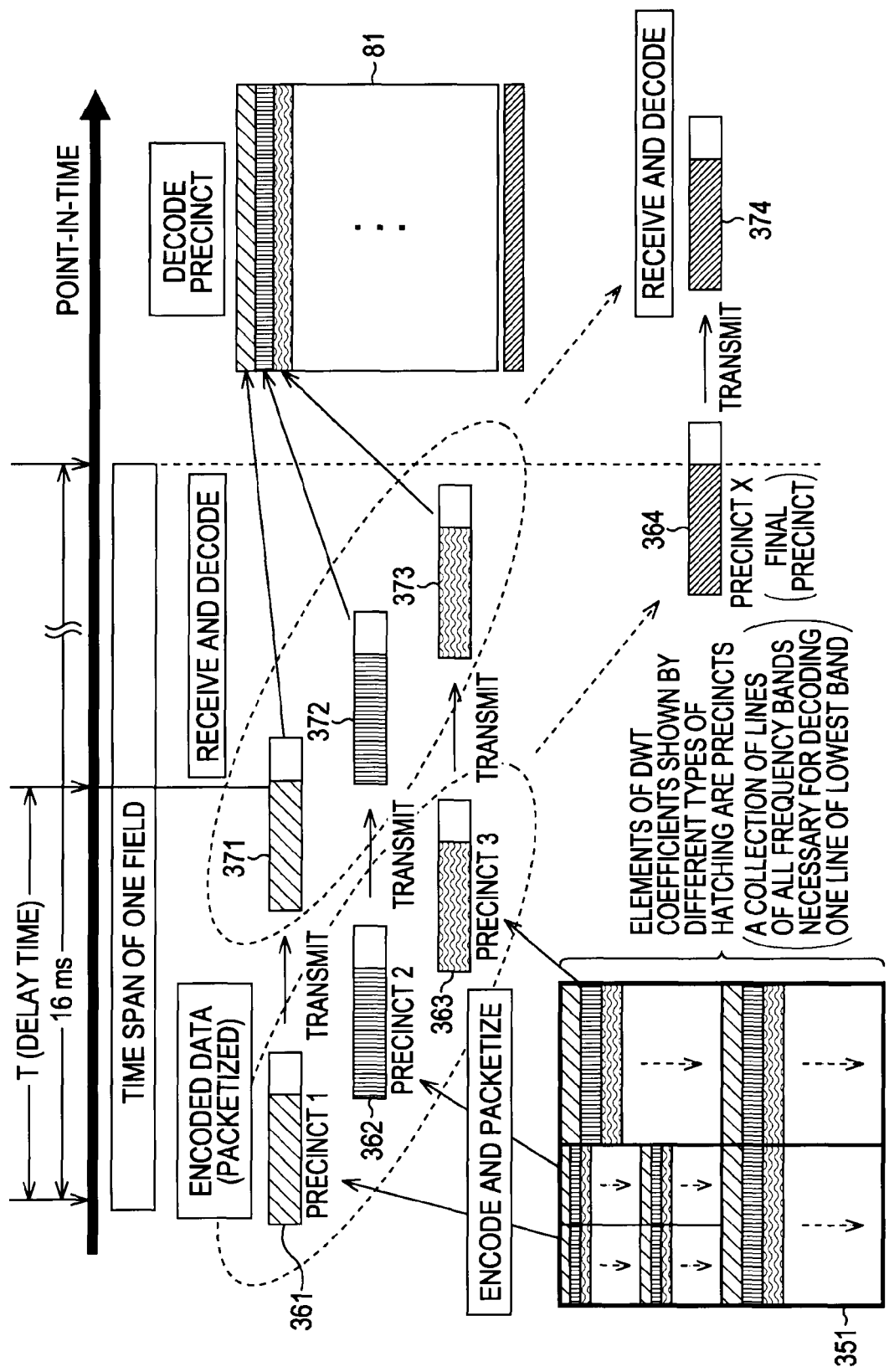
FIG. 15 is a schematic diagram describing an example of the way in which encoded data is exchanged.

FIG. 15 is a schematic view for describing an example of an exchange situation of the encoded data thereof. As described above, image data 351 is subjected to wavelet transformation while being input by a predetermined number of lines worth for each precinct. Subsequently, when reaching a predetermined wavelet transformation division level, the coefficient lines from the lowest band sub-band to the highest band sub-band are rearranged in the opposite order of the generated order, i.e., in order from lowband to highband.

The image data 351 shown in FIG. 15 is illustrated by being divided for each sub-band, wherein portions divided with patterns of a slanting line, vertical line, and wavy line indicate different precincts (as shown in arrows, the white portions of the image data 351 are divided and processed for each precinct in the same way). The rearranged precinct coefficients are subjected to entropy encoding as described above, thereby generating encoded data.

For example, as shown in FIG. 15, when generating the encoded data of a first precinct (precinct 1), the transmission unit 110 packetizes this, and sends this to the camera control unit 112 as a transmission packet 361. When receiving the packet (reception packet 371) thereof, the camera control unit 112 depacketizes the packet thereof to extract encoded data, and decodes the encoded data thereof.

Similarly, when generating the encoded data of a second precinct (precinct 2), the transmission unit 110 packetizes this, and sends this to the camera control unit 112 as a transmission packet 362. When receiving the packet (reception packet 372) thereof, the camera control unit 112 decodes the encoded data thereof. Further similarly, when generating the encoded data of a third precinct (precinct 3), the transmission unit 110 packetizes this, and sends this to the camera control unit 112 as a transmission packet 363. When receiving the packet (reception packet 373) thereof, the camera control unit 112 decodes the encoded data thereof.

The transmission unit 110 and camera control unit 112 repeat the processing such as described above until the X'th final precinct (precinct X) (transmission packet 364, reception packet 374). Thus, a decoded image 381 is generated at the camera control unit 112.

With television broadcasting, for example, an interlace image is employed, wherein there are sixty fields per one second. Accordingly, one field time=1/60 sec (=16 msec). Conversely, the transmission unit 110 encodes each precinct to send this. Thus, time T (delay time) until the transmission unit 110 encodes and sends the precinct 1 which is the first precinct, the camera unit 112 receives and decodes this, and an image is output in the central control system can be shortened than the one field time.

Figure 16:
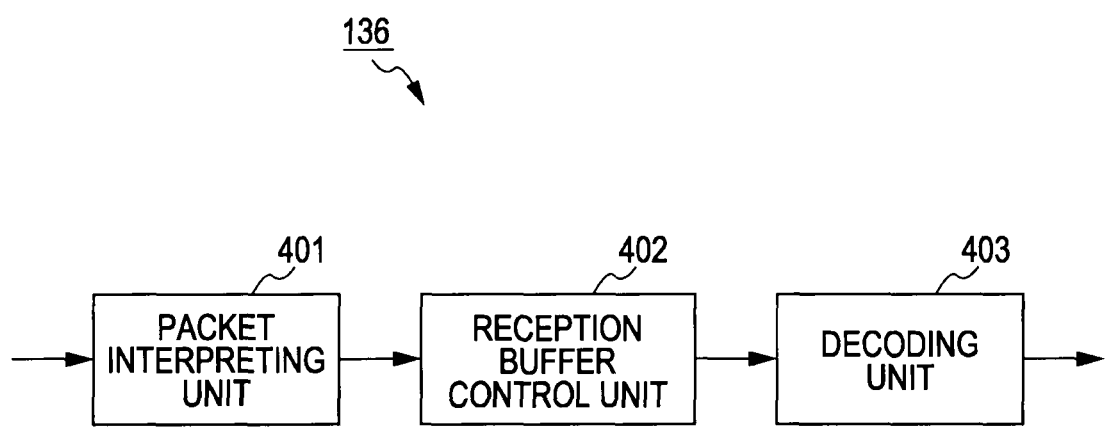
FIG. 16 is a block diagram illustrating a detailed configuration example of a video signal decoding unit shown in FIG. 1.

Next, description will be made regarding the video signal decoding unit serving as the reception side. FIG. 16 is a block diagram illustrating a detailed configuration example of the video signal decoding unit 136 shown in FIG. 1. Note that the video signal decoding unit 121 shown in FIG. 1 has the same configuration as the video signal decoding unit 136, and performs the same processing, so the description as to the video signal decoding unit 136 can be applied thereto. Accordingly, in order to simplify description, except for necessary cases, the description of the video signal decoding unit 121 will be omitted.

In FIG. 16, the video signal decoding unit 136 includes a packet interpreting unit 401, reception buffer control unit 402, and decoding unit 403.

The packet interpreting unit 401 performs interpretation of the packet demodulated at the digital demodulation unit 134 (FIG. 1) and sent from the transmission unit 110, and extracts the encoded data included in the header information and payload. The packet interpreting unit 401 supplies the extracted header information and encoded data to the reception buffer control unit 402. Each time a packet is supplied, the packet interpreting unit 401 extracts header information and encoded data from the packet thereof, and supplies these to the reception buffer control unit 402.

The reception buffer control unit 402 accumulates the encoded data supplied from the packet interpreting unit 401 in the built-in buffer, reads out the decoded data thereof at a predetermined timing for each precinct, and supplies this to the decoding unit 403.

The decoding unit 403 decodes the encoded data supplied from the reception buffer control unit 402 using a predetermined decoding method corresponding to the encoding method of the encoding unit 201 shown in FIG. 2, subjects the obtained coefficient data to inverse quantization to perform wavelet inverse transformation, and outputs baseband image data to the central control system and video signal encoding unit 137.

Figure 17:
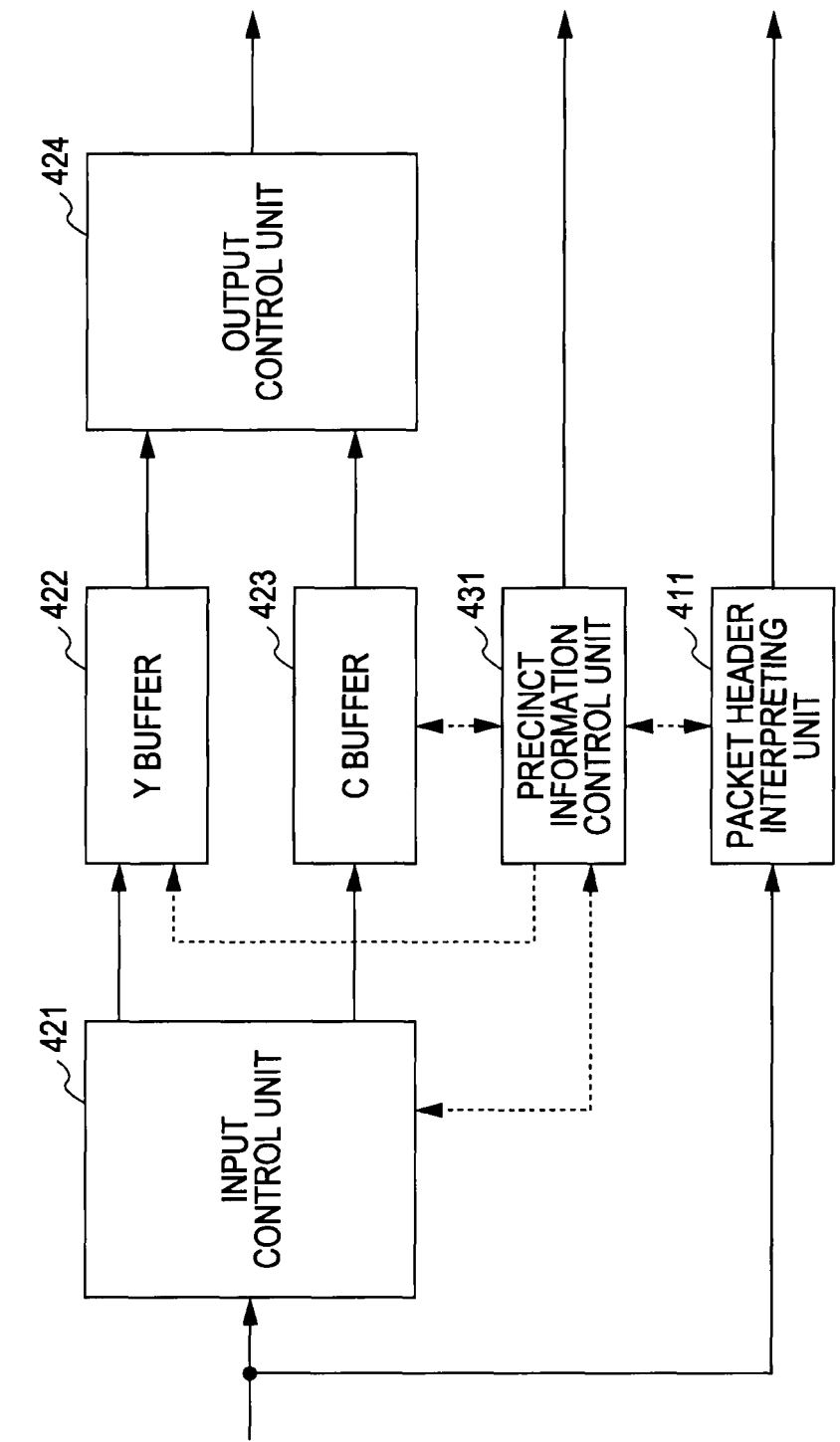
FIG. 17 is a diagram illustrating a detailed configuration example of a reception buffer control unit shown in FIG. 16.

FIG. 17 is a diagram illustrating a detailed configuration example of the reception buffer control unit 402 shown in FIG. 16. In FIG. 17, the reception buffer control unit 402 includes a packet header interpreting unit 411, input control unit 421, Y buffer 422, C buffer 423, output control unit 424, and precinct information control unit 431.

The packet header interpreting unit 411 is controlled by the precinct information control unit 431 to obtain and hold the header information supplied from the packet interpreting unit 401, interprets the header information thereof at a predetermined timing, and extracts the parameter information of the precinct to be processed. The packet header interpreting unit 411 supplies the extracted parameter information to the decoding unit 403 to use this with decoding processing.

The input control unit 421 is controlled by the precinct information control unit 431 to obtain the encoded data supplied from the packet interpreting unit 401, write Y data (the encoded data of the luminance component Y) in the Y buffer 422, and write C data (the encoded data of the color difference component C) in the C buffer 423.

The Y buffer 422 has a built-in storage medium, and accumulates the Y data supplied from the input control unit 421. Also, the Y buffer 422 is controlled by the precinct information control unit 431 to read out the accumulated Y data in the written order, and supply this to the output control unit 424.

The C buffer 423 has a built-in storage medium, and accumulates the C data supplied from the input control unit 421. Also, the C buffer 423 is controlled by the precinct information control unit 431 to read out the accumulated C data in the written order, and supply this to the output control unit 424.

The output control unit 424 is controlled by the precinct information control unit 431 to multiplex and output the Y data supplied from the Y buffer 422, and the C data supplied from the C buffer 423, and supply this to the decoding unit 403 (FIG. 16).

The precinct information control unit 431 controls the operation of each unit of the packet header interpreting unit 411, input control unit 421, Y buffer 422, C buffer 423, and output control unit 424, or generates dummy data which is data for substitution of the lost encoded data to supply this to the decoding unit 403.

That is to say, the Y data and C data are supplied from the packet interpreting unit 401 generally at a constant bit rate, written in the Y buffer 422 or C buffer 423 by the input control unit 421, temporarily held therein, read out in increments of precinct, and multiplexed and output to the decoding unit 403 by the output control unit 424.

The precinct information control unit 431 controls various types of processing relating to buffering for timing adjustment of such Y data and C data.

In the event of increasing the storage capacity of the Y buffer 422 and C buffer 423 in which encoded data is accumulated, i.e., in the event of an arrangement being made wherein much more coefficient data is accumulated in the Y buffer 422 and C buffer 423, the image quality of an output image can be improved, but delay time increases. Also, in order to suppress increase in cost and circuit scale as well, unnecessary increase in the storage capacity of the Y buffer 422 and C buffer 423 is not desirable.

The precinct information control unit 431 controls input/output of the Y buffer 422 and C buffer 423 at the time of timing adjustment before the decoding processing of the Y data and C data, thereby suppressing increase in unnecessary delay time, and also suppressing unnecessary deterioration in quality as contents. The details will be described later.

Figure 18:
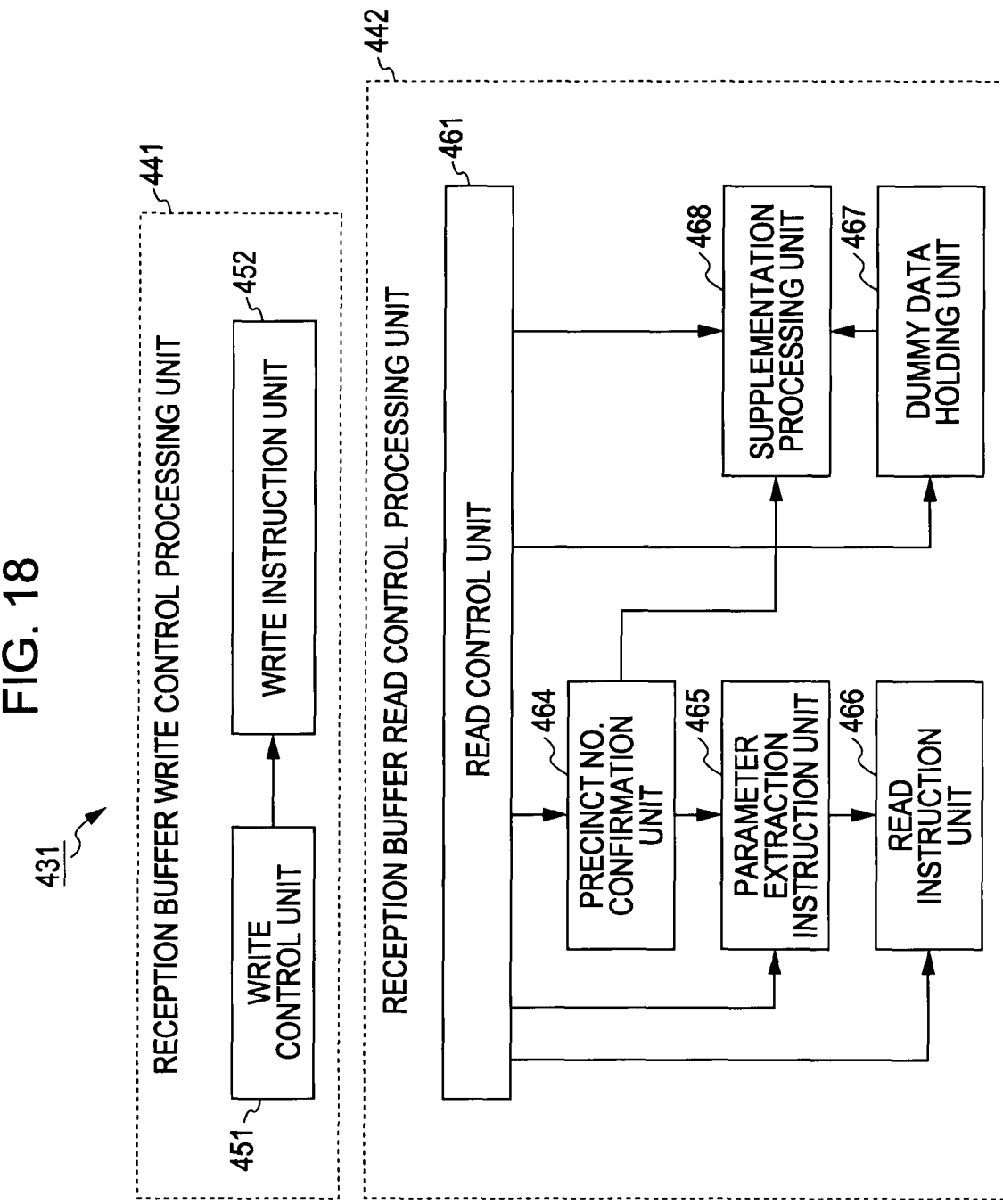
FIG. 18 is a diagram illustrating a detailed configuration example of a precinct information control unit shown in FIG. 17.

FIG. 18 is a block diagram illustrating a detailed configuration example of the precinct information control unit 431 shown in FIG. 17. As shown in FIG. 18, the precinct information control unit 431 includes a reception buffer write control processing unit 441, and reception buffer read control processing unit 442.

The reception buffer write control processing unit 441 is a processing unit for controlling processing relating to writing of encoded data to the Y buffer 422 and C buffer 423 (both in FIG. 17) which are reception buffers. The reception buffer read control processing unit 442 is a processing unit for controlling processing relating to readout of encoded data from the Y buffer 422 and C buffer 423 which are reception buffers.

The reception buffer write control processing unit 441 includes a write control unit 451, and write instruction unit 452.

The write control unit 451 controls processing of the write instruction unit 452. The write instruction unit 452 is controlled by the write control unit 451 to supply write instructions to the input control unit 421 to write (accumulate) the Y data in the Y buffer 422, and write (accumulate) the C data in the C buffer 423 at a predetermined timing. The input control unit 421 supplies the Y data supplied from the packet interpreting unit 401 to the Y buffer 422 to accumulate this, and supplies the C data supplied from the packet interpreting unit 401 to the C buffer 423 to accumulate this, based on the write instructions supplied from the write instruction 452.

The reception buffer read control processing unit 442 includes a read control unit 461, precinct No. confirmation unit 464, parameter extraction instruction unit 465, read instruction unit 466, dummy data holding unit 467, and supplementation processing unit 468.

The read control unit 461 controls processing executed by each unit of the precinct No. confirmation unit 464 through supplementation processing unit 468.

The precinct No. confirmation unit 464 is controlled by the read control unit 461 to select the oldest precinct of the precincts of the encoded data accumulated in the Y buffer 422 and C buffer 423 as a precinct to be processed, and confirms whether or not the precinct No. of the selected precinct follows the precinct No. of the precinct previously processed, thereby confirming the existence of loss of a precinct.

The encoded data accumulated in the buffer (Y buffer 422 and C buffer 423) is read out for each precinct in order basically from the oldest encoded data. As described with reference to FIG. 8, the encoded data is supplied from the video signal encoding unit 120 in order (precinct order) for each precinct, so if there is no loss of encoded data (precinct), the precinct No. of the precinct to be processed needs to be incremented one at a time. If the precinct No. of the precinct selected as a precinct to be processed does not follow the precinct No. of the precinct read out (or subjected to supplementation processing as described later) from the buffer last time, this means that a single or multiple precincts which should exist between these precincts are lost.

For example, as described above with reference to FIGS. 12 and 13, in the case of the bank over control processing being performed at the video signal encoding unit 120, with the encoded data supplied to the video signal decoding unit 136, loss of a precinct occurs.

The precinct No. confirmation unit 464 monitors the precinct No. of the precinct to be processed, and confirms whether or not the precinct No. is incremented one at a time in order from 1, thereby confirming whether or not such loss of a precinct occurs.

Note that the precinct No. confirmation unit 464 may confirm the precinct No. of the precinct to be processed. For example, the precinct Nos. of all of the encoded data accumulated in the buffer may be managed by an arrangement wherein when encoded data is accumulated in the buffer, the precinct No. confirmation unit 464 obtains the precinct No. of the encoded data thereof. Alternatively, for example, an arrangement may be made wherein both of encoded data and header information are accumulated in the buffer (Y buffer 422 and C buffer 423) for each precinct, and based on the header information corresponding to the precinct to be processed accumulated in the buffer, the precinct No. confirmation unit 464 identifies the precinct No. thereof. Alternatively, for example, an arrangement may be made wherein header information is accumulated in the packet header interpreting unit 411, only encoded data is accumulated in the buffer, these header information and encoded data are correlated to each other for each precinct using an arbitrary method, the precinct No. confirmation unit 464 references information indicating the relation between the header information and encoded data to obtain the header information corresponding to the encoded data of the precinct to be processed from the packet header interpreting unit 411, and references the header information thereof to identify the precinct No. of the precinct to be processed. It goes without saying that another method other than these may be employed.

In the case of no loss of a precinct occurring as the confirmation result of the precinct No. confirmation unit 464, the parameter extraction instruction unit 465 is controlled by the read control unit 461 to supply parameter extraction instructions for extracting the parameters of the precinct to be processed from the header information, to the packet header interpreting unit 411.

In the case of no loss of a precinct occurring as the confirmation result of the precinct No. confirmation unit 464, the read instruction unit 466 is controlled by the read control unit 461 to supply read instructions to the Y buffer 422 and C buffer 423 to read out the encoded data (Y data and C data) of the precinct to be processed to supply this to the output control unit 424.

The dummy holding unit 467 is controlled by the read control unit 461 to hold dummy data which is data for substitution of lost coefficient data. Any data may be employed as the dummy data as long as this is encoded data in increments of precinct. For example, the dummy data may be encoded data obtained by an arrangement wherein one precinct worth of baseband image data having a predetermined color, such as white, black, gray, or the like, is subjected to wavelet transformation, rearranged, quantized, and subjected to entropy encoding, in the same way as with the encoding unit 201. That is to say, the dummy data in this case is encoded data whereby one precinct worth of baseband image data having a predetermined color such as gray or the like is obtained according to the decoding processing of the decoding unit 403. The dummy data may be any data as long as the data is prepared beforehand. That is to say, the image of image data employed as the dummy data may be any color, may be configured of multiple colors, or may include a figure, pattern, character, picture, or the like.

In the case of loss of a precinct occurring as the confirmation result of the precinct No. confirmation unit 464, the supplementation processing unit 468 is controlled by the read control unit 461 to obtain the dummy data from the dummy data holding unit 467, and output the dummy data thereof to the decoding unit 403 at the read timing of the lost encoded data in stead of the lost encoded data.

Description will be made with reference to FIG. 19 regarding a situation of readout control performed in increments of precinct, performed by the reception buffer control unit 402.

Figure 19:
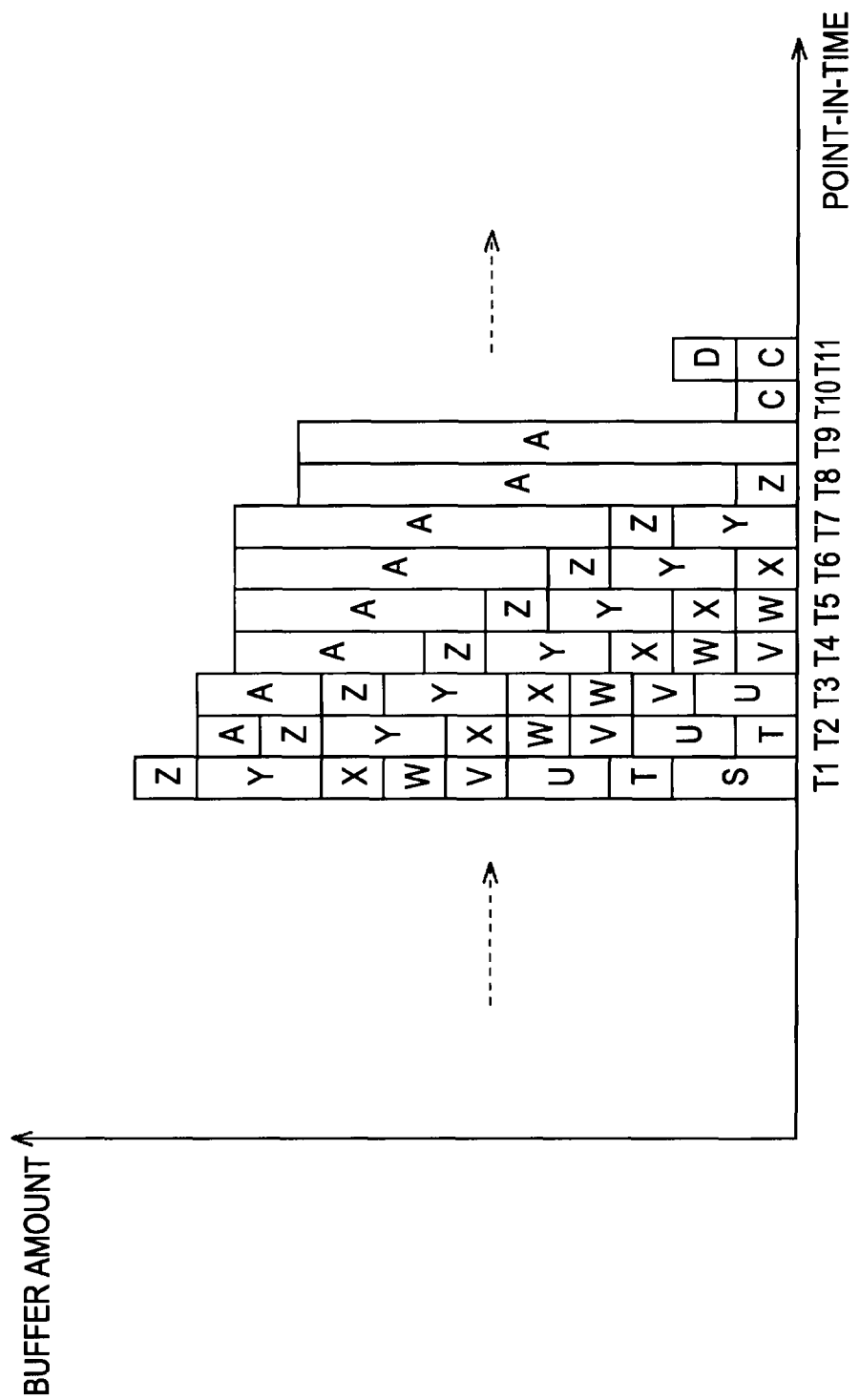
FIG. 19 is a schematic diagram illustrating an example of temporal change in the amount of encoded data which is readably stored in the buffer.

FIG. 19 is a diagram schematically illustrating temporal change in the data amount of the encoded data (Y data and C data) accumulated in the buffer (Y buffer 422 or C buffer 423) so as to be read out. The example shown in FIG. 19 is an example corresponding to the example shown in FIG. 12, and schematically illustrates temporal change in the data amount when control is performed such as the example shown in FIG. 12, and the encoded data output from the video signal encoding unit 120 is accumulated. That is to say, the data amount of the encoded data of the precinct A is very great as compared to the data amount of the encoded data of other precincts. Also, output of the encoded data of the precinct B is forbidden, so the encoded data of the precinct C is supplied following the precinct A.

Note that the description with reference to FIG. 19 that will be made below can be applied to both of the Y data and C data, so each of the Y buffer 422 and C buffer 423, and each of the Y data and C data are not distinguished here, and accordingly, these will be referred to the buffer and encoded data in the following description.

In FIG. 19 as well, in the same way as FIG. 12, the horizontal axis indicates point-in-time, and the vertical axis indicates the data amount (buffer amount) of the encoded data accumulated in the buffer so as to be read out. Each bar graph indicates the encoded data accumulated in the buffer at each point-in-time so as to be read out. Also, each square of bar graphs indicates encoded data for each precinct, and each precinct is distinguished with an alphabet within each square. The accumulated order of the encoded data are indicated from bottom up. Further, the length in the vertical axis direction of a bar graph indicates the data amount of the encoded data thereof. Now, let us say that the available storage capacity of the buffer, i.e., the restriction according to hardware is sufficiently great.

In the case of the example shown in FIG. 19, at point-in-time T1, the encoded data of precincts S through Z is accumulated in the buffer so as to be read out. At this T1, of the precincts of the encoded data accumulated in the buffer, the precinct S accumulated first is set as the precinct to be processed, and confirmation is made whether or not the precinct No. thereof follows the precinct No. of the precinct processed last time. In the event that determination is made according to this confirmation that loss of a precinct (encoded data) does not occur, the parameter extraction instruction unit 465 extracts the parameters of the precinct S which is the precinct to be processed and supplies these to the decoding unit 403. Also, the read instruction unit 466 supplies read instructions to the buffer to read out the coefficient data of the precinct S and supply this to the output control unit 424. The Y data read out from the Y buffer 422 and the C data read out from the C buffer 423 are multiplexed at the output control unit 424 and supplied to the decoding unit 403.

Accordingly, at point-in-time T2 wherein predetermined time has elapsed since point-in-time T1, the encoded data of the precinct S is all read out from the buffer and eliminated from the buffer, in stead of this, the precinct A is supplied from the input control unit 421 generally at a predetermined constant bit rate and accumulated in the buffer. At this point-in-time T2, the precinct to be processed is set to the precinct T following the precinct S, and in the same way as the above-mentioned case of the precinct S, the encoded data thereof is read out.

At point-in-time T3 wherein predetermined time has elapsed since point-in-time T2, the encoded data of the precinct T is all read out from the buffer and eliminated from the buffer. Also, accumulation of the precinct A is subsequently performed at a predetermined bit rate. At this point-in-time T3, the precinct to be processed is set to the precinct U following the precinct T, and in the same way as the above-mentioned case of the precinct T, the encoded data thereof is read out.

At point-in-time T4 wherein predetermined time has elapsed since point-in-time T3, the encoded data of the precinct U is all read out from the buffer and eliminated from the buffer. Also, accumulation of the precinct A is subsequently performed at a predetermined bit rate. At this point-in-time T4, the precinct to be processed is set to the precinct V following the precinct U, and in the same way as the above-mentioned case of the precinct U, the encoded data thereof is read out.

At point-in-time T5 wherein predetermined time has elapsed since point-in-time T4, the encoded data of the precinct V is all read out from the buffer and eliminated from the buffer. Also, accumulation of the precinct A is subsequently performed at a predetermined bit rate. At this point-in-time T5, the precinct to be processed is set to the precinct W following the precinct V, and in the same way as the above-mentioned case of the precinct V, the encoded data thereof is read out.

At point-in-time T6 wherein predetermined time has elapsed since point-in-time T5, the encoded data of the precinct W is all read out from the buffer and eliminated from the buffer. Also, accumulation of the precinct A is subsequently performed at a predetermined bit rate. At this point-in-time T6, the precinct to be processed is set to the precinct X following the precinct W, and in the same way as the above-mentioned case of the precinct W, the encoded data thereof is read out.

At point-in-time T7 wherein predetermined time has elapsed since point-in-time T6, the encoded data of the precinct X is all read out from the buffer and eliminated from the buffer. Also, accumulation of the precinct A is subsequently performed at a predetermined bit rate. At this point-in-time T7, the precinct to be processed is set to the precinct Y following the precinct X, and in the same way as the above-mentioned case of the precinct X, the encoded data thereof is read out.

At point-in-time T8 wherein predetermined time has elapsed since point-in-time T7, the encoded data of the precinct Y is all read out from the buffer and eliminated from the buffer. Also, accumulation of the precinct A is subsequently performed at a predetermined bit rate. At this point-in-time T8, the precinct to be processed is set to the precinct Z following the precinct Y, and in the same way as the above-mentioned case of the precinct Y, the encoded data thereof is read out.

At point-in-time T9 wherein predetermined time has elapsed since point-in-time T8, the encoded data of the precinct Z is all read out from the buffer and eliminated from the buffer. At this point-in-time T9, finally accumulation of the precinct A is completed. That is to say, the data amount of the encoded data of the precinct A in this case is very high as compared to the data amount of the encoded data of other precincts. In such a case, at point-in-time T9, the precinct to be processed is set to the precinct A which is the precinct following the precinct Z, of which accumulation has just been completed, and in the same way as with the case of the above-mentioned precinct Z, the encoded data thereof is read out.

As described above, output of the encoded data of the precinct B is forbidden at the transmission buffer control unit 202, so the encoded data of the precinct C is supplied following the precinct A.

Accordingly, at point-in-time T10 wherein predetermined time has elapsed since point-in-time T9, the encoded data of the precinct A is all read out from the buffer and eliminated from the buffer, and the encoded data of the precinct C is accumulated in the buffer at a predetermined bit rate. At this point-in-time T10, the precinct to be processed is set to the precinct C supplied after the precinct A, but originally the precinct B should be set to the precinct to be processed, and accordingly, the precinct Nos. are not consecutive. Therefore, instead of this lost precinct B, the dummy data is read out and supplied to the decoding unit 403. During that time, accumulation of the encoded data of the precinct C is continued, and ends.

Upon accumulation of the encoded data of the precinct C being completed, accumulation of the encoded data of the precinct D subsequently supplied is started.

Accordingly, at point-in-time T11 wherein predetermined time has elapsed since point-in-time T10, the encoded data of the precinct B is all read out from the buffer and eliminated from the buffer, accumulation of the encoded data of the precinct C ends, and the encoded data of the precinct D is accumulated in the buffer at a predetermined bit rate.

At this point-in-time T11, the precinct to be processed is still the precinct C, the precinct Nos. are consecutive from the precinct B subjected to supplementation processing last time, so the encoded data of the precinct C is read out from the buffer and supplied to the decoding unit 403.

Figure 20:
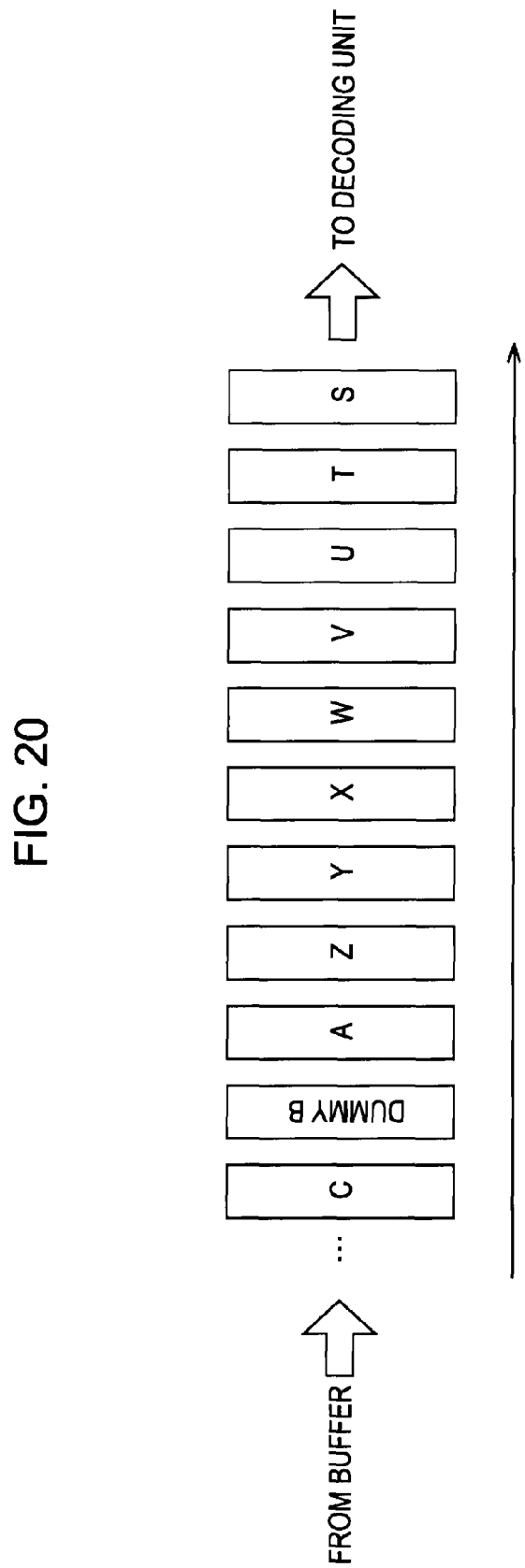
FIG. 20 is a diagram for describing the output order of encoded data from the reception buffer control unit shown in FIG. 16.

That is to say, as shown in FIG. 20, the encoded data is output for each precinct in order of the precinct S, precinct T, precinct U, and so on through precinct A, and following the precinct A, one precinct worth of dummy data (dummy B) prepared beforehand instead of the encoded data of the lost precinct B is output. That is to say, the lost encoded data is supplemented with the dummy data.

For example, if loss of encoded data is one field worth of one precinct alone, with an output image, only several line images are lost during around 16 msec., so deterioration in image quality is not conspicuous so much. Also, the encoded data of a visually conspicuous color image such as gray or the like is taken as the dummy data, whereby the reception buffer control unit 402 can make deterioration in image quality due to loss of encoded data further conspicuous.

Note that, as shown in FIG. 19, the bank over control processing has been performed at the video signal encoding unit 120, and output of the precinct B has been forbidden, so the encoded data of the precinct C is supplied following the precinct A, but thus, accumulation of the encoded data of the precinct C has been performed at point-in-time T10 originally serving as the output timing of the precinct B. Accordingly, time for accumulating the encoded data of the precinct C can be sufficiently ensured until point-in-time T11 serving as the output timing of the precinct C, accumulation of the encoded data of the precinct C can be completed at point-in-time T11 serving as the output timing of the precinct C. That is to say, at point-in-time T11 the reception buffer control unit 402 can supply all of the encoded data of the precinct C to the decoding unit 403.

Figure 21:
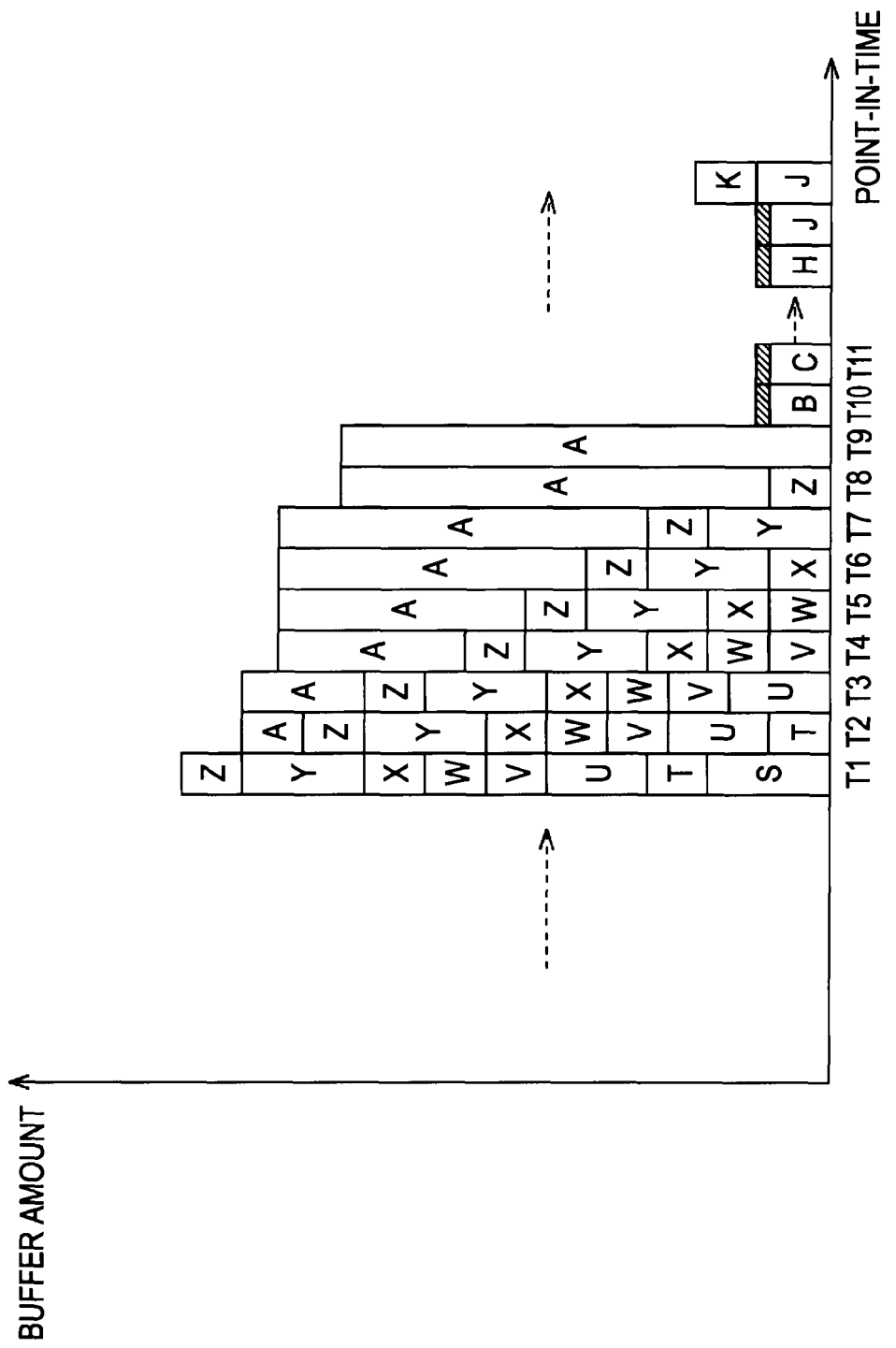
FIG. 21 is a schematic diagram illustrating another example of temporal change in the amount of encoded data which is readably stored in the buffer.

If the video signal encoding unit 120 does not perform the bank over control processing such as described above, as shown in FIG. 21, at point-in-time T10 the encoded data of the precinct B is supplied, and subsequently, encoded data is supplied in the order of the precinct C, precinct D, and so on through precinct H, precinct J, and precinct K.

As described above, point-in-time 10 is the output timing of the precinct B, but accumulation of the encoded data of the precinct B has been started from point-in-time T9, so all of the encoded data of the precinct B has not necessarily been accumulated at point-in-time 10. That is to say, as shown in slanting lines with the precinct B at point-in-time T10 shown in FIG. 21, there is a possibility that there is unaccumulated encoded data. At this stage (point-in-time T10), if the encoded data of the precinct B is supplied to the decoding unit 403, there is a possibility that unaccumulated portion of the encoded data is lost, so the image quality of an output image deteriorates.

Subsequently, accumulation of the encoded data of the precinct C following the precinct B is started from point-in-time T10, so in the same way as with the case of the precinct B, at point-in-time T11 serving as the output timing, all of the encoded data of the precinct C is not necessarily accumulated in the buffer, and there is a possibility that as shown in slating lines, there is unaccumulated encoded data. At this stage (point-in-time T11) if the encoded data of the precinct C is supplied to the decoding unit 403, there is a possibility that unaccumulated portion of the encoded data is lost, so the image quality of an output image deteriorates.

That is to say, in a case wherein there is a precinct which takes time for transmission like the precinct A, with the buffer (Y buffer 422 and C buffer 423) on the reception side, encoded data to be accumulated runs short, and so-called underflow occurs. At this time, in a case wherein the video signal encoding unit 120 does not perform the bank over control processing such described above, there is a possibility that underflow occurs at each precinct like the precinct B through precinct J shown in FIG. 21. That is to say, there is a possibility that an unaccumulated portion is caused such as shown in slanting lines at readout timing due to too short accumulation time at each precinct, and consequently, underflow is not eliminated over a long duration.

If underflow is thus expanded, there is a possibility that image quality deteriorated lines (range) of an output image will increase, and accordingly, image quality deterioration will be conspicuous.

The video signal encoding unit 120 performs the bank over processing such as described above, whereby occurrence of underflow is restricted to one precinct, and expansion of occurrence of unnecessary underflow can be suppressed, and accordingly, image quality deteriorated lines (range) of an output image can be suppressed.

Figure 22:
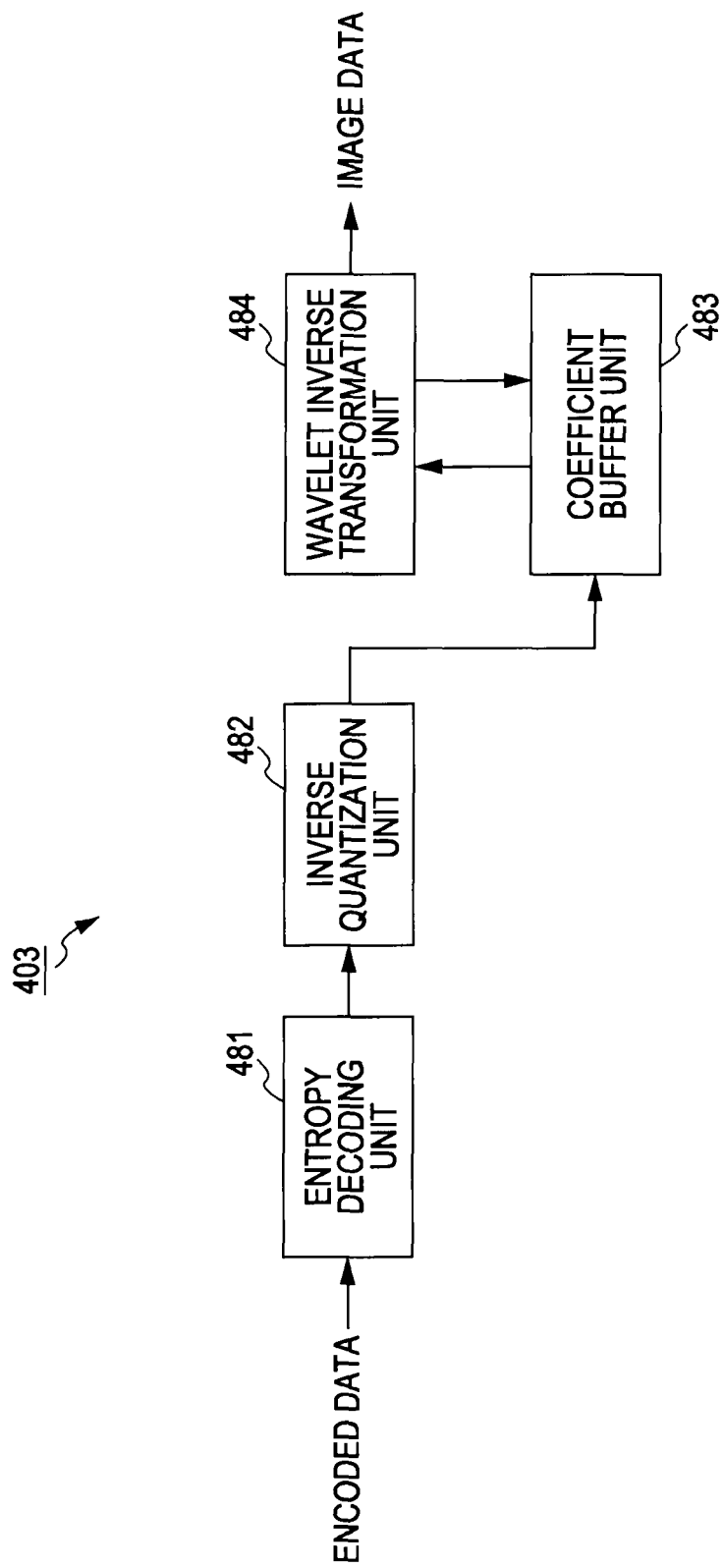
FIG. 22 is a block diagram illustrating a detailed configuration example of a decoding unit shown in FIG. 16.

Next, the details of the decoding unit 403 shown in FIG. 16 will be described. FIG. 22 is a block diagram illustrating a detailed configuration example of the decoding unit 403. The decoding unit 403 is a decoding unit corresponding to the decoding unit 20 in FIG. 2, and as can be seen in FIG. 22, includes an entropy decoding unit 481, inverse quantization unit 482, coefficient buffer unit 483, and wavelet inverse transformation unit 484.

Upon obtaining encoded data from the reception buffer control unit 402, the entropy decoding unit 481 performs entropy decoding of the encoded data for each line, and supplies the obtained coefficient data to the inverse quantization unit 482. The inverse quantization unit 482 subjects the supplied coefficient data to inverse quantization based on information relating to quantization which is included in parameters obtained from the packet header interpreting unit 411 of the reception buffer control unit 402, and supplies the obtained coefficient data to the coefficient buffer unit 483 to be stored. The wavelet inverse transformation unit 484 uses the coefficient data stored in the coefficient buffer unit 483 to perform synthesis filtering processing by synthesis filter, and stores the results of the synthesis filtering processing in the coefficient buffer unit 483 again. The wavelet inverse transformation unit 484 repeats this processing in accordance with the division level, and obtains decoded image data (output image data). The wavelet inverse transformation unit 484 externally outputs the output image data from the decoding unit 403.

Generally, with wavelet inverse transformation, first, horizontal synthesis filtering processing has been performed in the horizontal direction on all coefficients of the division level to be processed, and then vertical synthesis filtering processing in the vertical direction. That is to say, each time that each synthesizing filtering process is performed, there is the need to hold the results of the synthesizing filtering processing in the buffer, but there is a need to hold the synthesizing filtering results of the division level at that point-in-time and all coefficients of the next division level, requiring great memory capacity, i.e., the amount of data to be held is great.

Also, in this case, no image data output is performed until all wavelet inverse transformation within the picture (field, in the case of interlaced), so delay time from input to output increases.

Conversely, in the case of the wavelet inverse transformation unit 484, horizontal synthesizing filtering processing and vertical synthesizing filtering processing is performed to level 1 in increments of precincts, so the amount of data which needs to be buffered at once (at the same period) is smaller as compared with the method employed by the related art, so the capacity of the buffer which needs to be provided can be markedly reduced. Also, performing synthesizing filtering processing (wavelet inverse transformation) to level 1 enables image data to be sequentially output in precinct increments before all image data of the picture is obtained, thereby markedly reducing delay time as compared with the method employed by the related art.

Figure 23:
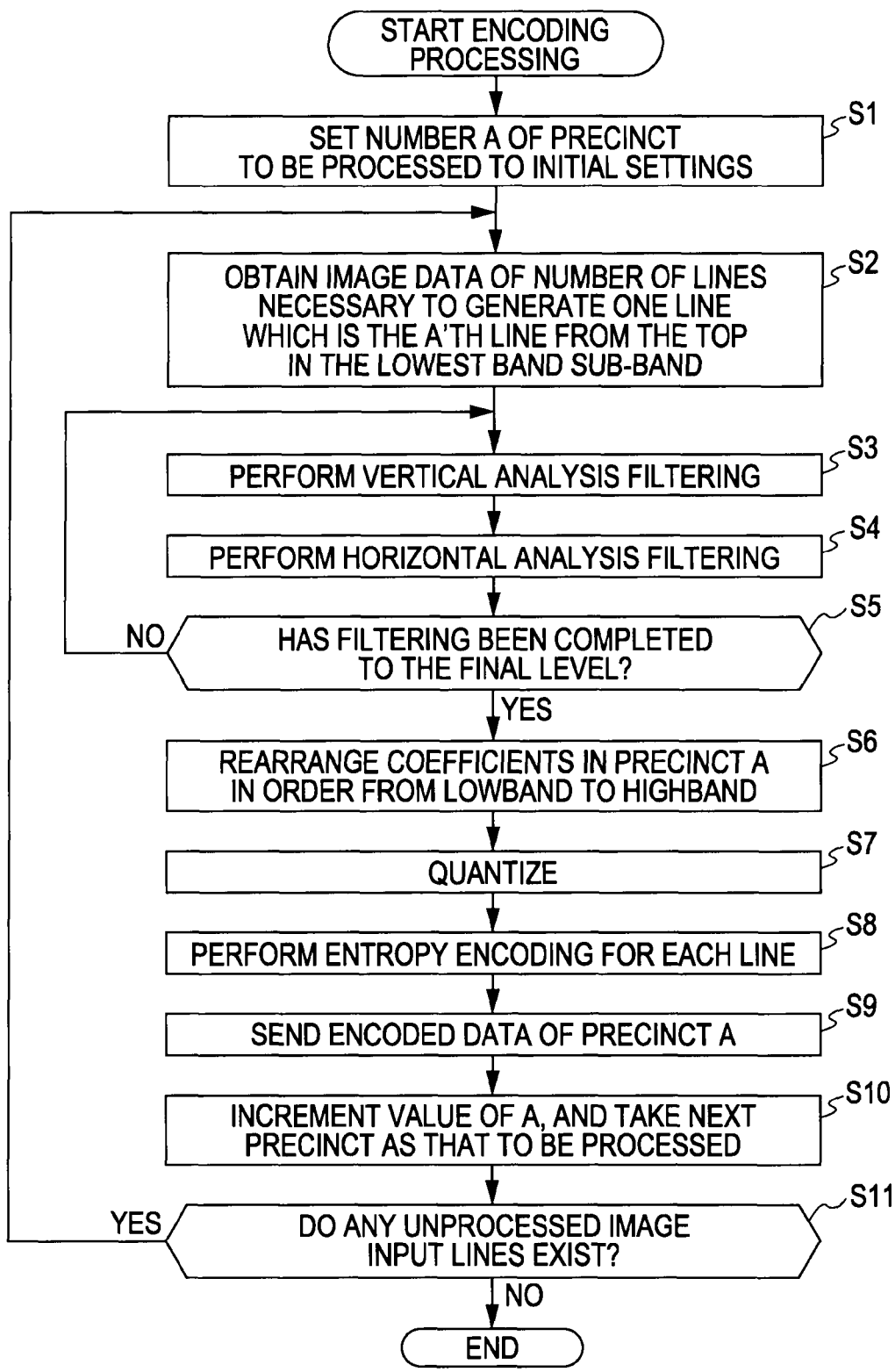
FIG. 23 is a flowchart for describing an example of the flow of encoding processing.

Next, the processing executed by the components of the digital triax system 100 described above will be described. An example of the flow of encoding processing executed by the encoding unit 201 (FIG. 3) of the video signal encoding unit 120 of the transmission unit 110 will be described with reference to the flowchart shown in FIG. 23.

Upon the encoding processing starting, in step S1 the wavelet transformation unit 221 sets a number A of the precinct to be processed to initial settings. In a normal case, the number A is set to "1". Upon the setting ending, in step S2 the wavelet transformation unit 221 obtains image data of the number of lines necessary to generate one line (i.e. one precinct) which is the A'th from the top in the lowest band sub-band, and for this image data, in step S3 performs vertical analyzing filtering processing which performs analyzing filtering as to the image data arranged in the vertical direction of the screen, and in step S4 performs horizontal analyzing filtering processing which performs analyzing filtering processing as to the image data arranged in the horizontal direction of the screen.

In step S5, the wavelet transformation unit 221 determines whether or not the analyzing filtering processing is performed to the final level. In the case determination is made that the division level has not achieved the final level, the processing is returned to step S3, and the analyzing filtering processing in steps S3 and S4 are repeated as to the current division level.

In step S5, in the event that determination is made that the analyzing filtering processing is performed to the final level, the processing advances to step S6.

In step S6, the coefficient rearranging unit 224 rearranges the coefficients of the precinct A (A'th precinct from the top of the picture (field in the case of interlaced)) in order from lowband to highband. In step S7, the quantization unit 225 quantizes the rearranged coefficients using a predetermined quantization coefficient. In step S8, the entropy encoding unit 227 entropy encodes the coefficients thereof for every line, and in step S9, sends out the encoded data of the precinct A.

In step S10, the wavelet transformation unit 221 increments the value of number A by "1" and subjects the next precinct to processing, and in step S11 determines whether or not the picture (field in the case of interlaced) to be processed has any unprocessed image input lines. In the case determination is made that there are unprocessed image input lines, the processing returns to step S2, and the processing thereafter is repeated as to the new precinct to be processed.

Thus, the processing in steps S2 through S10 is repeatedly executed, and each precinct is encoded. In step 11, in the case determination is made that there are no unprocessed image input lines, the encoding processing as to this picture is ended. New encoding processing is started as to the next picture.

Thus, the wavelet transformation unit 221 continuously performs vertical analyzing filtering processing and horizontal analyzing filtering processing in increments of precincts until the final level, so compared to a currently used method, the amount of data needed to hold (buffer) at one time (at the same period) is small, so the capacity of memory in the buffer to be provided can be greatly reduced. Also, by performing analyzing filtering processing until the final level, latter stage processing such as coefficient rearranging or entropy encoding can also be performed (i.e. coefficient rearranging and entropy encoding can be performed in increments of precincts). Accordingly, compared to the method to perform wavelet transformation as to the entire screen, the delay time can be greatly reduced.

Figure 24:
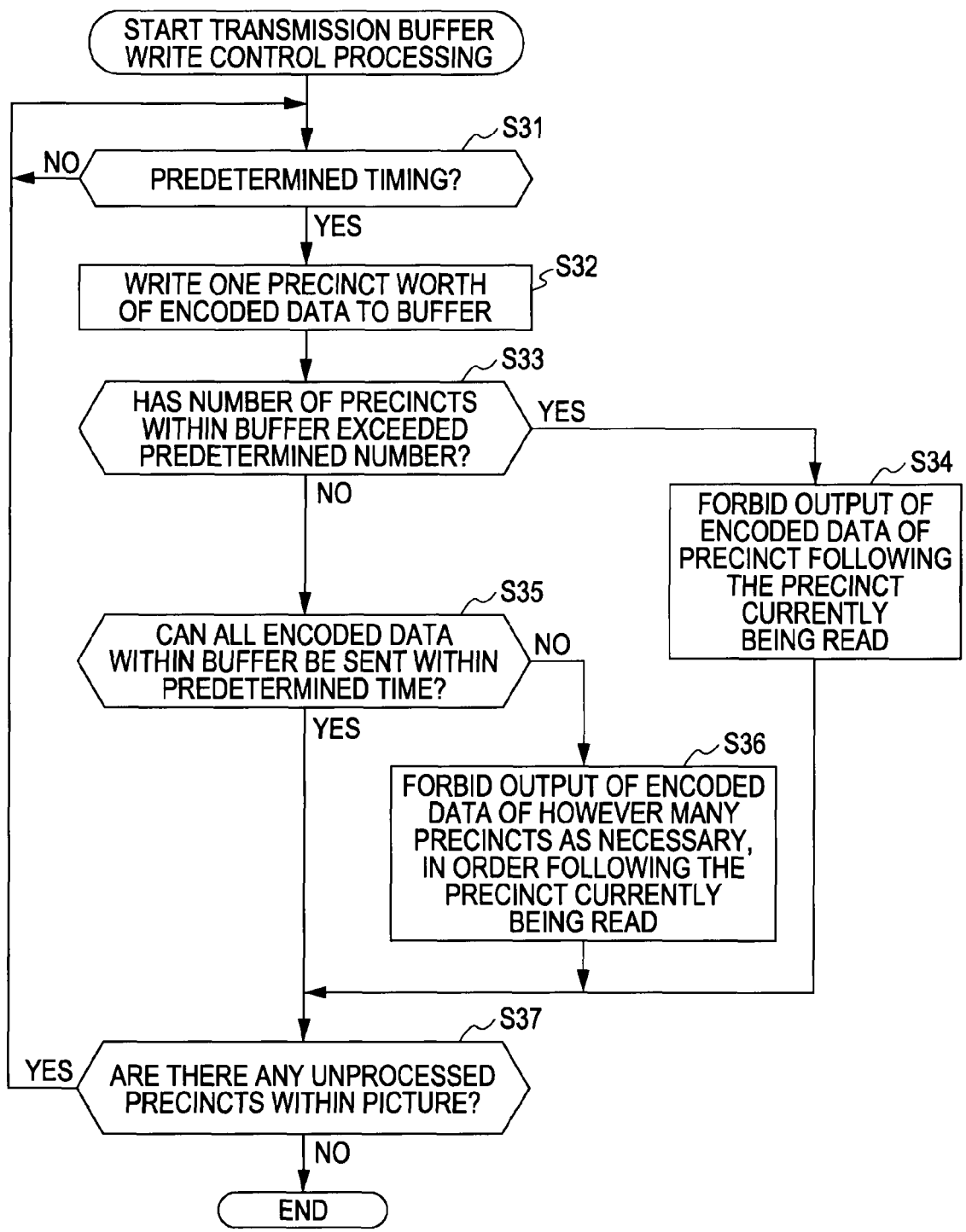
FIG. 24 is a flowchart for describing an example of transmission buffer write control processing.

Next, an example of the flow of transmission buffer write control processing executed by the transmission buffer write control processing unit 271 (FIG. 11) will be described with reference to the flowchart shown in FIG. 24.

Upon the transmission buffer write control processing being started, in step S31 the write control unit 281 determines whether or not the timing is a predetermined timing, and stands by until determination is made that the timing is the predetermined timing. In the event that determination is made that the timing is a predetermined timing, the flow proceeds to step S32. In step S32, the write instruction unit 282 supplies a write instruction to the Y data write control unit 251 and C data write control unit 252, so as to write encoded data of one precinct worth to the buffer.

In step S33, the number-of-precincts confirmation unit 284 calculates the number of precincts of encoded data accumulated in the buffer, and determines whether or not the number of precincts in the buffer exceeds a predetermined threshold set beforehand. In the event that determination is made that the threshold has been exceeded, the flow proceeds to step S34. In step S34, the output forbidding unit 285 forbids output of the encoded data of the next precinct following the precinct currently being read. Upon the processing if step S34 ending, the flow proceeds to step S37.

On the other hand, in the event that determination is made in step S33 that the number of precincts in the buffer is within the threshold, the flow proceeds to step S35. In step S35, the send time confirmation unit 283 calculates the total send time of the encoded data accumulated in the buffer, and makes determination regarding whether or not all of the encoded data within the buffer can be sent out within a predetermined time. In the event that determination is made that all of the encoded data cannot be sent within this time, the flow proceeds to step S36. In step S36, the output forbidding unit 285 forbids output of encoded data of the number of precincts necessary in output order, from the next precinct following the precinct currently being read. Upon the processing of step S36 ending, the flow proceeds to step S37.

Also, in the event that determination is made in step S35 that all of the encoded data within the buffer can be sent out within the predetermined time, the flow proceeds to step S37.

In step S37, the write control unit 281 determines whether or not there is an unprocessed precinct within the picture. In the event that determination is made that there is an unprocessed precinct within the picture, the flow returns to step S31, and subsequent processing is repeated. Also, in the event that determination is made in step S37 that there is no unprocessed precinct within the picture, the transmission buffer write control processing ends.

Figure 25:
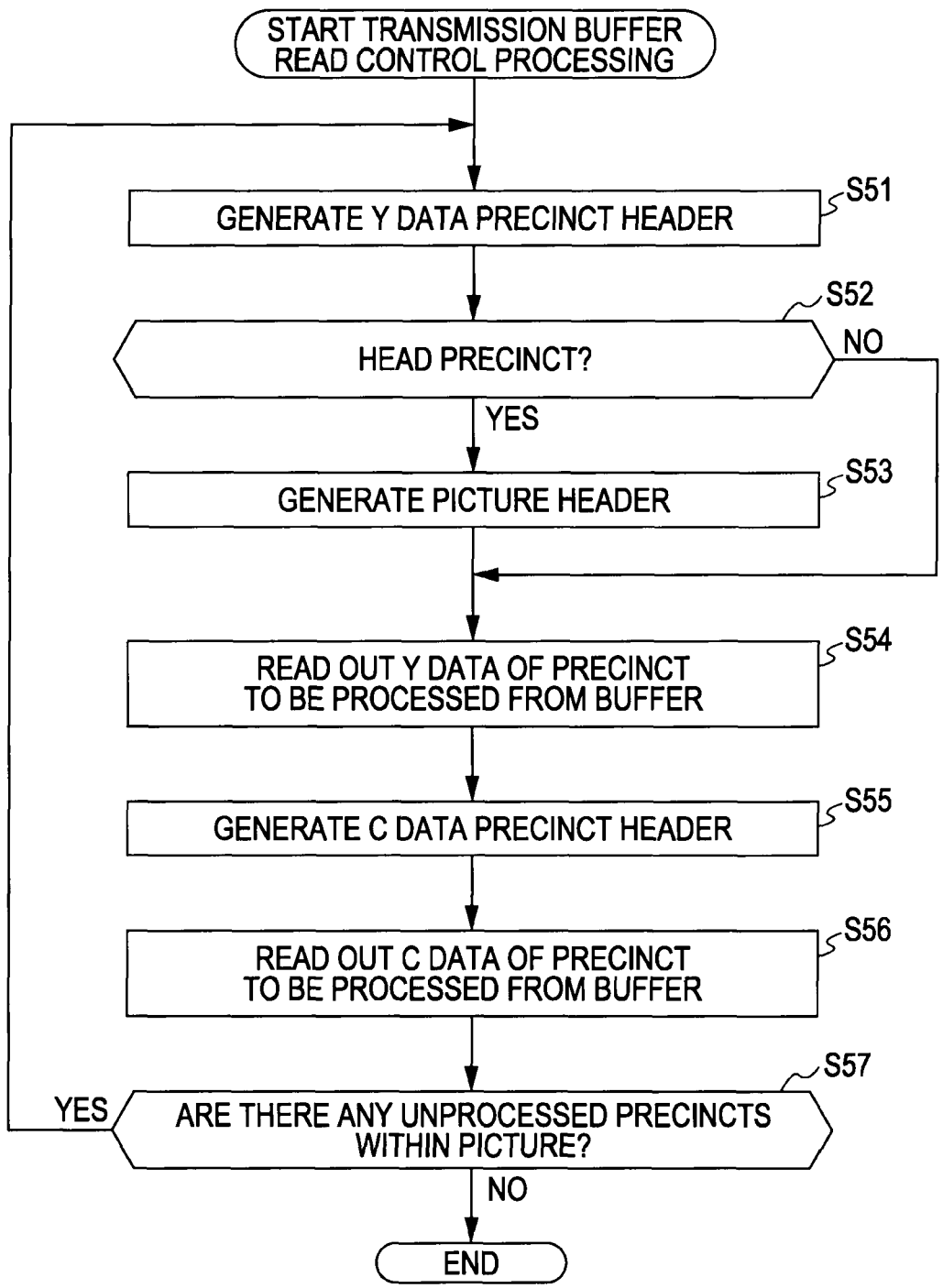
FIG. 25 is a flowchart for describing an example of transmission buffer read control processing.

Next, an example of the flow of transmission buffer read control processing executed by the transmission buffer read control processing unit 272 (FIG. 11) will be described with reference to the flowchart shown in FIG. 25.

Upon the transmission buffer read control processing starting, in step S51, the precinct header generating unit 292 generates a Y data precinct header. In step S52, the read control unit 291 determines whether or not the current precinct is the head precinct. In the event that determination is made that the current precinct is the head precinct, the flow proceeds to step S53. In step S53, the picture header generating unit 293 generates a picture header, upon which the flow proceeds to step S54. Also, in the event that determination is made in step S52 that the current precinct is not the head precinct, the processing of step S53 is omitted, and the flow proceeds to step S54.

In step S54, the read instruction unit 294 instructs the Y buffer 253 to read out the Y data of the precinct to be processed. In step S55, the precinct header generating unit 292 generates a precinct header for the C data. In step S56, the read instruction unit 294 instructs the C buffer 254 to read out the C data of the precinct to be processed. Upon the processing in step S56 ending, the flow proceeds to step S57.

In step S57, the read control unit 291 determines whether or not an unprocessed precinct exists in the picture. In the event that determination is made that an unprocessed precinct exists in the picture, the flow returns to step S51, and subsequent processing is repeated. Also, in the event that determination is made in step S57 that there is no unprocessed precinct within the picture, the transmission buffer read control processing ends. New transmission buffer read control processing is performed on the next picture.

Next, an example of the flow of the reception buffer write control processing executed by the precinct information control unit 431 (FIG. 18) will be described with reference to the flowchart shown in FIG. 26.

Upon the reception buffer write control processing starting, in step S71 the write control unit 451 of the reception buffer write control processing unit 441 determines whether or not encoded data has been supplied to the input control unit 421, and stands by until determination is made to that effect. In the event that determination is made that encoded data has been supplied, the flow proceeds to step S72.

In step S72, the write instruction unit 452 performs a write instruction to the input control unit 421 so as to accumulate Y data in the Y buffer by precinct. The input control unit 421 supplies the Y data to the Y buffer 422 based on the instructions, and accumulates by precinct.

In step S73, the write instruction unit 452 performs a write instruction to the input control unit 421 so as to accumulate C data in the C buffer 423 by precinct. The input control unit 421 supplies the C data to the C buffer 423 based on the instructions, and accumulates by precinct.

In step S74, the write control unit 451 determines whether or not an unprocessed precinct exists in the picture being processed. In the event that determination is made that an unprocessed precinct exists, the flow returns to step S71, and subsequent processing is repeated. Also, in the event that determination is made in step S74 that there is no unprocessed precinct within the picture, the reception buffer write control processing ends. New reception buffer write control processing is performed on the next picture.

Next, an example of the flow of the reception buffer read control processing executed by the precinct information control unit 431 (FIG. 18) will be described with reference to the flowchart shown in FIG. 27.

Upon the reception buffer read control processing starting, in step S91 the precinct No. confirmation unit 464 sets, of the encoded data accumulated in the buffers (Y buffer 422 and C buffer 423), the oldest precinct as the precinct to be processed. In step S92, the read control unit 461 determines whether or not the timing is a predetermined timing, and stands by until determination is made that the timing is the predetermined timing. In the event that determination is made that the timing is a predetermined timing, the flow proceeds to step S93.

In step S93, the precinct No. confirmation unit 464 determines whether or not the precinct No. of the precinct to be processed is continuous with the precinct No. of the precinct read out from the buffer the previous time or subjected to supplementation processing. Note that in the event that the precinct to be processed is the first precinct in the picture to be processed, the precinct No. confirmation unit 464 determines whether or not the precinct to be processed is the top precinct in the picture, i.e., whether or not the precinct No. of the precinct to be processed is 1.

In the event that determination is made that the precinct Nos. are consecutive, the flow proceeds to step S94. In this case, determination has been made that no bank over control processing has been performer at the transmission buffer control unit 202, so in step S94, the parameter extraction instruction unit 465 gives a parameter extraction instruction to the packet header interpreting unit 411 so as to extract parameter information of the precinct to be processed from the header information. The packet header interpreting unit 411 extracts the parameter information of the precinct to be processed from the header information based on this instruction, and supplies this to the decoding unit 403.

In step S95, the read instruction unit 466 gives a read instruction to the Y buffer 422 so as to read out the Y data of the precinct to be processed. The Y buffer 422 reads out the Y data of the precinct to be processed based on this instruction, and supplies this to the output control unit 424. In step S96, the read instruction unit 466 gives a read instruction to the C buffer 423 so as to read out the C data of the precinct to be processed. The C buffer 423 reads out the C data of the precinct to be processed based on this instruction, and supplies this to the output control unit 424. The output control unit 424 multiplexes the supplied Y data and C data, and supplies this to the decoding unit 403. Upon the processing of step S96 ending, the flow proceeds to step S98.

In the event that determination is made in step S93 that the precinct Nos. are not consecutive, the flow proceeds to step S97. In this case, determination has been made that there is loss of encoded data. In step S97, the supplementation processing unit 468 obtains dummy data from the dummy data holding unit 467 and supplies the dummy data to the decoding unit 403, thereby supplementing the lost encoded data. Upon processing in step S97 ending, the flow proceeds to step S98.

In step S98, the read control unit 451 determines whether or not an unprocessed precinct exists in the picture being processed. In the event that determination is made that an unprocessed precinct exists, the flow returns to step S91, and subsequent processing is repeated. That is to say, processing is performed on the next precinct. Also, in the event that determination is made in step S93 that the precinct Nos. are not consecutive, the encoded data of the precinct to be processed has not been read out yet, so determination is made that an unprocessed precinct exists. That is to say, in this case, the flow returns to step S91.

Thus, a loop of the processes of steps S91 through 98 is executed on each precinct. Note that in step s91, the oldest precinct is set to be the precinct to be processed, so in the event of supplementation with dummy data in step S97 in the previous loop, the encoded data of the precinct set to be the precinct to be processed in the previous loop has not been read out from the buffer, and accordingly the same precinct is taken as the precinct to be processed.

In the event that determination is made in step S98 that there is no unprocessed precinct within the picture, the reception buffer write control processing ends. New reception buffer write control processing is performed on the next picture.

Figure 28:
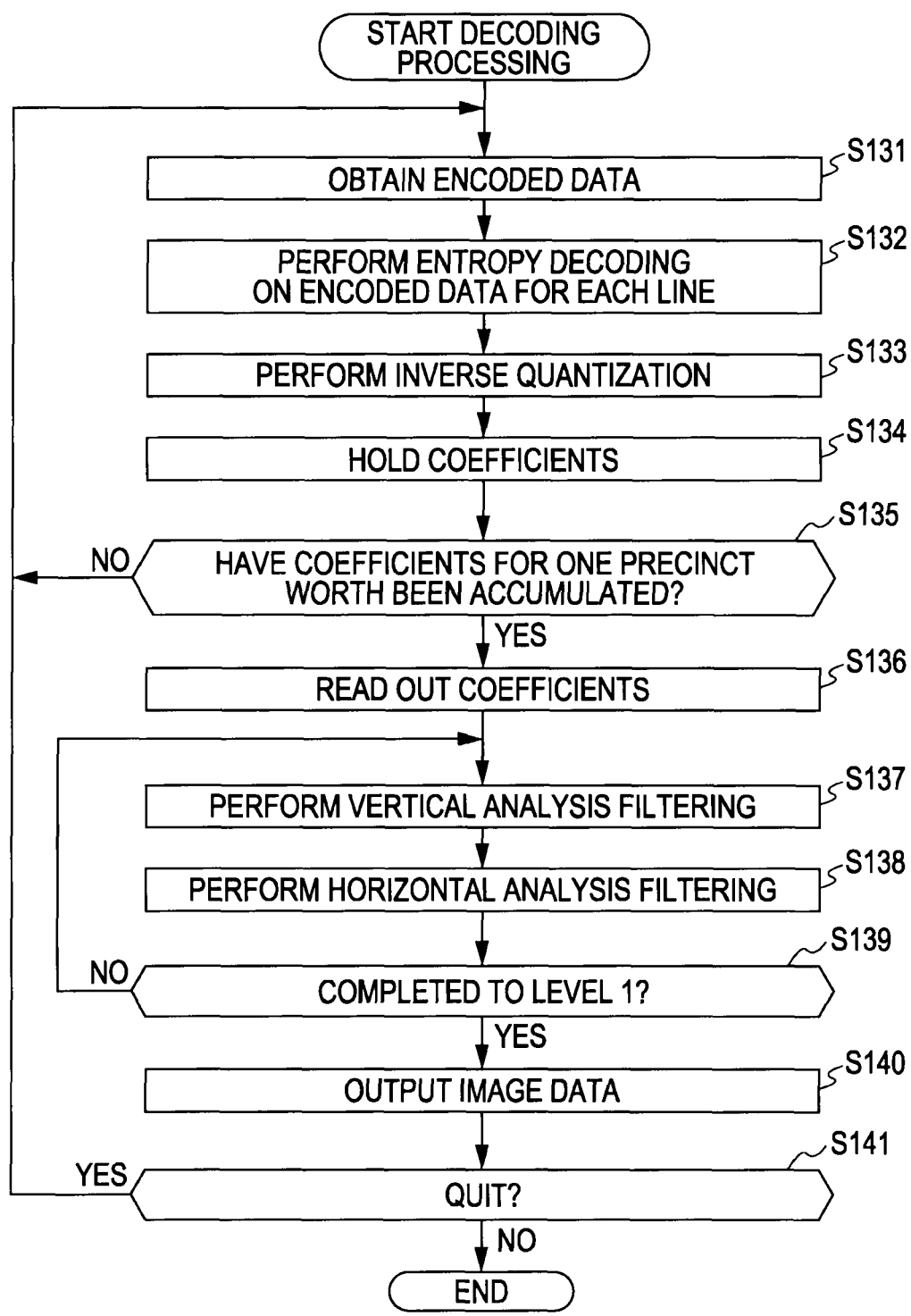
FIG. 28 is a flowchart for describing an example of the flow of decoding processing.

Next, an example of flow of the decoding processing executed with the decoding unit 403 (FIG. 22) will be described with reference to the flowchart in FIG. 28. This decoding processing corresponds to the encoding processing shown in the flowchart in FIG. 23.

Upon the decoding processing starting, in step S131 the entropy decoding unit 481 obtains encoded data, and in step S132 entropy decodes the encoded data for each line. In step S133, the inverse quantization unit 482 performs inverse quantization on the coefficient data obtained by entropy decoding. In step S134, the coefficient buffer unit 483 holds the coefficient data which has been obtained by inverse transformation. In step S135 the wavelet inverse transformation unit 484 determines whether or not one precinct worth of coefficient data is accumulated in the coefficient buffer unit 483. In the case determination is made that one precinct worth of coefficient data has not been accumulated, the processing is returned to step S131, and the processing thereafter is executed. That is to say, the wavelet inverse transformation unit 484 stands by until one precinct worth of coefficient data is accumulated in the coefficient buffer unit 483.

In the case determination is made in step S135 that one precinct worth of coefficient data has been accumulated in the coefficient buffer unit 483, the processing is advanced to step S136. In step S136, the wavelet inverse transformation unit 484 reads the one precinct worth of coefficient data which is held in the coefficient buffer unit 483, and in step S137, regarding the read out coefficient data, performs vertical synthesizing filtering processing which wherein synthesizing filtering processing is performed as to the coefficient data arranged in the vertical direction on the screen, and in step S138 performs horizontal synthesizing filtering processing wherein synthesizing filtering processing is performed as to the coefficient data arranged in the horizontal direction on the screen. In step S139, the wavelet inverse transformation unit 484 determines whether or not the synthesizing filtering processing is finished through level 1 (the level wherein the division level value is "1"), i.e., whether or not inverse transformation has been performed until the state before wavelet transformation is achieved. In the case that determination is made that level 1 has not been achieved, the processing is returned to step S137, and the filtering processing of steps S137 and S138 is repeated until level 1 is reached.

In step S139, in the case determination is made that wavelet inverse transformation processing is finished through level 1, the processing is advanced to step S140. In step S140, the wavelet inverse transformation unit 484 externally outputs from the decoding unit 403 the image data obtained from the wavelet inverse transformation processing.

In step S141, the entropy decoding unit 481 determines whether or not to end the decoding processing. In the case determination is made to not end the decoding processing, the processing is returned to step S131, and the processing thereafter is repeated. Also, in step S141, in the case determination is made to end decoding processing by finishing the precinct and so forth, the decoding processing is ended.

Thus, in the case of the wavelet inverse transformation unit 484, horizontal synthesizing filtering processing and vertical synthesizing filtering processing is performed to level 1 in increments of precincts, so the amount of data which needs to be buffered at once (at the same period) is smaller as compared with the method employed by the related art, so the capacity of the buffer which needs to be provided can be markedly reduced. Also, performing synthesizing filtering processing (wavelet inverse transformation) to level 1 enables image data to be sequentially output in precinct increments before all image data of the picture is obtained, thereby markedly reducing delay time as compared with the method employed by the related art.

The transmission side performs the bank over control processing such as described above, and the reception side performs supplementation processing in accordance with the bank over control, whereby increase of unnecessary delay time can be easily suppressed in data transmission of contents, and also unnecessary deterioration in the quality of contents can be suppressed.

Such data transmission processing is particularly effective in a system wherein immediacy (real-time nature) at the time of data transmission, i.e., reduction in delay time, is demanded. Also, the above-described bank over control processing and supplementation processing can be performed in increments of precincts, and accordingly are particularly suitable of application to systems employing encoding processing and decoding processing performed in increments of precincts.

Figure 29:
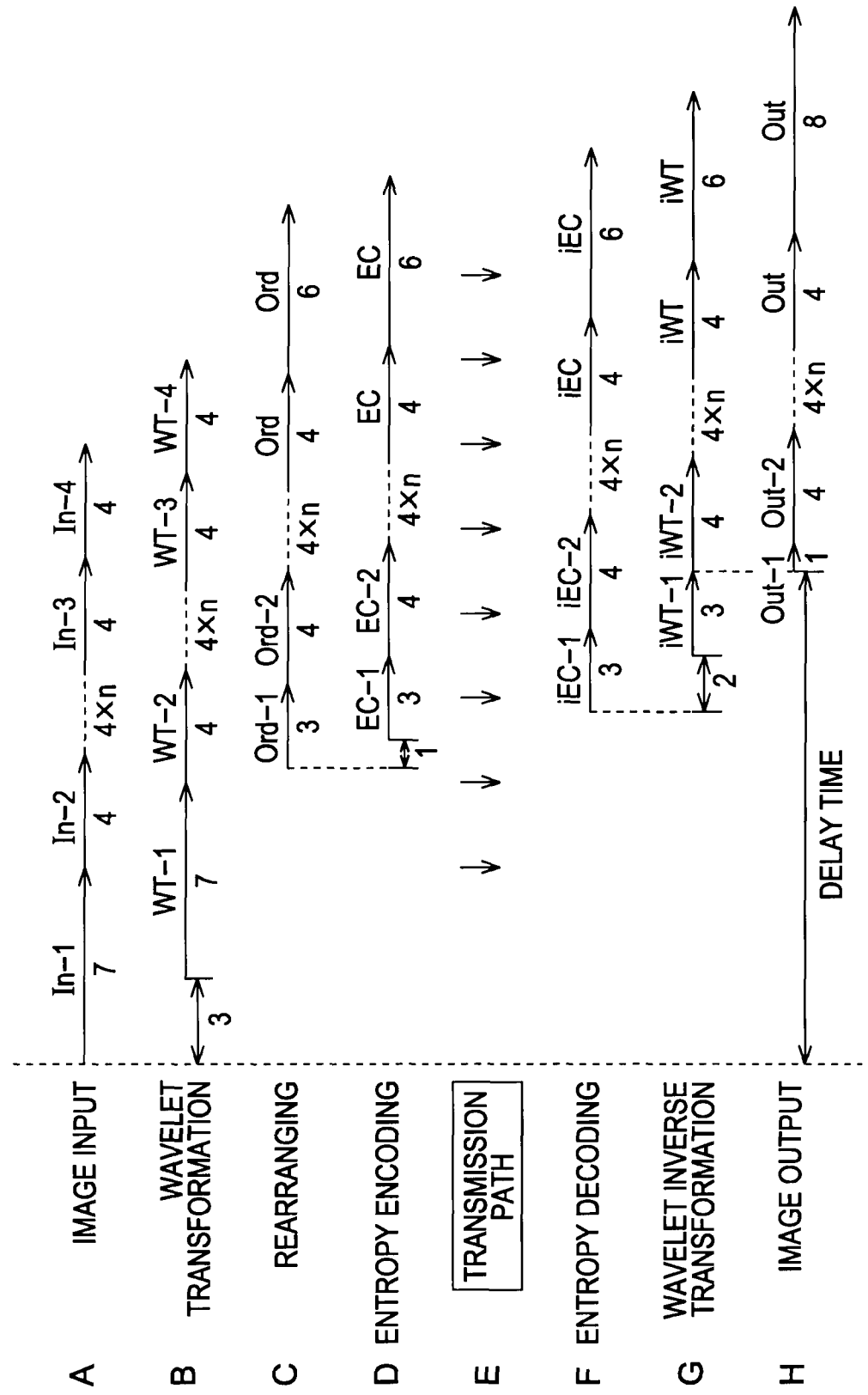
FIG. 29 is a schematic diagram schematically illustrating an example of parallel operation.

The various processes executed by the components such as described above are executed in parallel as appropriate, as shown in FIG. 29 for example. FIG. 29 is a diagram schematically showing an example of parallel operations for various elements of the processing executed by the video signal encoding unit 120 in FIG. 2 and the video signal encoding unit 136 in FIG. 16. FIG. 29 corresponds to the above-described FIG. 7.

Wavelet transformation WT-1 at the first time is performed (B in FIG. 29) with the wavelet transformation unit 11 (FIG. 3) as to the input In-1 (A in FIG. 29) of the image data. As described with reference to FIG. 6, the wavelet transformation WT-1 at the first time is started at the point-in-time that the first three lines are input, and the coefficient C1 is generated. That is to say, a delay of three lines worth occurs from the input of the image data In-1 to the start of the wavelet transformation WT-1.

The generated coefficient data is stored in the coefficient rearranging buffer unit 223 (FIG. 3). Thereafter, wavelet transformation is performed as to the input image data and the processing at the first time is finished, whereby the processing is transferred without change to the wavelet transformation WT-2 at the second time.

The rearranging Ord-1 of three coefficients C1, C4, and C5 is executed (C in FIG. 29) with the coefficient rearranging unit 224 (FIG. 3) in parallel with the input of image data In-2 for the purpose of wavelet transformation WT-2 at the second time and the processing of the wavelet transformation WT-2 at the second time.

Note that a delay from the end of the wavelet transformation WT-1 until the rearranging Ord-1 starts is a delay based on a device or system configuration, and for example is a delay associated with the transmission of a control signal to instruct rearranging processing to the coefficient rearranging unit 224, a delay needed for processing starting of the coefficient rearranging unit 224 as to the control signal, or a delay needed for program processing, and is not an essential delay associated with encoding processing.

The coefficient data is read from the coefficient rearranging buffer unit 223 in the order that rearranging is finished, quantized at the quantization unit 225, supplied to the entropy encoding unit 227 (FIG. 3), and is subjected to entropy encoding EC-1 (D in FIG. 29). The entropy encoding EC-1 can be started without waiting for the end of all rearranging of the three coefficients C1, C4, and C5. For example, at the point-in-time that the rearranging of one line by the coefficient C5 output at first is ended, entropy encoding as to the coefficient C5 can be started. In this case, the delay from the processing start of the rearranging Ord-1 to the processing start of the entropy encoding EC-1 is one line worth.

The encoded data regarding which entropy encoding EC-1 by the entropy encoding unit 227 has ended is subjected to predetermined signal processing, and then transmitted to the camera control unit 112 via the triax cable 111 (E in FIG. 29). At this time, the encoded data is transmitted in a packetized manner.

Image data is sequentially input to the video signal encoding unit 120 of the transmission unit 110, from the seven lines worth at the first processing, on to the end line of the screen. At the video signal encoding unit 120, every four lines are subjected to wavelet transformation WT-n, reordering Ord-n, and entropy encoding EC-n, as described above, in accordance with image data input In-n (where n is 2 or greater). Reordering Ord, and entropy encoding EC performed the last time at the video signal encoding unit 120 is performed on six lines. These processes are performed at the video signal encoding unit 120 in parallel, as illustrated exemplarily in A through D in FIG. 29.

Packets of encoded data encoded by the entropy encoding EC-1 by the encoding unit 120 are transmitted to the camera control unit 112, subjected to predetermined signal processing and supplied to the video signal decoding unit 136. The packet interpreting unit 401 of the video signal decoding unit 136 (FIG. 16) separates the packet header information and the encoded data, and the reception buffer control unit 402 supplies encoded data to the decoding unit 403 in increments of precincts. The entropy decoding unit 481 of the decoding unit 403 (FIG. 22) sequentially performs decoding iEC-1 of entropy encoding as to the encoded data which is encoded with the entropy encoding EC-1, and restores the coefficient data (F in FIG. 29). The restored coefficient data is subjected to inverse quantization at the inverse quantization unit 482, and then sequentially stored in the coefficient buffer unit 483. Upon as much coefficient data as can be subjected to wavelet inverse transformation being stored in the coefficient buffer unit 483, the wavelet inverse transformation unit 484 reads the coefficient data from the coefficient buffer unit 483, and performs wavelet inverse transformation iWT-1 using the read coefficient data (G in FIG. 29).

As described with reference to FIG. 6, the wavelet inverse transformation iWT-1 at the wavelet inverse transformation unit 484 can be started at the point-in-time of the coefficients C4 and C5 being stored in the coefficient buffer unit 483. Accordingly, the delay from the start of decoding iEC-1 with the entropy decoding unit 481 to the start of the wavelet inverse transformation iWT-1 with the wavelet inverse transformation unit 484 is two lines worth.

With the wavelet inverse transformation unit 484, upon the wavelet inverse transformation iWT-1 of three lines worth with the wavelet transformation at the first time ending, output Out-1 of the image data generated with the wavelet inverse transformation iWT-1 is performed (H in FIG. 29). With the output Out-1, as described with reference to FIGS. 6 and 7, the image data of the first line is output.

Following the input of the encoded coefficient data worth three lines with the processing at the first time by the video signal encoding unit 120 to the video signal decoding unit 136, the coefficient data encoded with the entropy encoding EC-n (where n is 2 or greater) is sequentially input. With the video signal decoding unit 136, the input coefficient data is subjected to entropy decoding iEC-n and wavelet inverse transformation iWT-n for every four lines, as described above, and output Out-n of the image data restored with the wavelet inverse transformation iWT-n is sequentially performed. The entropy decoding iEC and wavelet inverse transformation iWT corresponding to the last time with the video signal encoding unit 120 is performed as to six lines, and eight lines of output Out are output. This processing is performed in parallel as exemplified in F through H in FIG. 29 at the video signal decoding unit 136.

As described above, by performing each processing in parallel at the video signal encoding unit 120 and the video signal decoding unit 136, in order from the top of the image toward the bottom thereof, image compression processing and image decoding processing can be performed with little delay.

With reference to FIG. 29, the delay time from the image input to the image output in the case of performing wavelet transformation to division level=2 using a 5×3 filter will be calculated. The delay time from inputting the image data of the first line into the video signal encoding unit 120 until the image data of the first line is output from the video signal decoding unit 136 becomes the sum of the various elements described below. Note that delays differing based on the system configuration, such as delay in the transmission path and delay associated with actual processing timing of the various portions of the device are excluded.

(1) Delay D_WT from the first line input until the wavelet transformation WT-1 worth seven lines ends (2) Time D_Ord associated with three lines worth of coefficient rearranging Ord-1

(3) Time D_EC associated with three lines worth of entropy encoding EC-1

(4) Time D_iEC associated with three lines worth of entropy decoding iEC-1

(5) Time D_iWT associated with three lines worth of wavelet inverse transformation iWT-1

Delay due to the various elements described above will be calculated with reference to FIG. 29. The delay D_WT in (1) is ten lines worth of time. The time D_Ord in (2), time D_EC in (3), time D_iEC in (4), and time D_iWT in (5) are each three lines worth of time. Also, with the video signal encoding unit 120, the entropy encoding EC-1 can be started after one line from the start of the rearranging Ord-1. Similarly, with the video signal decoding unit 136, the wavelet inverse transformation iWT-1 can be started after two lines from the start of entropy decoding iEC-1. Also, the entropy decoding iEC-1 can start processing at the point-in-time of one line worth of encoding with the entropy encoding EC-1 being finished.

Accordingly, with the example in FIG. 29, the delay time from the image data of the first line input into the video signal encoding unit 120 until the image data of the first line output from the decoding unit 403 becomes 10+1+1+2+3=17 lines worth.

The delay time will be considered with a more specific example. In the case that the input image data is an interlace video signal of an HDTV (High Definition Television), for example one frame is made up of a resolution of 1920 pixels× 1080 lines, and one field is 1920 pixels×540 lines. Accordingly, in the case that the frame frequency is 30 Hz, the 540 lines of one field is input into the video signal encoding unit 120 in the time of 16.67 msec (=1 sec/60 fields).

Accordingly, the delay time associated with the input of seven lines worth of image data is 0.216 msec (=16.67 msec× 7/540 lines), and becomes a very short time as to the updating time of one field, for example. Also, delay time of the sum total of the above-described delay D_WT in (1), time D_Ord in (2), time D_EC in (3), time D_iEC in (4), and time D_iWT in (5) is significantly shortened, since the number of lines to be processed is small.

In the above, the reception buffer control unit 402 has been described as performing supplementation using prepared dummy data in the event that loss of precincts occurs due to bank over control processing or the like, but is not restricted to this, and an arrangement may be made wherein, for example, encoded data of a precinct of the same position in the previous picture is used for the supplementation processing.

Figure 30:
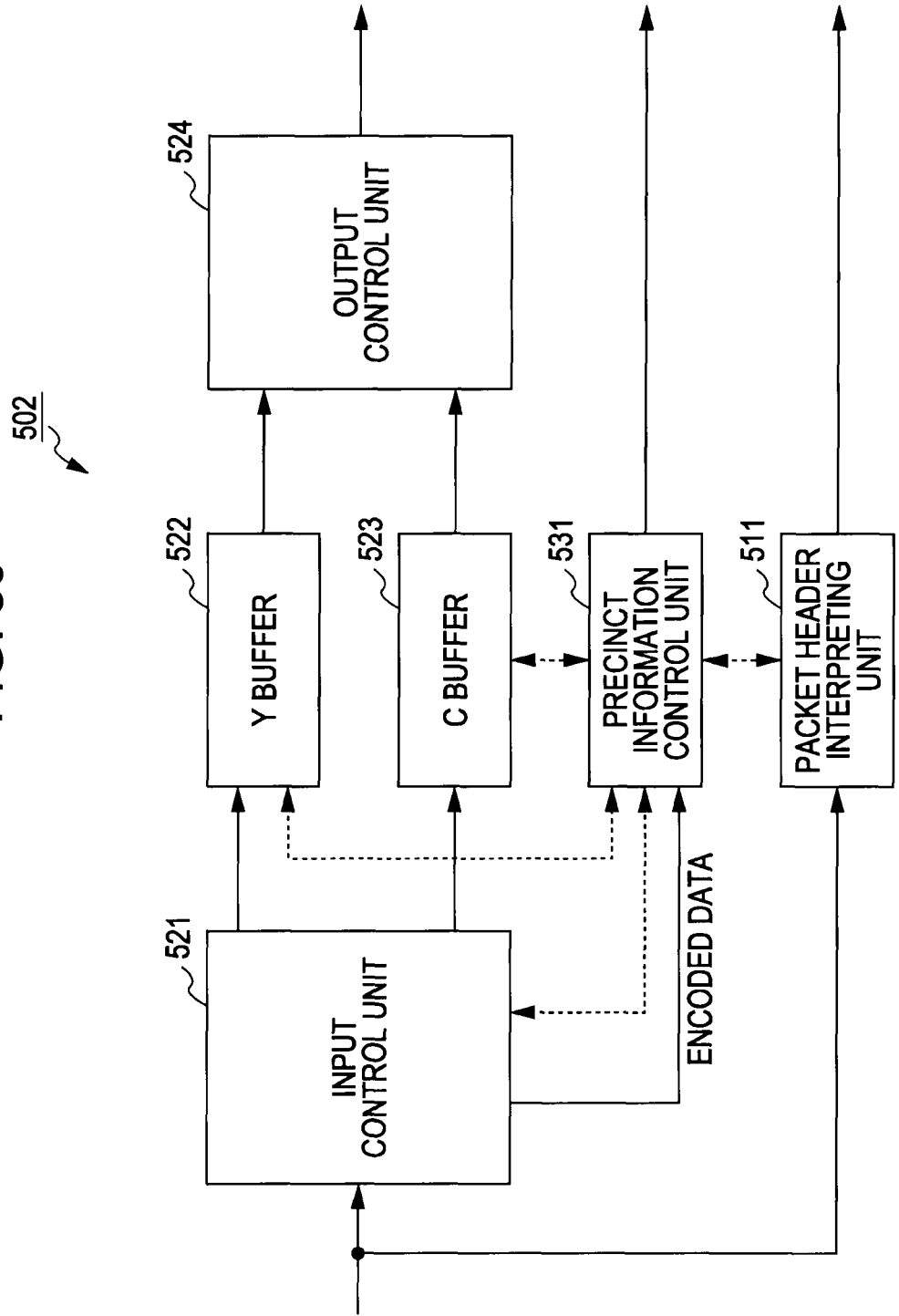
FIG. 30 is a diagram illustrating another detailed configuration example of the reception buffer control unit shown in FIG. 16.

FIG. 30 is a block diagram illustrating another detailed configuration example of the reception buffer control unit shown in FIG. 16. The reception buffer control unit 502 shown in FIG. 30 basically has the same configuration as the reception buffer control unit 402 described with reference to FIG. 17 and operates in the same manner, but differs in that the precinct information control unit obtains encoded data (Y data and C data) supplied to the input control unit and holds one picture worth of the obtained encoded data to use for supplementation processing performed in the next picture, and in that in the event that loss of a precinct occurs due to bank over control processing or the like, the precinct information control unit uses the encoded data of the precinct at the same position in the previous picture that has been held to perform the supplementation processing.

That is to say, the reception buffer control unit 502 includes a packet header interpreting unit 511 corresponding to the packet header interpreting unit 411 of the reception buffer control unit 402 and performing processing the same as the packet header interpreting unit 411, a Y buffer 522 corresponding to the Y buffer 422 of the reception buffer control unit 402 and performing processing the same as the Y buffer 422, a C buffer 523 corresponding to the C buffer 423 of the reception buffer control unit 402 and performing processing the same as the C buffer 423, an output control unit 524 corresponding to the output control unit 424 of the reception buffer control unit 402 and performing processing the same as the output control unit 424, and also the an input control unit 521 and precinct information control unit 531.

The input control unit 521 corresponds to the input control unit 421 of the reception buffer control unit 402 and performs basically the same processing as the input control unit 421, but differs in that the obtained encoded data (Y data and C data) are supplied to not only the Y buffer 522 and C buffer 523 to be accumulated but also to the precinct information control unit 531.

The precinct information control unit 531 corresponds to the precinct information control unit 431 of the reception buffer control unit 402 and performs basically the same processing as the precinct information control unit 431, but differs from the precinct information control unit 431 in that the precinct information control unit 531 has a storage medium built in, with one picture of encoded data supplied from the input control unit 521 being stored in this storage medium, and in the event that precinct loss occurs, the encoded data of the precinct at the same position in the previous picture that is held is supplied to the decoding unit 403 instead of dummy data.

Figure 31:
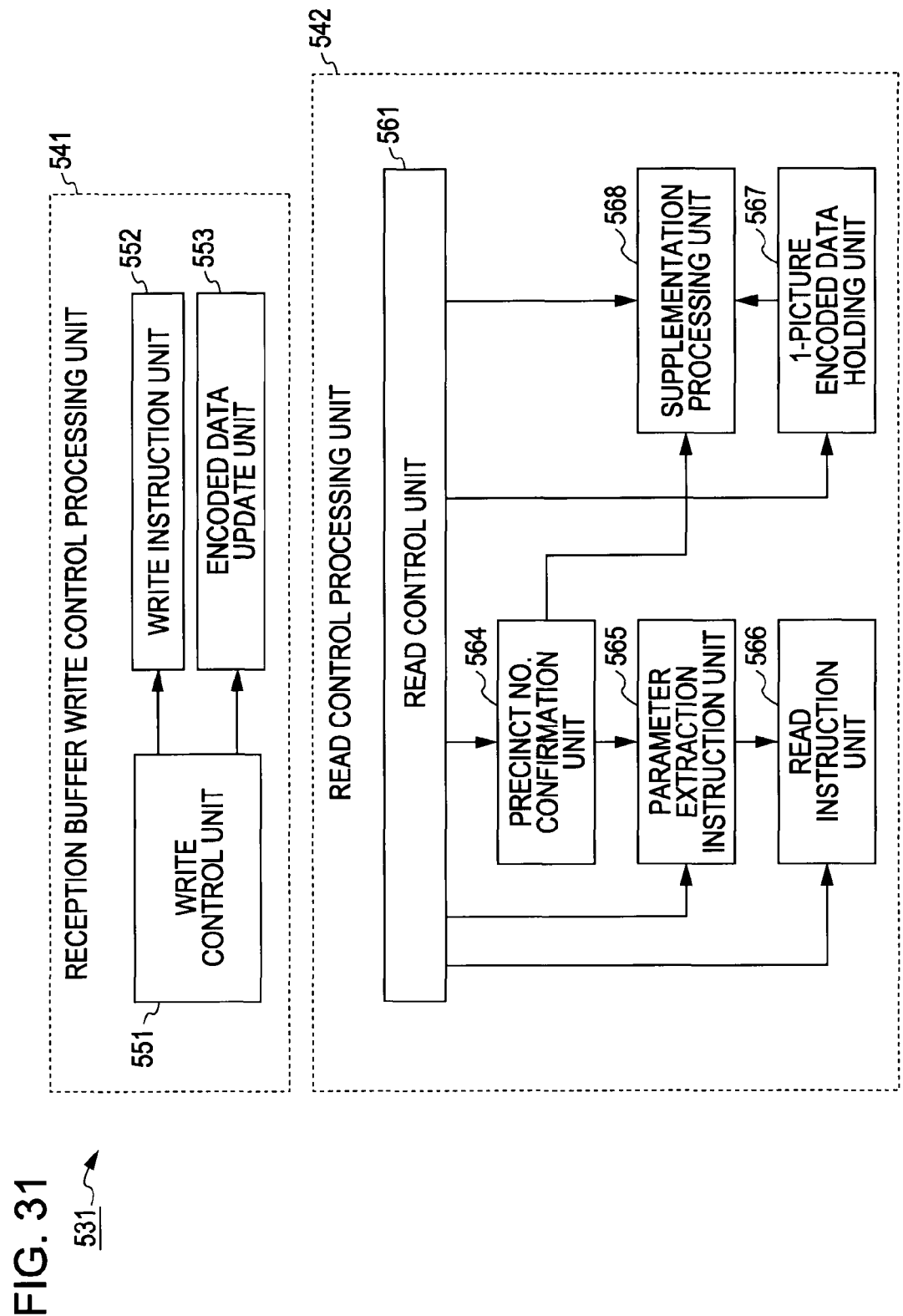
FIG. 31 is a block diagram illustrating a detailed configuration example of a precinct information control unit shown in FIG. 30.

FIG. 31 is a block diagram illustrating a detailed configuration of the precinct information control unit 531 shown in FIG. 30. As shown in FIG. 31, the precinct information control unit 531 has a reception buffer write control processing unit 541 and a reception buffer read control processing unit 542.

The reception buffer write control processing unit 541 has a write control unit 551, a write instruction unit 552, and an encoded data updating unit 553.

The write control unit 551 corresponds to the write control unit 451 (FIG. 18) of the reception buffer write control processing unit 441 and basically performs the same processing as the write control unit 451, but differs from the write control unit 451 in that the write control unit 551 controls not only the processing which the write instruction unit 552 performs but also the processing which the encoded data updating unit 553 performs. The write instruction unit 552 corresponds to the write instruction unit 452 (FIG. 18) of the reception buffer write control processing unit 441, and performs the same processing as the write instruction unit 452 under the control of the write control unit 551.

The encoded data updating unit 553 updates encoded data held in later-described a 1-picture encoded data holding unit 567 of the reception buffer read control processing unit 542 under control of the write control unit 551. That is to say, upon obtaining encoded data of one precinct worth that is supplied from the input control unit 521, the encoded data updating unit 553 supplies this to the 1-picture encoded data holding unit 567, so as to update the encoded data which the 1-picture encoded data holding unit 567 holds. That is to say, the encoded data updating unit 553 supplies a new precinct of encoded data supplied from the input control unit 521 to the 1-picture encoded data holding unit 567, thereby overwriting, of the one picture of encoded data which the 1-picture encoded data holding unit 567 holds, the encoded data of the precinct at the same position, with the new encoded data.

The reception buffer read control processing unit 542 includes a read control unit 561, a precinct No. confirmation unit 564, a parameter extraction instruction unit 565, a read instruction unit 566, a 1-picture encoded data holding unit 567, and a supplementation processing unit 568.

The read control unit 561 corresponds to the read control unit 461 (FIG. 18) of the reception buffer read control processing unit 442 and performs basically the same processing as the read control unit 461, but differs from the read control unit 461 in that the read control unit 561 controls the 1-picture encoded data holding unit 567 instead of controlling the dummy data holding unit 467.

The precinct No. confirmation unit 564 corresponds to the precinct No. confirmation unit 464 (FIG. 18) of the reception buffer read control processing unit 442 and performs the same processing as the precinct No. confirmation unit 464 under the control of the read control unit 561. The parameter extraction instruction unit 565 corresponds to the parameter extraction instruction unit 465 (FIG. 18) of the reception buffer read control processing unit 442 and performs the same processing as the parameter extraction instruction unit 465 under the control of the read control unit 561. The read instruction unit 566 corresponds to the read instruction unit 466 (FIG. 18) of the reception buffer read control processing unit 442 and performs the same processing as the read instruction unit 466 under the control of the read control unit 561.

The 1-picture encoded data holding unit 567 holds one picture of encoded data supplied form the input control unit 521. The supplementation processing unit 568 operates under control of the read control unit 561, such that in the event that precinct loss has occurred, based on the confirmation results of the precinct No. confirmation unit 564, encoded data of the precinct at the same position, i.e., the encoded data of the precinct at the same position of the picture previous to that from which the precinct was lost, is obtained from the one picture of encoded data held in the 1-picture encoded data holding unit 567, and supplementation processing is performed using that encoded data.

Figure 32:
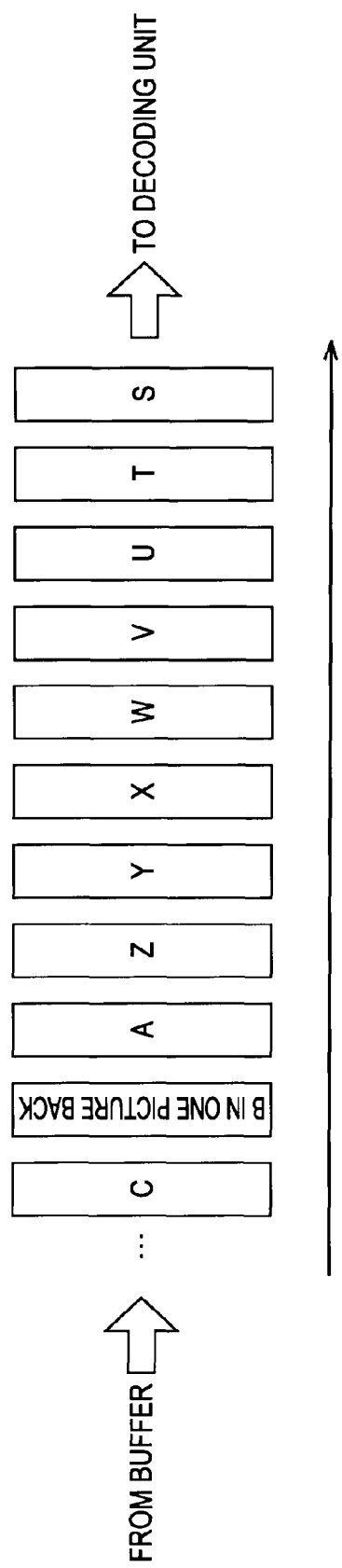
FIG. 32 is a diagram for describing the output order of encoded data from a reception buffer control unit shown in FIG. 30.

In the example shown in FIG. 19, the supplementation processing unit 468 shown in FIG. 18 supplies the decoding unit 403 dummy data (dummy B) prepared beforehand instead of the encoded data of the precinct B that has been lost, as shown in FIG. 20, but the supplementation processing unit 568 shown in FIG. 31 supplies the decoding unit 403 encoded data of the precinct B of the precious picture (B in the previous picture) instead of the encoded data of the precinct B that has been lost, as shown in FIG. 32.

In the case of normal moving images, the correlation of images between adjacent pictures is strong. That is to say, images of lines at the same position have strong correlation between adjacent pictures. Accordingly, the supplementation processing unit 568 can supplement an image very much like the lost image to the output image by supplementing the encoded data of the precinct at the same position in the previous picture. That is to say, the supplementation processing unit 568 can reduce image deterioration due to supplementation processing as compared to a case of using dummy data of a predetermined image that has been prepared beforehand for supplementation processing (i.e., image deterioration can be made to be less conspicuous).

However, in this case, one picture of encoded data needs to be stored for supplementation processing, so the storage capacity which the 1-picture encoded data holding unit 567 needs is greater than that of the dummy data holding unit 467 which only needs to hold at least one precinct of encoded data. However, it should be noted that the baseband image data needs not be held; only encoded data needs to be held, so the amount of data capacity that is increased is not non-implementable (i.e., sufficiently implementable).

Figure 33:
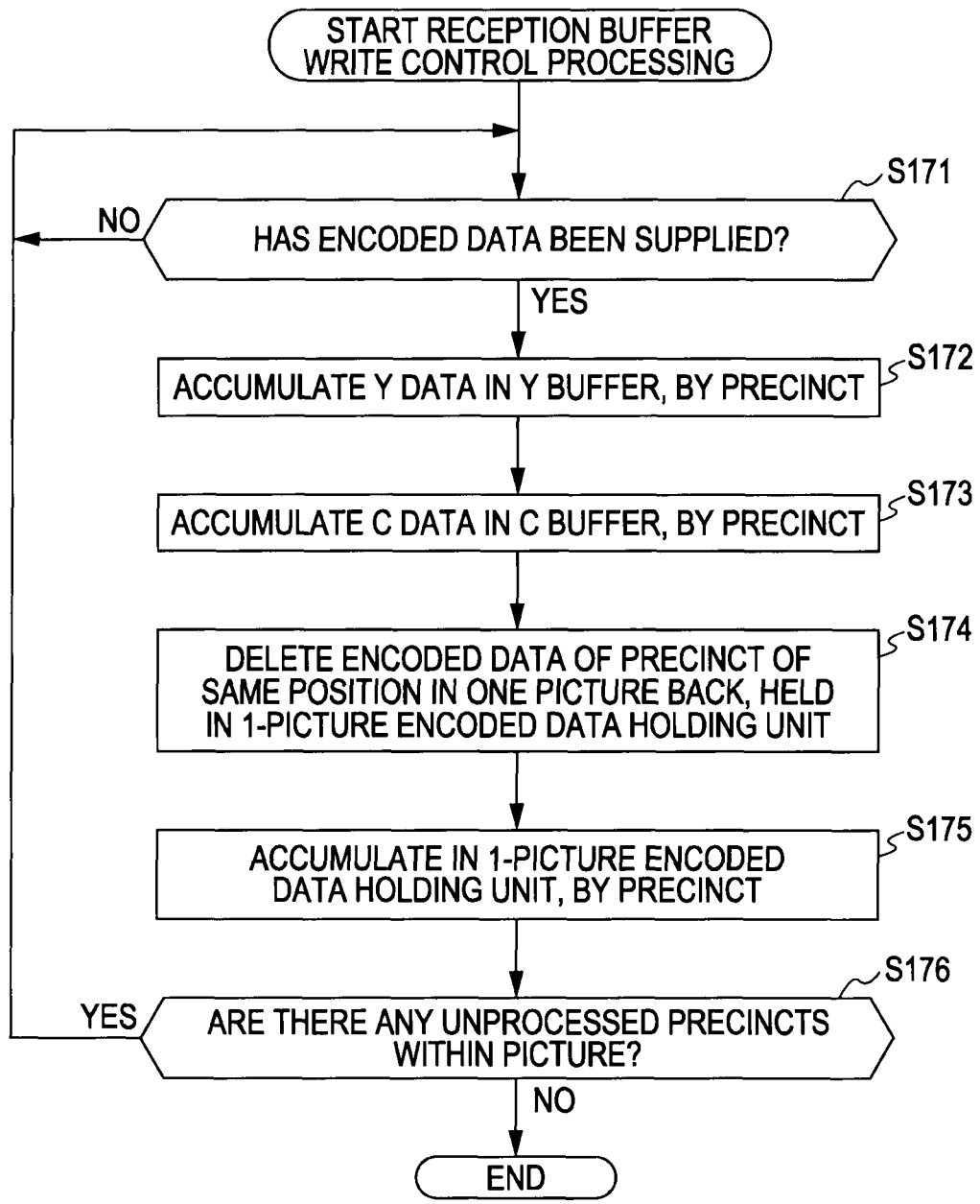
FIG. 33 is a flowchart for describing an example of reception buffer write control processing.

An example of the flow of reception buffer write control processing in this case will be described with reference to the flowchart in FIG. 33. Note that this reception buffer write control processing corresponds to the reception buffer write control processing described with reference to the flowchart in FIG. 26.

Figure 26:
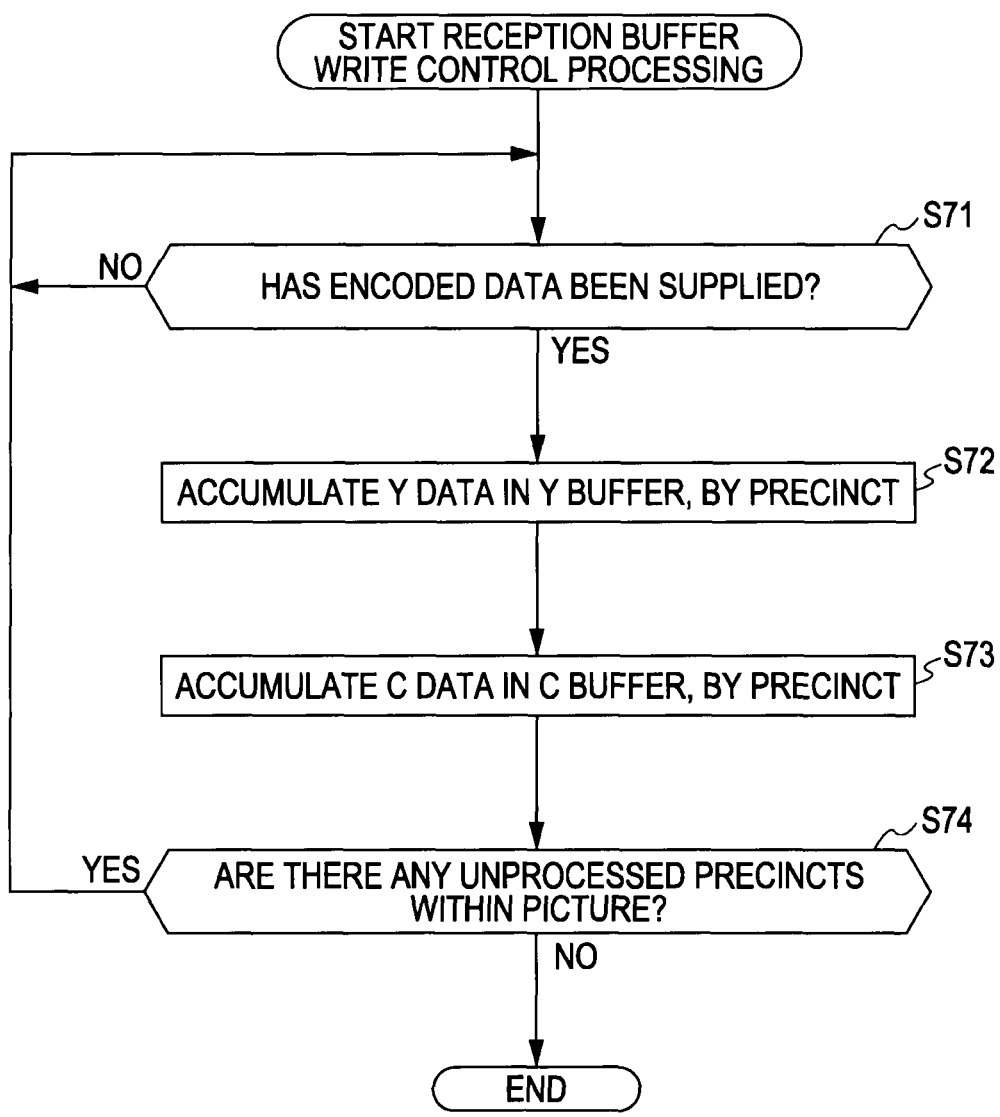
FIG. 26 is a flowchart for describing an example of reception buffer write control processing.

That is to say, the write control unit 551 and write instruction unit 552 of the reception buffer write control processing unit 541 execute the steps S171 through S173 in the same way as with the steps S71 through S73 in FIG. 26, accumulate the supplied Y data in the Y buffer 522, and accumulate the supplied C data in the C buffer 523. upon the encoded data being accumulated in the buffers, the processing advances to step S174.

In step S174, the encoded data updating unit 553 deletes from the 1-picture encoded data holding unit 567 the encoded data of the previous picture of the precinct at the same position as the precinct of the encoded data newly accumulated in the buffer, and in step S175 supplies the encoded data (Y data and C data) accumulated in the buffer by the processing in steps S172 and S173 to the 1-picture encoded data holding unit 567 so as to be stored by precinct.

In step S176 the write control unit 551 determines whether or not an unprocessed precinct exists in the picture being processed. In the event that determination is made that an unprocessed precinct exists, the flow returns to step S171, and subsequent processing is repeated. Also, in the event that determination is made that there is no unprocessed precinct within the picture, the reception buffer write control processing ends.

Figure 34:
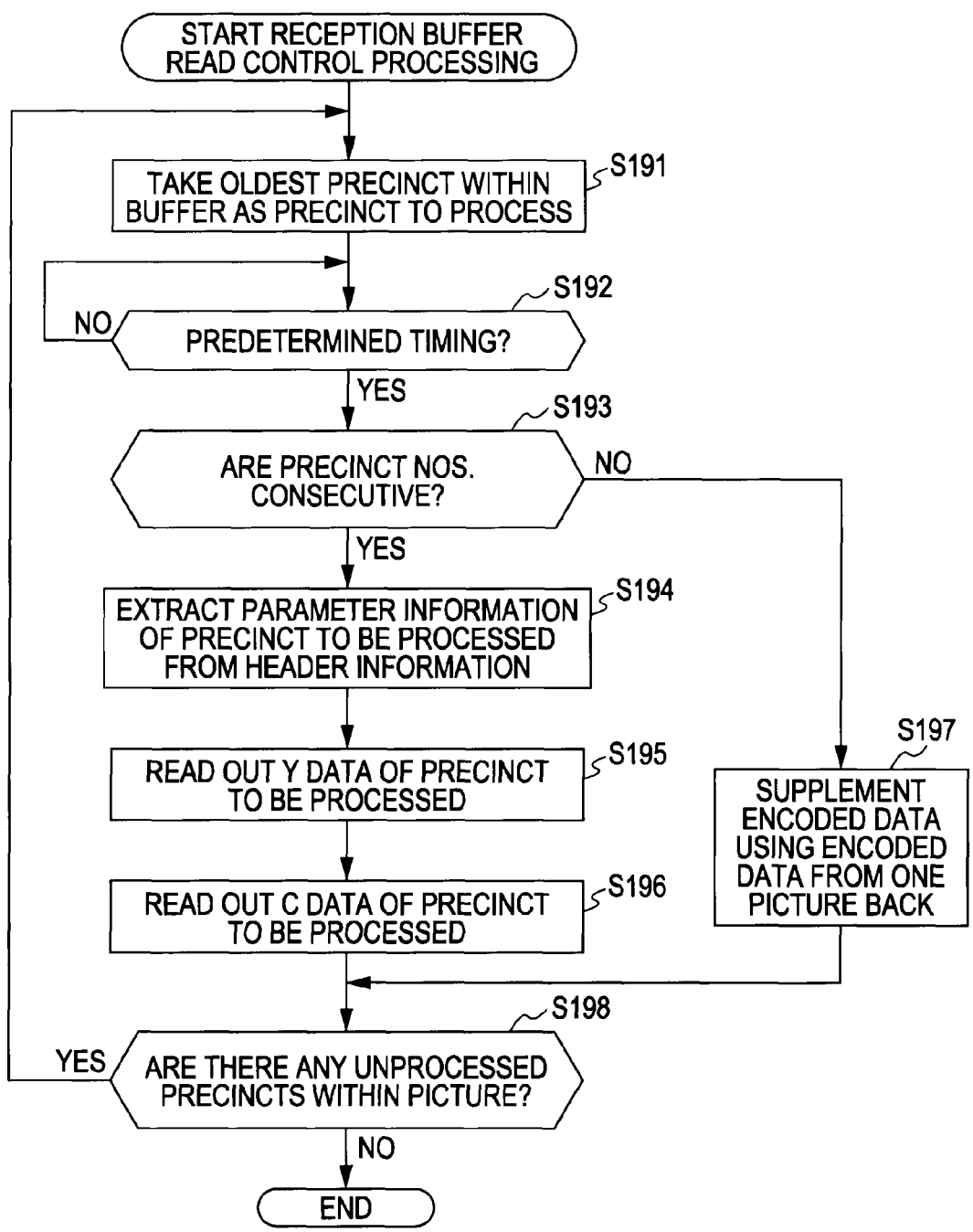
FIG. 34 is a flowchart for describing an example of reception buffer read control processing.

Next, an example of the flow of reception buffer read control processing in this case will be described with reference to the flowchart in FIG. 34. Note that this reception buffer read control processing corresponds to the reception buffer read control processing described with reference to the flowchart in FIG. 27.

Figure 27:
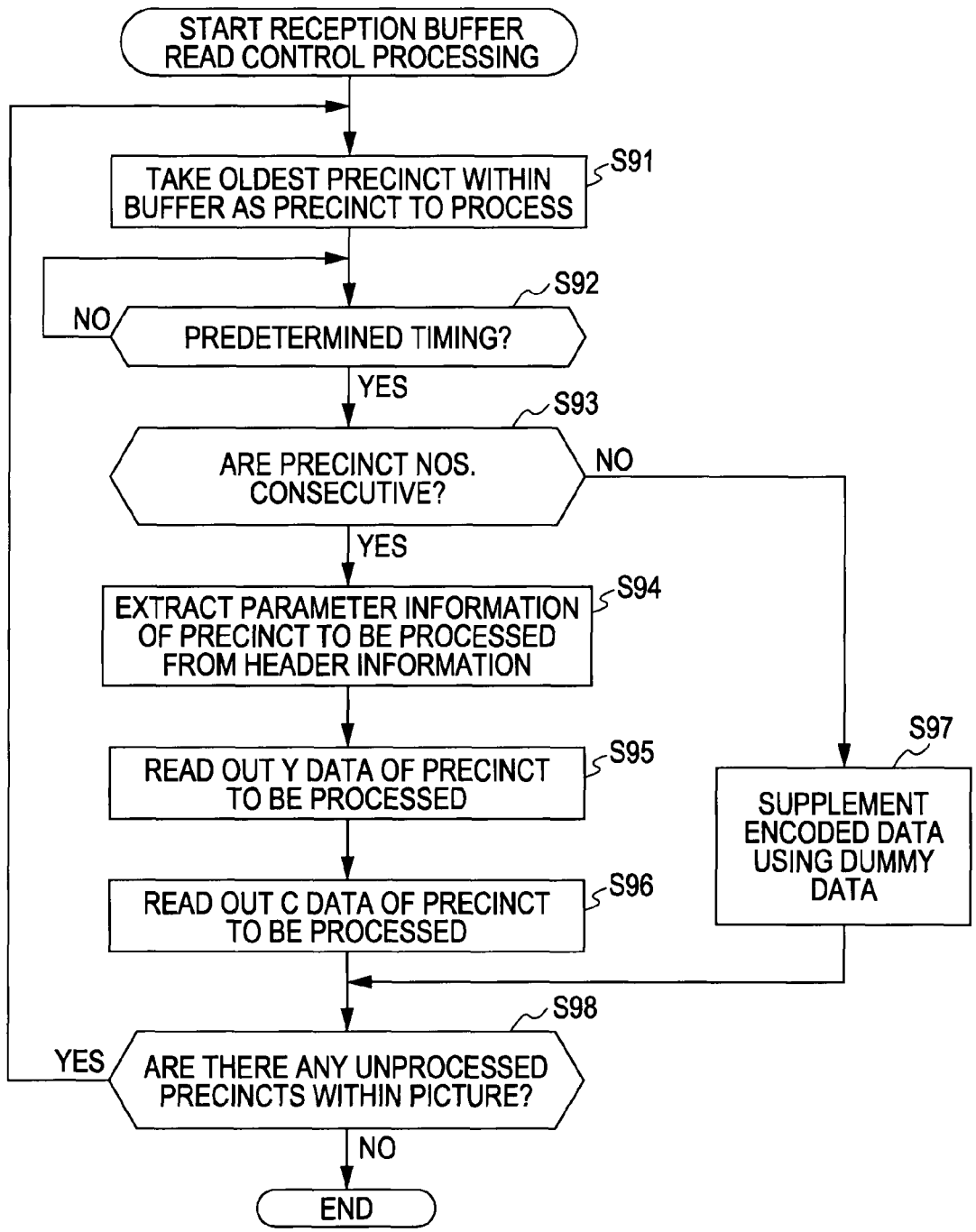
FIG. 27 is a flowchart for describing an example of reception buffer read control processing.

That is to say, the read control unit 561, precinct No. confirmation unit 564, parameter extraction instruction unit 565, and read instruction unit 566, of the reception buffer read control processing unit 542, execute the processing of steps S191 through S196 in the same way as with the steps S91 through S96 in FIG. 27, and in the event that determination is made that the precinct Nos. are consecutive, the encoded data accumulated in the Y buffer 522 and C buffer 523 is read out in increments of precincts, and supplied to the decoding unit 403. Upon the processing of step S196 ending, the flow proceeds to step S198.

Also, in the event that determination is made in step S193 that the precinct Nos. are not consecutive, meaning that there are lost precincts, the flow proceeds to step S971. In step S197, the supplementation processing unit 568 supplies encoded data from one picture back to the decoding unit 403, thereby supplementing the lost encoded data. Upon processing in step S197 ending, the flow proceeds to step S198.

In step S198, the read control unit 561 determines whether or not an unprocessed precinct exists, in the same way as with step S98 in FIG. 26. In the event that determination is made that an unprocessed precinct exists, the flow returns to step S191, and subsequent processing is repeated. Also, in the event that determination is made no unprocessed precinct exists, the reception buffer read control processing ends.

Note that in the above, description has been made regarding an arrangement wherein bank over control processing and supplementation processing is performed with a digital triax system such as shown in FIG. 1, but these processes are applicable to other systems as well, and may be applied to any system which transmits image data. The usage of the system is not restricted, either.

However, it should be note that the bank over control processing and supplementation processing is for easily suppressing unnecessary increase in delay time in content data transmission, while suppressing unnecessary deterioration of quality of the contents, and accordingly the advantages thereof are more apparent with systems demanding immediacy (real-time nature) at the time of data transmission from the transmission side to the reception side.

Also, the advantages thereof are more apparent with systems wherein image deterioration occurs anyway due to encoding processing and decoding processing, such as with systems which transmit encoded data at a transmission side and perform decoding processing at a reception side, and further have less tolerance regarding image deterioration.

Further, while the method of encoding processing and decoding processing is optional, bank over control processing and supplementation processing is performed in increments of precincts, so cases of application to systems which perform encoding processing and decoding processing in increments of precincts as described above is more effective, with little loss due to change in processing increments and so forth.

Also, the system configuration is optional, and may be, for example, a system wherein encoded data is transmitted bi-directionally as with the above-describe digital triax system, or may be a system wherein encoded data is transmitted only from one device to another device, or may be a system wherein encoded data is transmitted from a single transmission device to multiple reception devices, or may be a system wherein encoded data can be transmitted bi-directionally with and among multiple devices.

Note that with the digital triax system 100 shown in FIG. 1, a video decoding unit according to the related art may be applied as the video decoding unit 136. That is to say, an arrangement may be made wherein supplementation processing is not performed. In this case, bank over control processing is performed at the video signal encoding unit 120, so extension of underflow occurring at the video decoding unit 136 can be suppressed, and unnecessary image deterioration can be suppressed. However, lost precincts are not supplemented, so there may be black horizontal lines at the lines corresponding to such precincts, making image quality deterioration more conspicuous.

Conversely, a video encoding unit according to the related art may be applied as the video encoding unit 120, with no bank over control processing being performed, and only supplementation processing being performed. In this case, the video decoding unit 136 can supplement decoded data lost due to causes such as packet loss during transmission or the like, for example, but in the event that underflow may occur at the video decoding unit 136, the underflow may be prolonged, and image quality deterioration may increase.

Also, description has been made above that the output forbidding unit 285 of the transmission buffer write control processing unit 271 sets forbidding of output of encoded data in increments of precincts, as bank over control processing, but an arrangement may be made wherein the output forbidding unit 285 discards the encoded data from the buffer in increments of precincts, instead of setting forbidding of output. It should be understood that while description has been made above that the output forbidding unit 285 sets forbidding of output of encoded data in increments of precincts, as bank over control processing, this is forbidding of encoded data to the packet generating unit 203, i.e., forbidding of transmission of encoded data, and the encoded data which has been set so that output thereof is forbidden may be deleted, or overwritten with other new encoded data.

Also, while description has been made above with reference to FIG. 18 that the dummy data holding unit 467 holds dummy data and provides the dummy data to the supplementation processing unit 468 at the time of supplementation processing, an arrangement may be made wherein the dummy data holding unit 467 holds multiple sets of dummy data each with different images, with the supplementation processing unit 468 selecting and using one of these at the time of supplementation processing. While this dummy data selection method is optional, an arrangement may be made wherein the supplementation processing unit 468 confirms the image of the encoded data one precinct back, and selects dummy data having an image closest to that image, for example.

Further, description has been made with reference to FIG. 31 that supplementation processing is performed using encoded data of the precinct at the same position in the previous picture, but other arrangements may be made other than this, such as using new encoded data created based on encoded data of the preceding precinct or a nearby precinct in the same picture. For example, an arrangement may be made wherein the supplementation processing unit 568 takes the encoded data of a precinct one above the precinct of concern and the encoded data of a precinct two above the precinct of concern and averages the encoded data thereof so as to calculate encoded data which is the average of the encoded data of a precinct one above the precinct of concern and the encoded data of a precinct two above the precinct of concern, and uses this encoded data for the supplementation processing. Using encoded data of the same picture in this way allows the data amount of the encoded data to be held to be reduced, thereby reducing the storage capacity of the buffer memory.

Also, an arrangement may be made wherein, instead of the supplementation processing unit actually outputting dummy data or encoded data, the supplementation processing outputs equivalent control information for controlling the decoding unit 403. For example, the supplementation processing unit may supply control information to the decoding unit 403 instructing generating of encoded data at the time of the supplementation processing, with the encoding unit 403 or the like generating encoded data to serve in the stead of the lost encoded data. Of course, other control information than this may be used as well.

Also, note that while in the above, description has been made regarding a case wherein the number of precincts and data amount (transmission time) is used as conditions for executing bank over control processing, the conditions for executing bank over control processing may be conditions other than these. Examples may include parameters relating to the accumulation state of data in the buffer, in the same way as with the number of precincts and data amount (transmission time), or may be other conditions. That is to say, any conditions may be used as long as occurrence of underflow at the reception side buffer can be suppressed, or underflow that has occurred can be resolved in a short time. However, as described above, the features of the advantages obtained in a case of bank over control processing based on the number of precincts and a case of bank over control processing based on data amount (transmission time) differ from each other; in the same way, the features of the advantages obtained by bank over control processing will differ with other conditions as well, depending on what is being performed.

Figure 35:
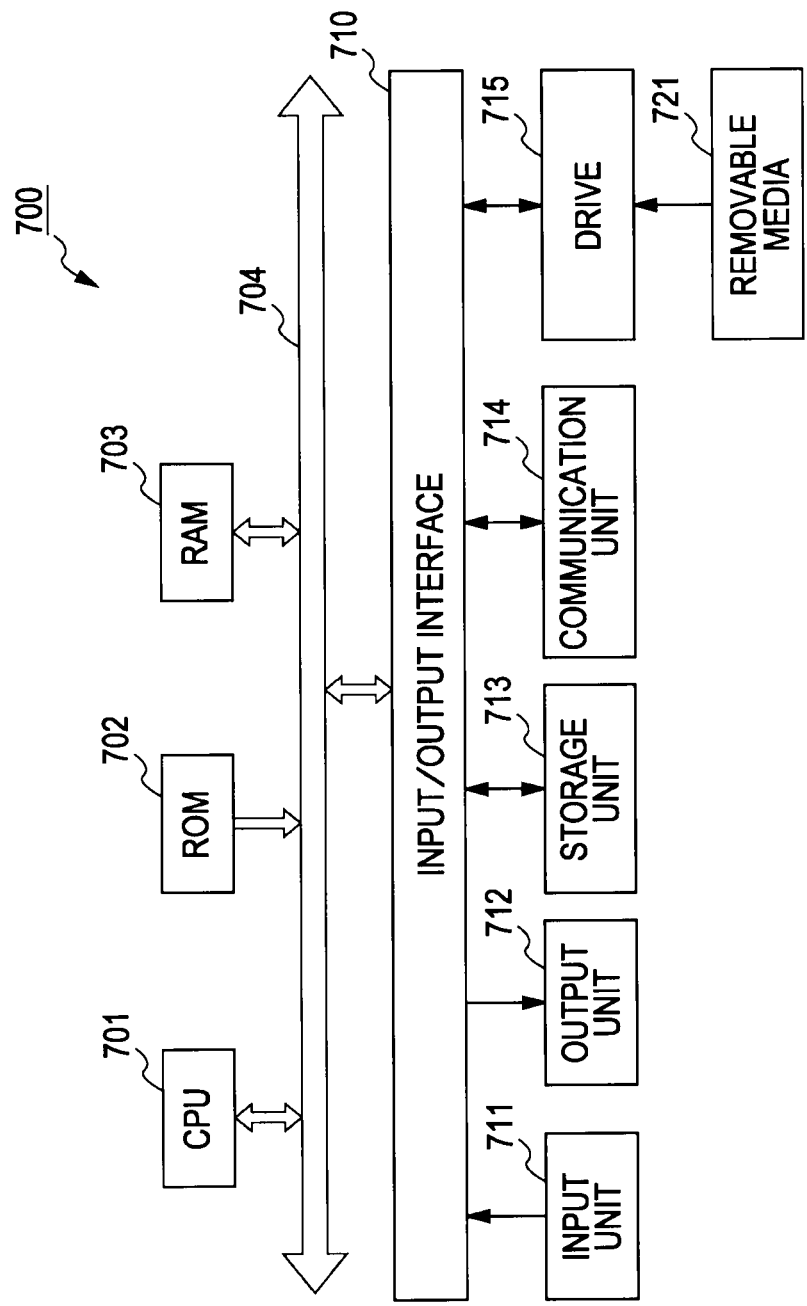
FIG. 35 is a diagram illustrating a configuration example of a personal computer to which an embodiment of the present invention has been applied.

The above-described series of processing may be executed by hardware, or by software, and in this case, may be configured as a personal computer such as shown in FIG. 35, for example.

In FIG. 35, a CPU (Central Processing Unit) 701 of a personal computer 700 executes various types of processing following programs stored in ROM (Read Only Memory) 702 or programs read out from a storage unit 713 and loaded to RAM (Random access Memory) 703. The RAM 703 also stores data necessary for the CPU 701 to execute various types of processing, as necessary. The CPU 701, ROM 702, and RAM 703 are mutually connected via a bus 704. The bus 704 is also connected with an input/output interface 710.

The input/output interface 710 is connected to an input unit 711 configured of a keyboard, mouse, and so forth, an output unit 712 configured of a display such as a CRT (Cathode Ray Tube), LCD (Liquid Crystal Display), or the like, speakers, and so forth, a storage unit 713 configured of a hard disk and so forth, and a communication unit 714 configured of a modem or the like. The communication unit 714 performs communication via a network, such as the Internet.

The input/output interface 710 is also connected to a drive 715 as necessary, to which removable media 721, such as magnetic disks, optical discs, magneto-optical disks, semiconductor memory, or the like, is mounted as appropriate, and computer programs read out therefrom are installed in the storage unit 713.

In the event of executing the above-described series of processing by software, programs making up the software are installed from a network or recording medium.

The recording medium is not restricted to being configured of removable media 721 such as a magnetic disk (including flexible disks), optical disk (CD-ROM (Compact Disc Read Only Memory), DVD (Digital Versatile Disc)), magneto-optical disk (including MDs (Mini-Disk) (a registered trademark)), semiconductor memory, and so forth, in which the program is recorded and distributed separately from the apparatus main unit for distributing the program to the user, and also is configured of ROM 702 or the hard disk included in the storage unit 713 and so forth in which the program is recorded, so as to be distributed to the user in a state of being built into the apparatus main unit.

Also note that with the present specification, the steps describing the program recorded in the recording medium include not only processing performed in time-sequence following the described order of course, but also processing executed in parallel or individually.

Also, in the present specification, the term "system" means the entirety of equipment configured of multiple devices.

Also, in the above, a configuration described as being a single device may be divided and made to be configured of multiple devices, or conversely, a configuration described above as being a configuration of multiple devices may be integrated so as to be configured of a single device. Also, configurations other than those described above may be added to the configuration of the devices. Moreover, a part of the configuration of one device may be included in the configuration of another device, as long as the configurations and operations of the overall system are substantially the same.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    an accumulating unit configured to accumulate encoded data obtained by encoding image data;
    a reading unit configured to read out said encoded data in data increments;
    a determining unit configured to determine whether or not a parameter indicating the accumulated state of said encoded data at said accumulating unit satisfies a predetermined accumulation condition;
    a forbidding unit configured to forbid readout of encoded data to be read out relative to encoded data being read out by said reading unit in data increments, which serves as a reference, in response to said determining unit determining that said parameter satisfies said accumulation condition; and
    a control unit configured to control said reading unit to omit readout of said encoded data of which readout is forbidden by said forbidding unit in data increments, and to perform readout of encoded data of which readout is not prohibited by said forbidding unit in data increments, said encoded data of which readout is not prohibited corresponding to encoded data that consecutively precedes and consecutively follows said encoded data of which readout is forbidden.

2. The information processing device according to claim 1, wherein said parameter includes the number of said data increments as to encoded data accumulated in said accumulating unit;
    and wherein said determining unit determines whether or not the number of said data increments is equal to or greater than a threshold.

3. The information processing device according to claim 1, wherein said parameter includes time necessary for said reading unit reading out all of the encoded data accumulated in said accumulating unit;
    and wherein said determining unit determines whether or not all of the encoded data accumulated in said accumulating unit can be read out within said time.

4. The information processing device according to claim 1, wherein said forbidding unit forbids readout of encoded data to be read out relative to encoded data serving as a reference more than the number of data increments necessary for said determining unit determining that said parameter does not satisfy said accumulation condition, which is continuous from the encoded data to be read out relative to said encoded data serving as reference.

5. The information processing device according to claim 1, wherein said forbidding unit deletes encoded data relative to encoded data serving as a reference to forbid readout of said encoded data.

6. The information processing device according to claim 1, wherein said data increments are encoding processing increments at the time of encoding said image data.

7. The information processing device according to claim 6, wherein said data increments include a line block including the number of lines worth of image data necessary for generating at least one line worth of coefficient data of a lowest band component sub-band, in the case of generating coefficient data divided for each frequency band by subjecting said image data to filter processing hierarchically, the lowest band component sub-band corresponding to a band in which a division result in a horizontal direction is a lowband component and a division result in a vertical direction is a lowband component.

8. The information processing device according to claim 7, wherein said encoded data is rearranged for each line block in order executing synthesis processing for synthesizing coefficient data of a plurality of sub-bands divided into frequency bands to generate image data.

9. The information processing device according to claim 8, wherein said encoded data is rearranged for each line block in order from lowband components to highband components.

10. The information processing device according to claim 1, further comprising:
    an encoding unit configured to encode said image data to generate said encoded data;

a writing unit configured to write encoded data generated by said encoding unit in said accumulating unit in said data increments; and a packetizing unit configured to packetize said encoded data read out by said reading unit.

11. The information processing device according to claim 10, further comprising:

a control unit configured to control encoding processing by said encoding unit, writing processing by said writing unit, readout processing by said reading unit, and packetizing processing by said packetizing unit so as to be performed mutually in parallel.

12. The information processing device according to claim 1, wherein said parameter includes both the number of said data increments as to encoded data accumulated in said accumulating unit, and time necessary for said reading unit reading out all of the encoded data accumulated in said accumulating unit;

said determining unit determines whether or not the number of said data increments exceeds a threshold;

said determining unit determines whether or not all of the encoded data accumulated in said accumulating unit can be read out within said time, in response to the determining unit determining that the number of said data increments exceeds the threshold; and said forbidding unit forbids readout of encoded data to be read out relative to encoded data being read out by said reading unit in data increments, in response to said determining unit determining that not all of the encoded data accumulated in said accumulating unit can be read out within said time.

13. The information processing device according to claim 1, wherein said control unit is configured to control said reading unit to perform readout of said encoded data of which readout is not prohibited at a constant bit rate.

14. The information processing device according to claim 1, wherein said encoded data that consecutively precedes said encoded data of which readout is forbidden corresponds to data that is accumulated by the accumulating unit at an earlier time than said encoded data that consecutively follows said encoded data of which readout is forbidden.

15. An information processing method comprising the steps of:

accumulating encoded data obtained by encoding image data;

reading out said encoded data in data increments;

determining whether or not a parameter indicating the accumulated state of said encoded data in said accumulating step satisfies a predetermined accumulation condition;

forbidding readout of encoded data to be read out relative to encoded data being read out in said reading step in data increments, which serves as a reference, in response to determining in said determining step that said parameter satisfies said accumulation condition; and controlling said reading step to omit readout of said encoded data of which readout is forbidden in said forbidding step in data increments, and perform readout of encoded data of which readout is not prohibited in said forbidding step in data increments, said encoded data of which readout is not prohibited corresponding to encoded data that consecutively precedes and consecutively follows said encoded data of which readout is forbidden.

16. An information processing device comprising:

accumulating means for accumulating encoded data obtained by encoding image data;

reading means for reading out said encoded data in data increments;

determining means for determining whether or not a parameter indicating the accumulated state of said encoded data at said accumulating means satisfies a predetermined accumulation condition;

forbidding means for forbidding readout of encoded data to be read out relative to encoded data being read out by said reading means in data increments, which serves as a reference, in response to said determining means determining that said parameter satisfies said accumulation condition; and control means for controlling said reading means to omit readout of said encoded data of which readout is forbidden by said forbidding means in data increments, and perform readout of encoded data of which readout is not prohibited by said forbidding means in data increments, said encoded data of which readout is not prohibited corresponding to encoded data that consecutively precedes and consecutively follows said encoded data of which readout is forbidden.

* * * * *